US011215629B2

(12) United States Patent
Kabe et al.

(10) Patent No.: US 11,215,629 B2
(45) Date of Patent: Jan. 4, 2022

(54) AUTOMATED ANALYZER

(71) Applicant: HITACHI HIGH-TECHNOLOGIES CORPORATION, Tokyo (JP)

(72) Inventors: Yoshihiro Kabe, Tokyo (JP); Takenori Okusa, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 301 days.

(21) Appl. No.: 16/483,459

(22) PCT Filed: Jan. 24, 2018

(86) PCT No.: PCT/JP2018/002083
§ 371 (c)(1),
(2) Date: Aug. 5, 2019

(87) PCT Pub. No.: WO2018/173464
PCT Pub. Date: Sep. 27, 2018

(65) Prior Publication Data
US 2020/0033374 A1    Jan. 30, 2020

(30) Foreign Application Priority Data
Mar. 24, 2017  (JP) .............................. JP2017-059108

(51) Int. Cl.
*G01N 35/10*    (2006.01)
*G01N 35/04*    (2006.01)

(52) U.S. Cl.
CPC ......... *G01N 35/1083* (2013.01); *G01N 35/04* (2013.01); *G01N 35/1002* (2013.01);
(Continued)

(58) Field of Classification Search
CPC .......... G01N 35/1083; G01N 35/1002; G01N 35/04; G01N 2035/041; G01N 2035/0405;
(Continued)

(56) References Cited

U.S. PATENT DOCUMENTS 2,711,821 A * 6/1955 Huntar .................... B65B 57/04
209/597
5,340,544 A * 8/1994 Nishikawa ................ B67B 7/02
422/500

(Continued)

FOREIGN PATENT DOCUMENTS

EP    1757367 A1 *  2/2007  .......... B01L 3/50853
JP    11-191174 A    7/1999
(Continued)

OTHER PUBLICATIONS

Extended European Search Report received in corresponding European Application No. 18771720.2 dated Nov. 27, 2020.
International Search Report of PCT/JP2018/002083 dated Mar. 6, 2018.

*Primary Examiner* — Jill A Warden
*Assistant Examiner* — John McGuirk
(74) *Attorney, Agent, or Firm* — Mattingly & Malur, PC

(57) ABSTRACT

An automated analyzer includes a container installation portion in which a container, such as a reagent container, has a protrusion and an openable and closable lid. A lid opening and closing mechanism opens and closes the lid and includes an arm portion having an arm and a horizontal driving portion which moves the arm in a first horizontal direction. The arm includes a protrusion contacting portion that includes a first surface having an angle greater than 0 degrees and less than 90 degrees when the horizontal surface is set as 0 degrees. The lid opening and closing mechanism portion opens the lid by moving the arm in the first hori- (Continued)

zontal direction, contacting the lid protrusion on the first surface of the protrusion contacting portion, and then moving the lid protrusion along a shape of the first surface in a vertical direction, until the lid is opened.

11 Claims, 46 Drawing Sheets

(52) U.S. Cl.
CPC ............... *G01N 2035/041* (2013.01); *G01N 2035/0405* (2013.01)

(58) Field of Classification Search
CPC .... G01N 2035/0443; G01N 2035/0484; B01L 3/527; B01L 3/523; B01L 2300/043; B01L 2200/16; B01L 2200/0689; B01L 3/50825; B01L 3/50853; B67B 7/164; B65D 43/162; B65D 43/163
See application file for complete search history.

(56) References Cited

U.S. PATENT DOCUMENTS

| | | |
|---|---|---|
| 2001/0028863 A1 | 10/2001 | Kitagawa |
| 2003/0044321 A1 | 3/2003 | Haslam et al. |
| 2008/0085222 A1 | 4/2008 | Fukuda et al. |
| 2012/0128534 A1* | 5/2012 | Minemura ......... G01N 35/1002 422/67 |
| 2012/0186200 A1 | 7/2012 | Jones et al. |
| 2012/0195808 A1 | 8/2012 | Arras et al. |
| 2012/0301357 A1* | 11/2012 | Gut .......................... B67B 7/00 422/63 |
| 2012/0328475 A1 | 12/2012 | Sakairi et al. |
| 2016/0030938 A1* | 2/2016 | Walder ................... G01N 35/04 53/485 |

FOREIGN PATENT DOCUMENTS

| | | | |
|---|---|---|---|
| JP | 2001-343392 A | | 12/2001 |
| JP | 2013-502566 A | | 1/2013 |
| JP | 2014-032099 A | | 2/2014 |
| JP | 2014032099 A | * | 2/2014 |
| JP | 5726091 B2 | | 5/2015 |

\* cited by examiner (A) LID ANGLE : α = 0 DEGREES (CLOSE STATE)

(B) LID ANGLE : α ≒ 45 DEGREES (C) LID ANGLE : α ≒ 90 DEGREES (OPEN STATE)

EMBODIMENT 1

LID OPENING AND CLOSING OPERATION (1) (LID OPEN)

<CLOSE STATE>
(CORRECT ORIENTATION)

LID OPENING AND CLOSING OPERATION (2) (LID OPEN)

LID OPENING AND CLOSING OPERATION (3) (LID OPEN)

LID OPENING AND CLOSING OPERATION (4) (LID OPEN)

LID OPENING AND CLOSING OPERATION (5) (LID OPEN)

<OPEN STATE>

LID OPENING AND CLOSING OPERATION (6) (LID OPEN)

<OPEN STATE>

LID OPENING AND CLOSING OPERATION (7) (LID CLOSE)

MODIFICATION EXAMPLE OF EMBODIMENT 1
BOTTLE LIFTING SUPPRESSING MECHANISM (1)

BOTTLE LIFTING SUPPRESSING MECHANISM (2)

BOTTLE LIFTING SUPPRESSING MECHANISM (3)

EMBODIMENT 2
LID OPENING AND CLOSING OPERATION (1) (LID OPEN)

<CLOSE STATE>

LID OPENING AND CLOSING OPERATION (2) (LID OPEN)

LID OPENING AND CLOSING OPERATION (3) (LID OPEN)

LID OPENING AND CLOSING OPERATION (4) (LID OPEN)

LID OPENING AND CLOSING OPERATION (5) (LID OPEN)

LID OPENING AND CLOSING OPERATION (6) (LID OPEN)

<CLOSE STATE>

LID OPENING AND CLOSING OPERATION (7) (DISPENSING)

<CLOSE STATE>

LID OPENING AND CLOSING OPERATION (8) (COMPARATIVE EXAMPLE)

EMBODIMENT 3
LID OPENING AND CLOSING OPERATION (1) (LID OPEN)

LID OPENING AND CLOSING OPERATION (2) (LID OPEN)

LID OPENING AND CLOSING OPERATION (3) (LID OPEN)

LID OPENING AND CLOSING OPERATION (4) (LID OPEN)

LID OPENING AND CLOSING OPERATION (5) (LID OPEN)

LID OPENING AND CLOSING OPERATION (6) (LID OPEN)

<CLOSE STATE>

PRESENCE OR ABSENCE DETERMINATION (2)

EMBODIMENT 5
INFORMATION READING (1)

INFORMATION READING (2)

AUTOMATED ANALYZER

TECHNICAL FIELD

The present invention relates to a technique of an automated analyzer used for chemical analysis and to an opening and closing mechanism for a lid of a container of a reagent bottle or the like.

BACKGROUND ART

An automated analyzer has a process (hereinafter described as a dispensing process) of aspirating a reagent from a reagent bottle and expelling the reagent to a reaction container to generate a reaction liquid in which an analyte (also called a sample or a specimen) is mixed with the reagent. In the dispensing process, a reagent or the like may be agitated.

To suppress evaporation and degradation of a reagent in a reagent bottle when the reagent is unnecessary, an automated analyzer may include a lid opening and closing mechanism in which a lid of the reagent bottle is opened before dispensing and agitating the reagent and closed after dispensing and agitating the reagent.

An example of a background art of the above automated analyzer and the lid opening and closing mechanism includes No. 5726091 (Patent Literature 1). Patent Literature 1 describes a lid opening and closing mechanism that rotates a lid of a reagent container to open and close the lid as the automated analyzer. Patent Literature 1 describes that a hook is selectively engaged with or disengaged from a lid, a lid of each reagent container can be selectively opened and closed, and the opening time can be reduced.

CITATION LIST

Patent Literature

Patent Literature 1: No. 5726091

SUMMARY OF INVENTION

Technical Problem

In an automated analyzer using a related art, such as the automated analyzer disclosed in Patent Literature 1, a hook (claw shaped member) catches a protrusion portion of a lid of a reagent bottle having a lid provided with a protrusion to open and close the lid. The lid opening and closing is realized by drives in two directions of a hook rotation direction and a vertical upward and downward movement direction. In this art, a driving portion is provided to rotation of each of multiple hooks. Therefore, it is possible to control opening and closing of a lid of each of multiple reagent bottle. It is possible to open and close a selected specific lid. This art is effective particularly when high processing capability and high speed processing are required such as when lids of multiple reagent bottles are opened and closed simultaneously.

When lids of multiple reagent bottles are not required to be opened and closed simultaneously and when high processing capability and high speed processing are not required, an automated analyzer is not required to have a function that controls opening and closing of a lid of each of multiple reagent bottles individually.

An object of the present invention is to provide a technique for an automated analyzer that realizes opening and closing of a lid of a container of a reagent bottle before and after dispensing by using a simpler structure and the smaller number of drives than before.

Solution to Problem

A typical embodiment of the present invention is an automated analyzer and has the following structure.

An automated analyzer of one embodiment is used for chemical analyses. The automated analyzer includes: a control device that controls operations of processes; a container installation portion in which a container including a protrusion and an openable and closable lid is installed; and a lid opening and closing mechanism portion for opening and closing the lid. The lid opening and closing mechanism portion includes an arm portion including an arm for opening the lid, and a horizontal driving portion which moves the arm in a first horizontal direction. The arm includes a protrusion contacting portion for contacting the protrusion. The protrusion contacting portion includes a first surface having an angle greater than 0 degrees and less than 90 degrees when the horizontal plane is set as 0 degrees. The lid opening and closing mechanism portion opens the lid by moving the arm in a direction of the first horizontal direction, contacting the protrusion on the protrusion contacting portion, and thus moving the protrusion above in a vertical direction along a shape of the first surface when opening the lid. The lid opening and closing mechanism portion closes the lid by moving the arm in a reverse direction of the first horizontal direction when closing the lid.

Advantageous Effects of Invention

According to the typical embodiment of the present invention, opening and closing of a lid of a container such as a reagent bottle before and after dispensing or the like is realizable by an automated analyzer using a simpler structure and the smaller number of drives than before.

Figure 35:
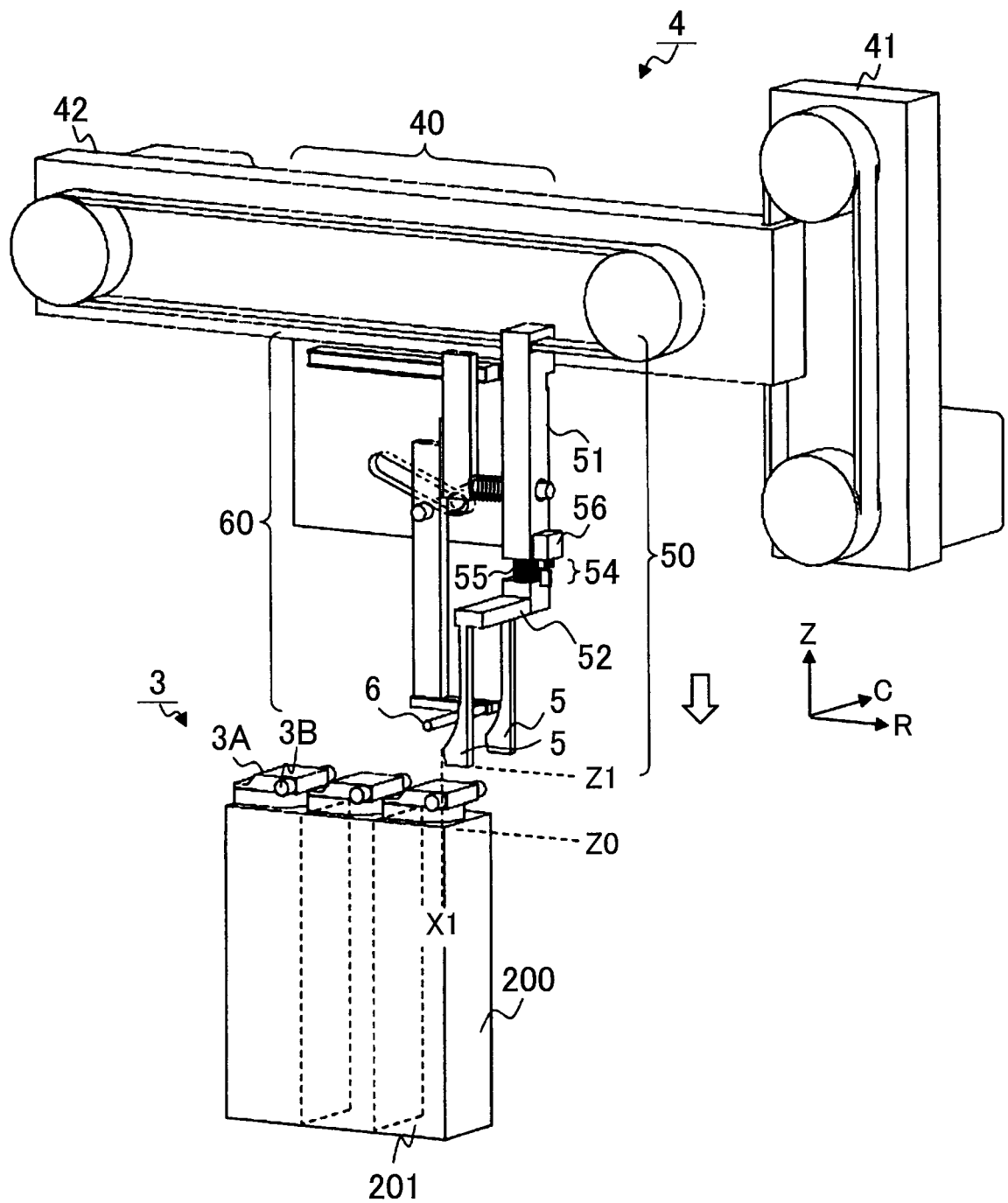

FIG. 35 a view illustrating a structure of the lid opening and closing mechanism portion and a first operation and a first state of orientation determination in an automated analyzer of Embodiment 4 of the present invention.

Figure 36:
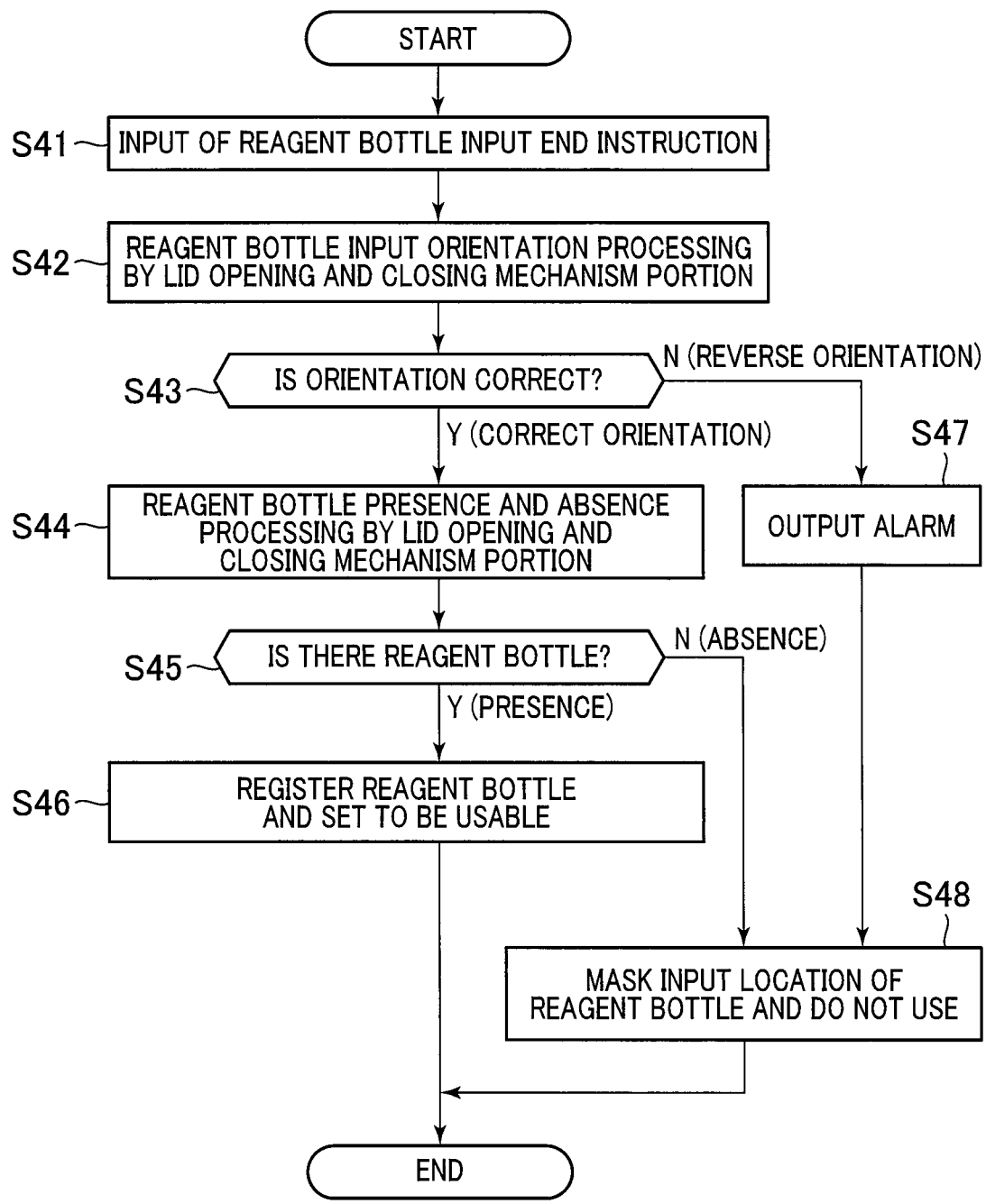

FIG. 36 is a diagram illustrating a flow of reagent bottle registration processing in Embodiment 4.

Figure 37:
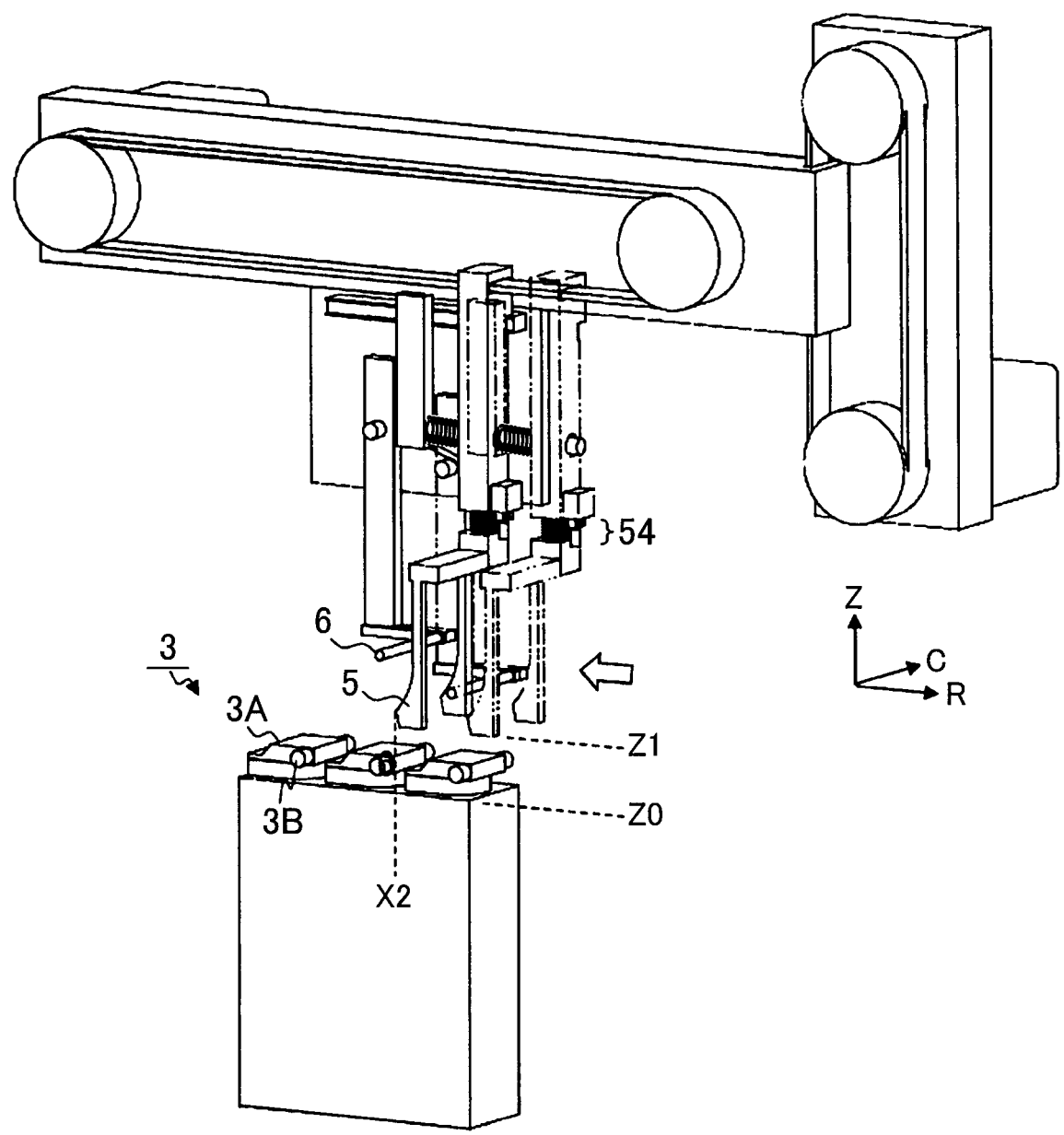

FIG. 37 is a view illustrating a second operation and a second state of the orientation determination in Embodiment 4.

Figure 38:
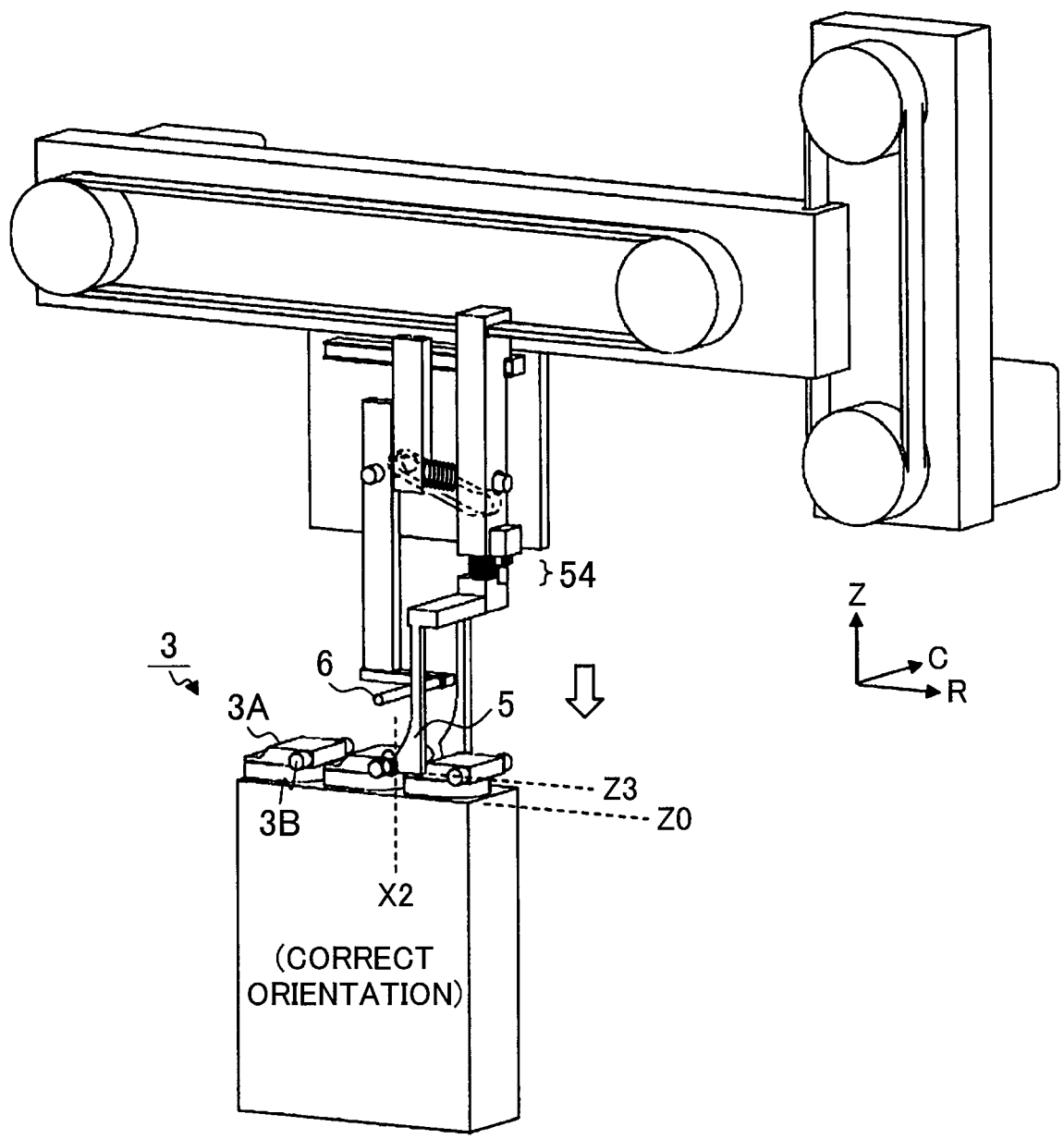

FIG. 38 is a view illustrating a third operation and a third state of the orientation determination in Embodiment 4.

Figure 39:
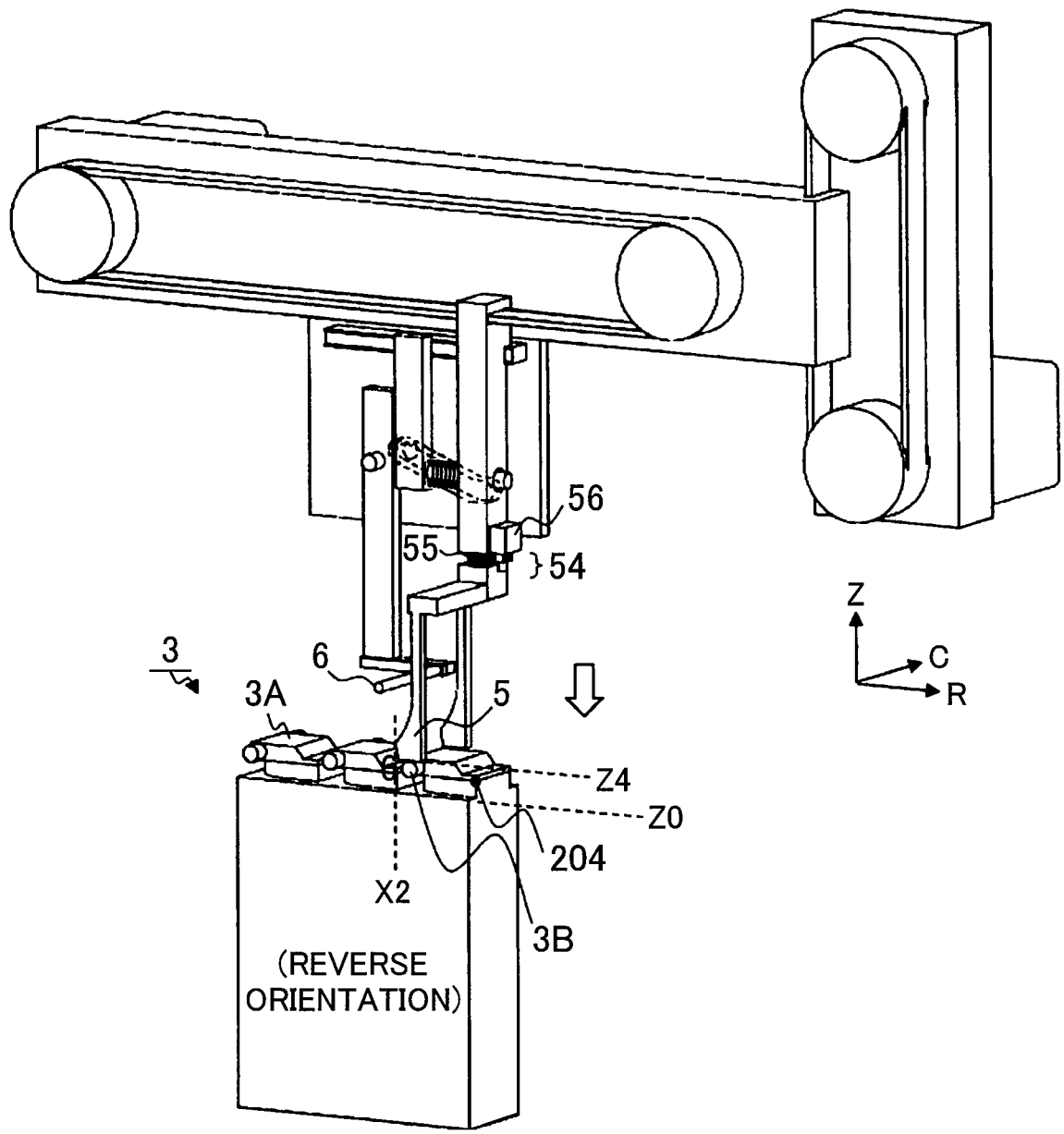

FIG. 39 is a view illustrating a fourth operation and a fourth state of orientation determination in Embodiment 4.

Figure 40:
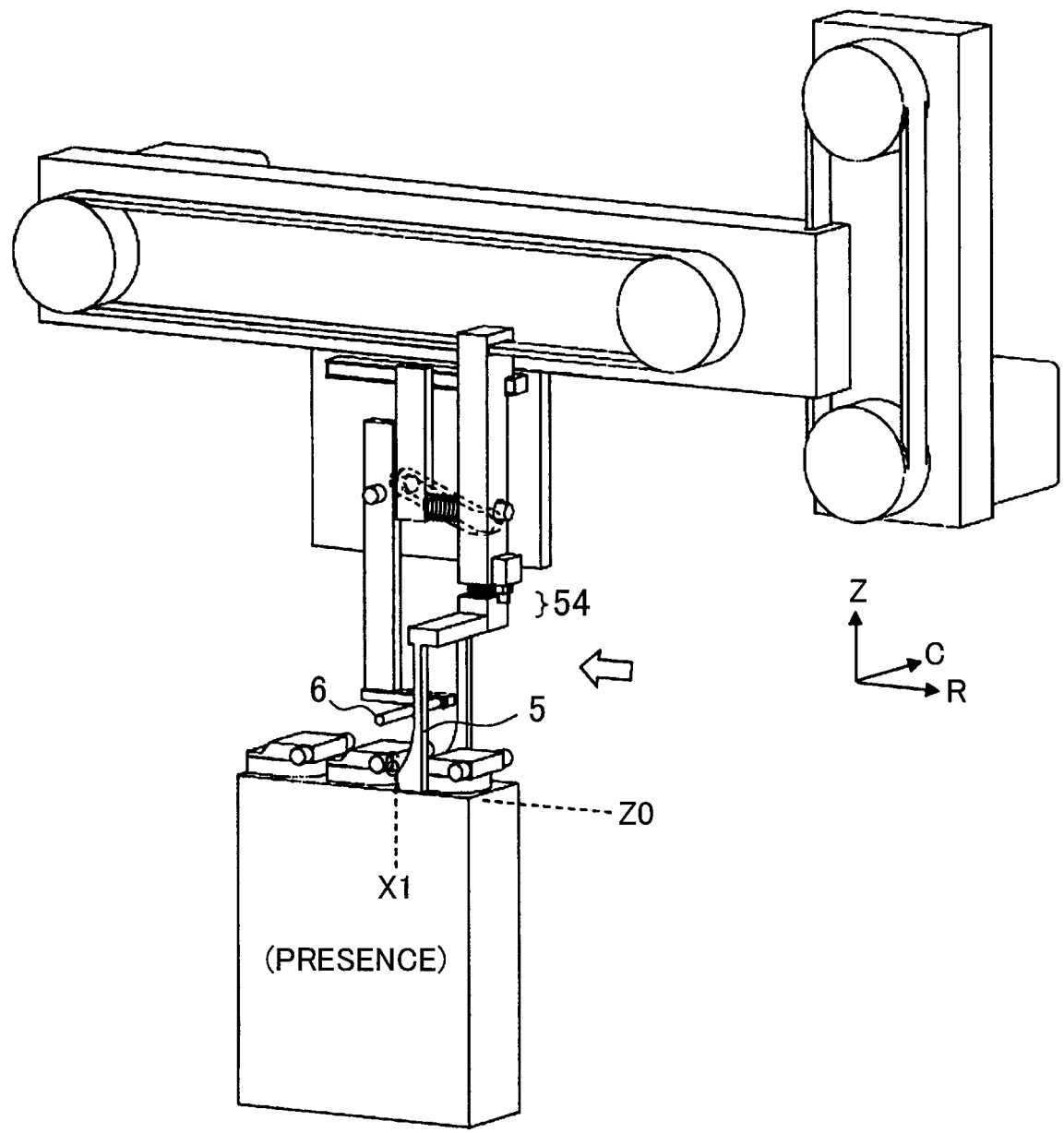

FIG. 40 is a view illustrating a first operation and a first state of a presence and absence determination in Embodiment 4.

Figure 41:
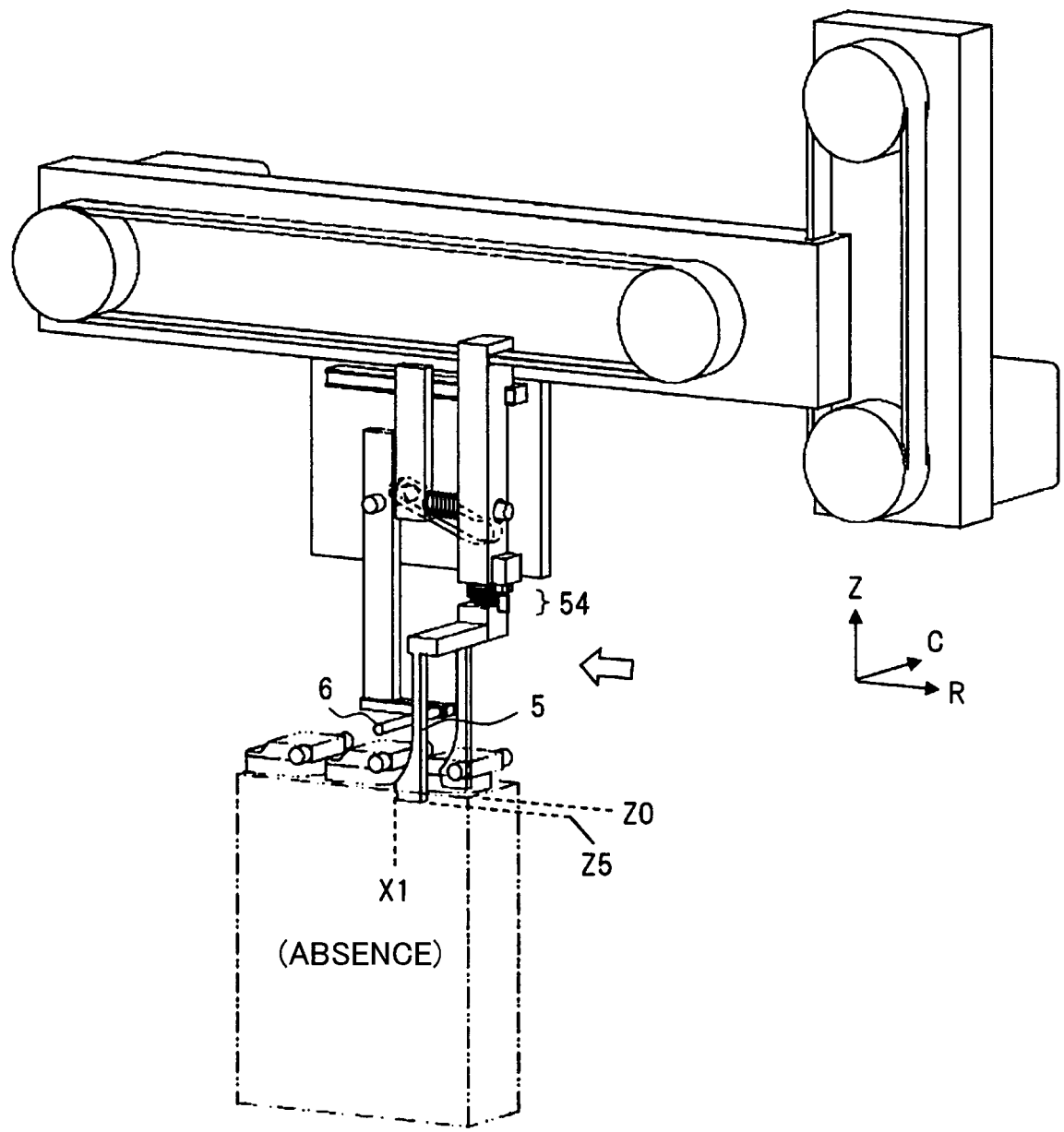

FIG. 41 is a view illustrating a second operation and a second state of the presence and absence determination in Embodiment 4.

Figure 42:
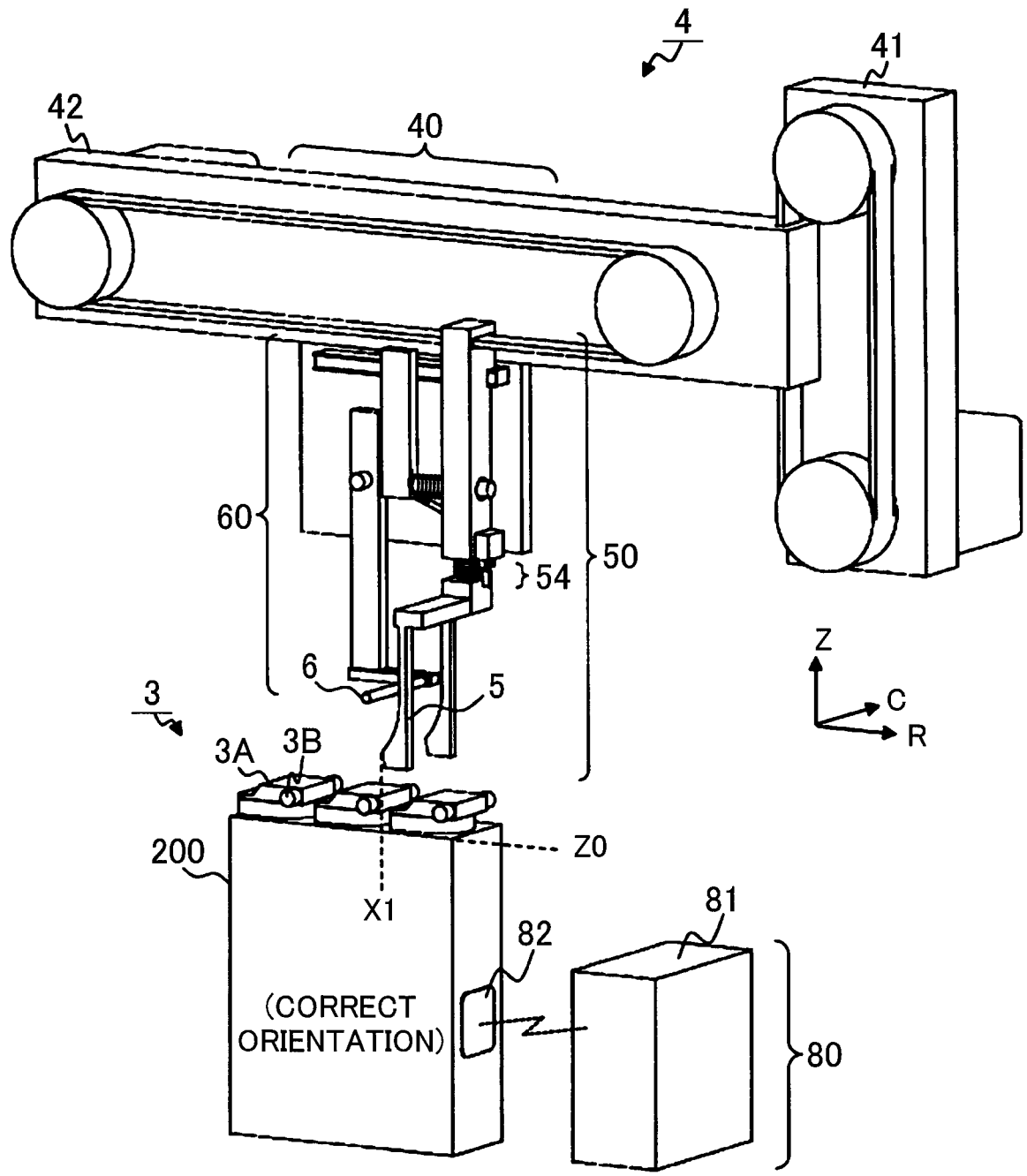

FIG. 42 is a view illustrating a structure of the lid opening and closing mechanism portion and a first operation and a first state of information reading in an automated analyzer of Embodiment 5 of the present invention.

Figure 43:
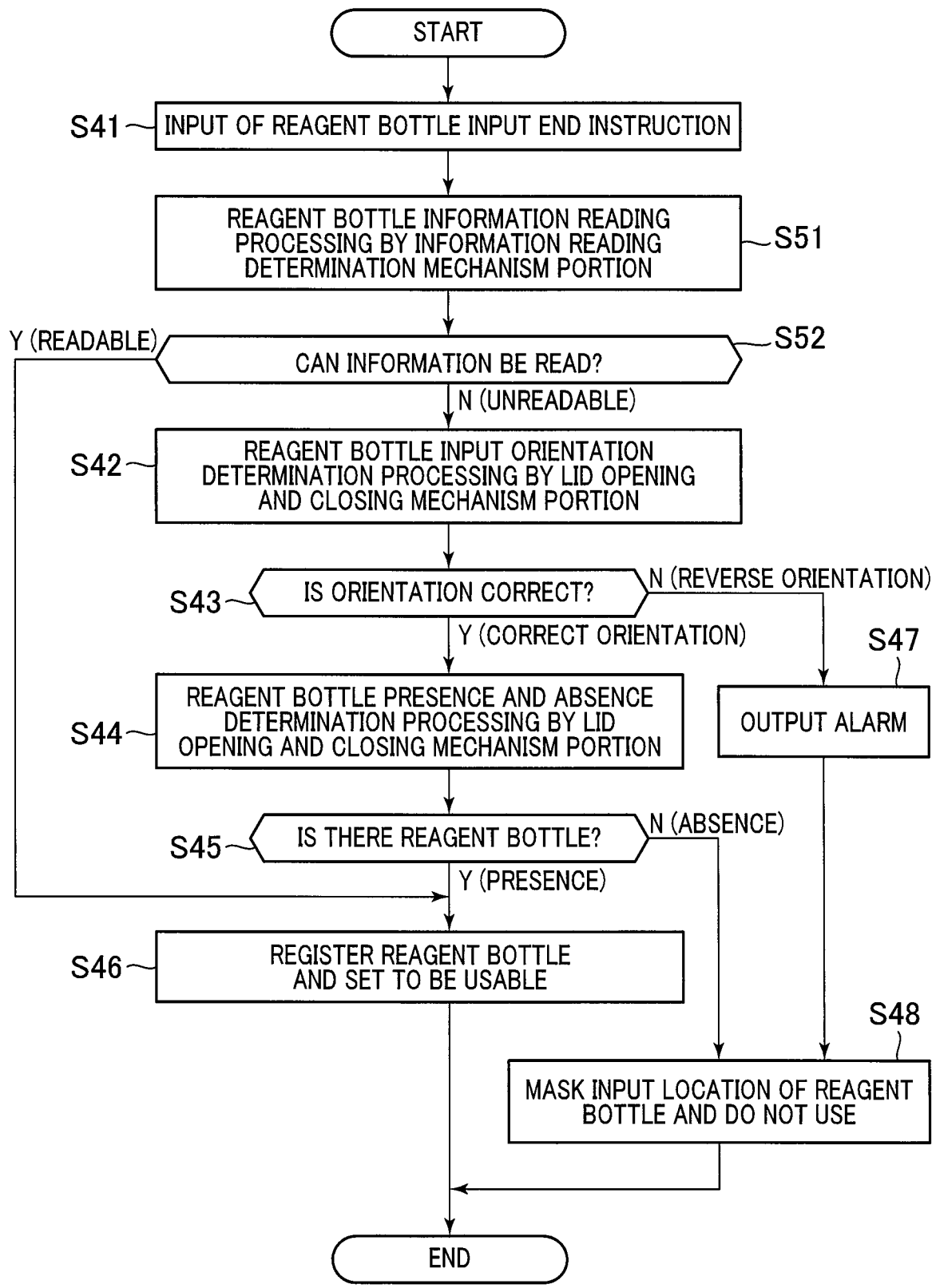

FIG. 43 is a diagram illustrating a flow of reagent bottle registration processing in Embodiment 4.

Figure 44:
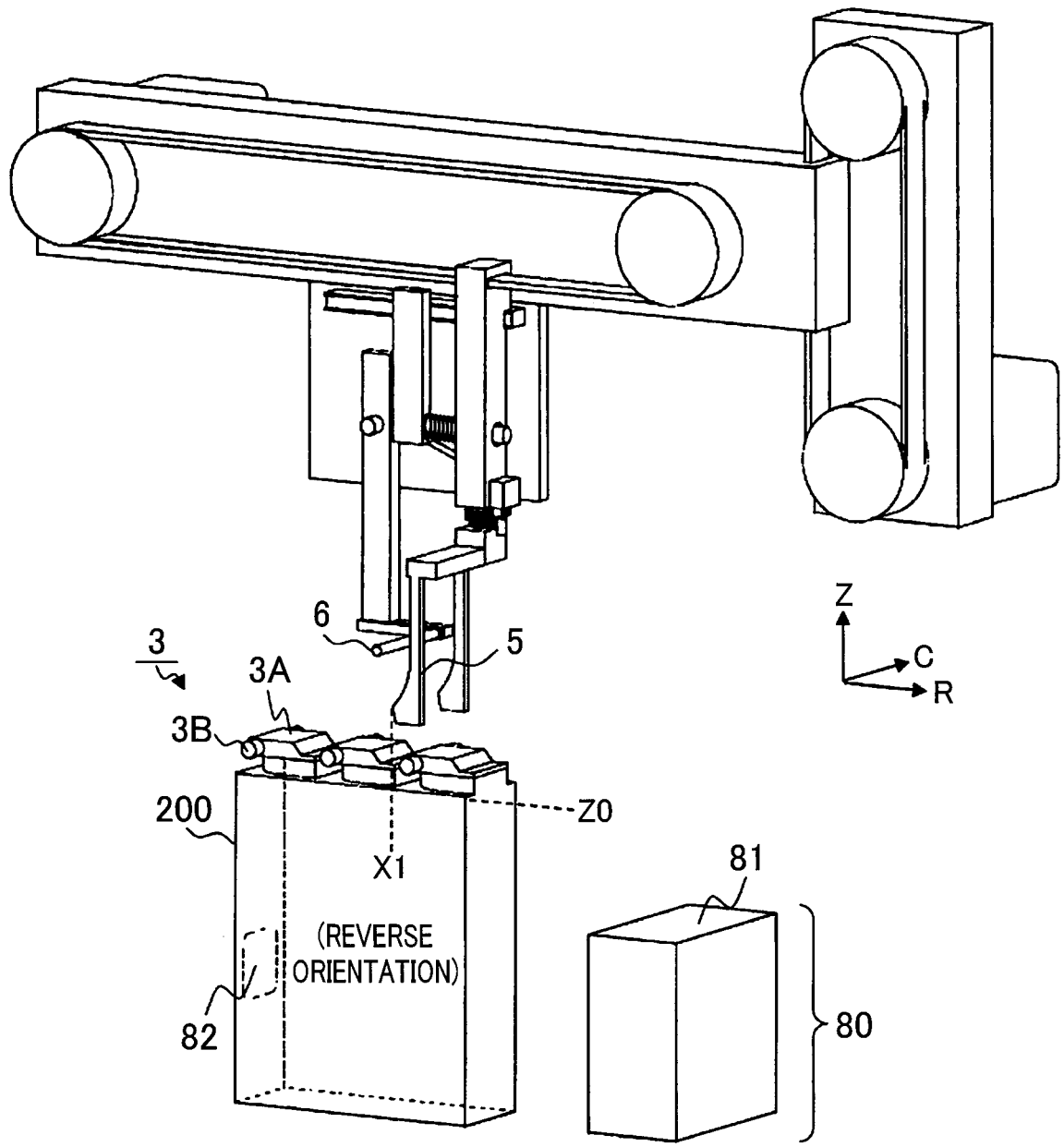

FIG. 44 is a view illustrating a second operation and a second state of information reading in Embodiment 4.

Figure 45:
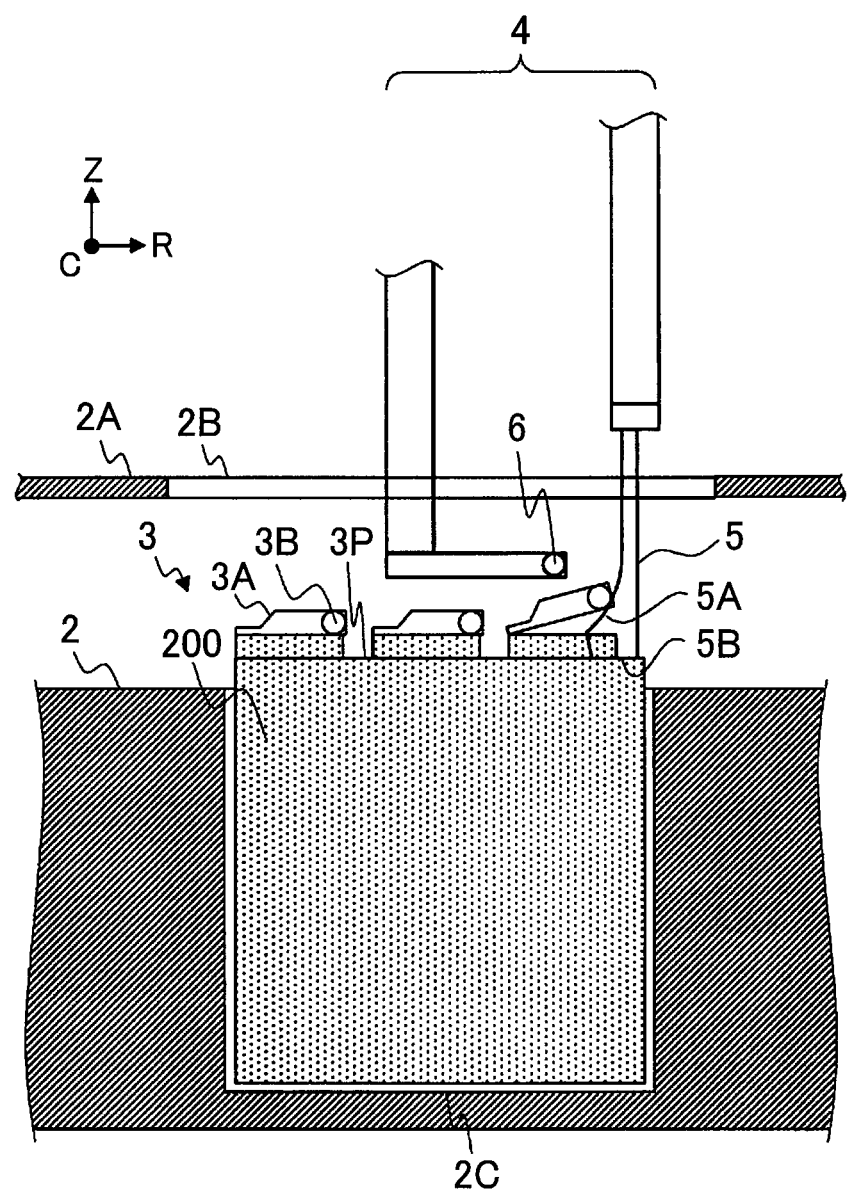

FIG. 45 is a plan view illustrating a configuration example of a disposition relationship between an arm and a pushing rod of lid opening and closing mechanism portion, a reagent bottle, a reagent disc, and the like in Example 1.

Figure 46:
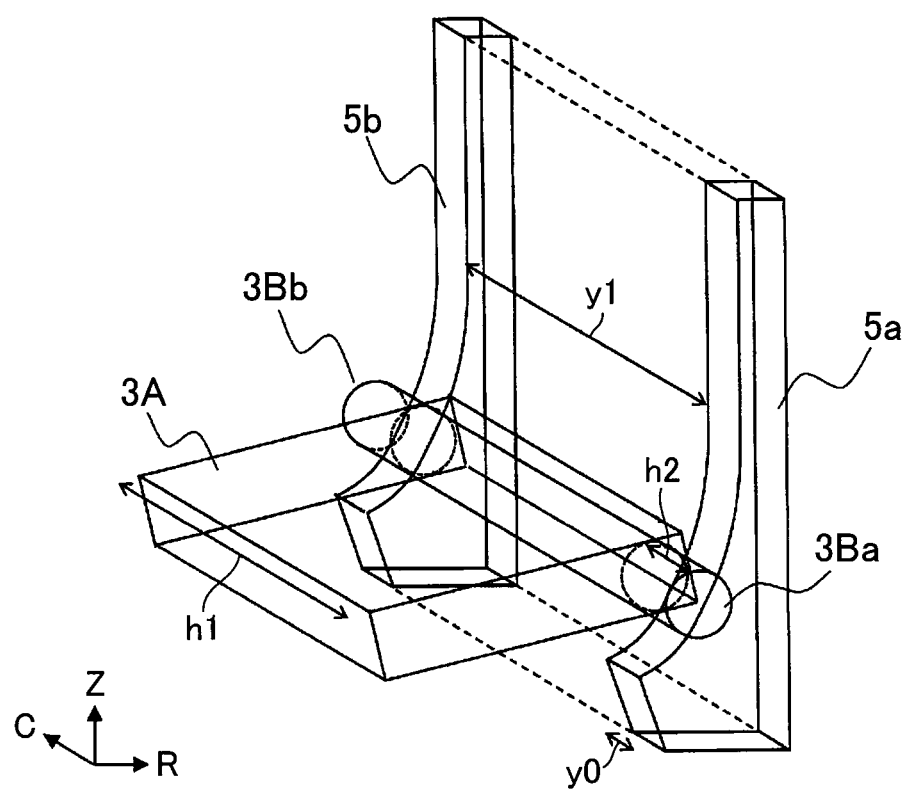

FIG. 46 is a perspective view illustrating an example of a contact state between an arm and a protrusion with each other of the fifth design example in Embodiment 1.

DESCRIPTION OF EMBODIMENTS

Hereafter, embodiments of the present invention are described in detail based on the drawings. The same portions are basically given the same reference signs in all the drawings for explanation of the embodiments and not explained repeatedly.

Embodiment 1

An automated analyzer of Embodiment 1 of the present invention is explained using FIGS. 1 to 20. The automated analyzer of Embodiment 1 includes a lid opening and closing mechanism portion which opens and closes a lid of a reagent bottle.

[Automatic Analytic Apparatus]

Figure 1:
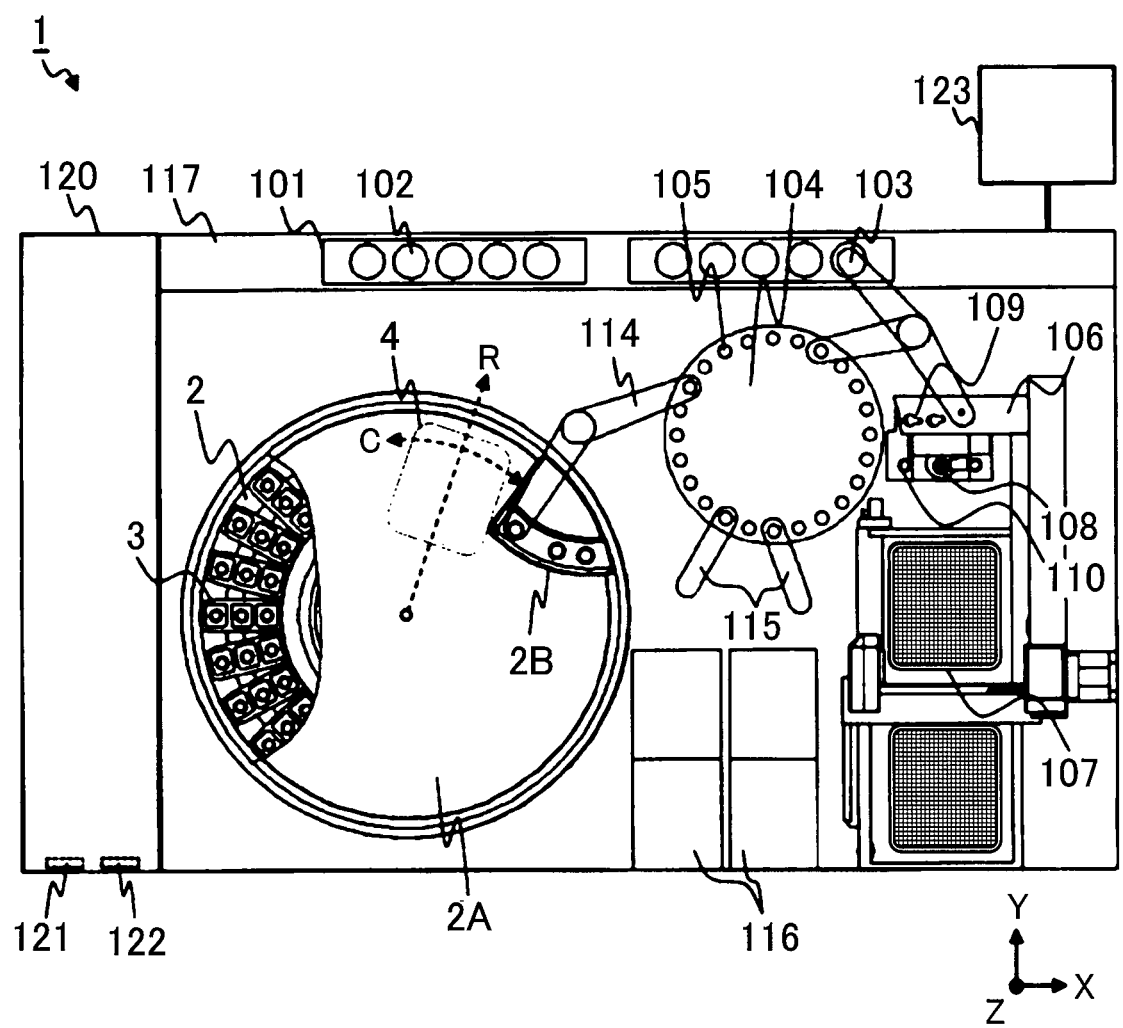
FIG. 1 is a view illustrating all configurations of an automated analyzer according to Embodiment 1 of the present invention.

FIG. 1 illustrates an overall structure of an analytic apparatus 1 which is an automated analyzer of Embodiment 1. FIG. 1 illustrates a top view of a structure of the automated analyzer installed in a XY horizontal plane and viewed from above (Z direction). The directions and coordinate system for explanation use (X, Y, Z). The X direction and Y direction are perpendicular to each other to form the horizontal plane. The X direction corresponds to the lateral width direction of the apparatus. The Y direction corresponds to the longitudinal width direction of the apparatus. The Z direction is vertical to the X direction and the Y direction to correspond to the height direction of the apparatus. On the horizontal plane, a radial direction R of a reagent disc 2 is a first horizontal direction, and a circumferential direction C of the reagent disc 2 is a second horizontal direction.

The analytic apparatus 1 includes a control computer 123, a rack transportation portion 120, an incubator disc 104, an reaction container transportation mechanism 106, a reaction container holding member 107, a reaction container agitation mechanism 108, a reaction container discard hole 109, a reagent disc 2, a lid opening and closing mechanism portion 4, a reagent dispensing nozzle 114, and a detecting unit 116.

The control computer 123 and the rack transportation portion 120 which stores a rack 101 are connected to the analytic apparatus 1 as the components. The control computer 123 controls each mechanism of the analytic apparatus 1 to realize operations of processes. The control computer 123 controls processes for analysis based on, for example, analysis request information. The processes include a reagent dispensing process. The control computer 123 provides an interface to a user.

The rack transportation portion 120 includes a power-on instruction portion 121 and power-off instruction portion 122 of the analytic apparatus 1. The power-on instruction portion 121 and power-off instruction portion 122 are, for example, buttons with which an operator (user who operates the analytic apparatus 1) can perform input operations. A display of the control computer 123 may include input portions corresponding to the power-on instruction portion 121 and power-off instruction portion 122.

A sample container 102 holding a sample (specimen) for analysis is installed to the rack 101. The rack 101 is moved to a sample dispensing location near the sample dispensing nozzle 103 by a rack transportation line 117.

Multiple reaction containers 105 can be installed to the circumferential portion of the incubator disc 104. The incubator disc 104 can rotate to move each reaction container 105 installed in the circumferential direction to a predetermined position.

The sample dispensing tip and reaction container transportation mechanism 106 are movable in each direction of three axes X, Y, and Z. The mechanism 106 moves in the range of predetermined positions of the sample dispensing tip and reaction container holding member 107, a reaction container agitation mechanism 108, a sample dispensing tip and reaction container discard hole 109, a sample dispensing tip installation position 110, and the incubator disc 104. Sample dispensing tips and the reaction containers 106 are thus transported.

The multiple unused reaction containers 105 and sample dispensing tips are installed to the sample dispensing tip and reaction container holding member 107. The sample dispensing tip and reaction container transportation mechanism 106 moves to above the sample dispensing tip and reaction container holding member 107. Then, after descending and holding the unused reaction container 105, the mechanism 106 ascends and moves to above a predetermined position of the incubator disc 104 and descends to install the reaction container 105.

Next, after moving to above the sample dispensing tip and reaction container holding member 107 and descending and holding the unused sample dispensing tip, the sample dispensing tip and reaction container transportation mechanism 106 ascends and moves to above the sample dispensing tip installation position 110 and descends and installs the sample dispensing tip.

The sample dispensing nozzle 103 can rotate in the horizontal plane and move upward and downward in the vertical direction. After rotating to move to above the sample dispensing tip installation position 110, the sample dispensing nozzle 103 descends and installs the sample dispensing tip to the top end of sample dispensing nozzle 103 by press-fitting. After moving to above the sample container 102 placed on the transportation rack 101, the sample dispensing nozzle 103 installing the sample dispensing tip descends and aspirates a sample held in that sample container 102 by a predetermined amount. After moving to above the incubator disc 104, the sample dispensing nozzle 103 that has aspirated the sample descends to expel the sample to the unused the reaction container 105 held by the incubator disc 104. When the sample expelling is completed, the sample dispensing nozzle 103 moves to above the sample dispensing tip and reaction container discard hole 109 to discard the used sample dispensing tip from the sample dispensing tip and reaction container discard hole 109.

The reagent disc 2 is a disc-shaped container installation portion to rotate as needed. The multiple reagent bottles 3 are installed to the circumferential portion of the reagent disc 2. The reagent disc 2 rotates around a central shaft in the vertical direction in the horizontal plane based on drive. The reagent bottles 3 arranged on the circumference of the reagent disc 2 thus moves in the circumferential direction C and are arranged in predetermined positions in response to processes.

Particularly, the reagent disc 2 can install, for example, the reagent bottles 3 each having one set of three container portions in the radial direction R. Each container portion has a lid. In the circumferential direction C, the multiple reagent bottles 3 can be installed. The number of containers installed to the reagent disc 2 or reagent bottle 3 can be not only three but also other numbers.

A cover 2A is provided to the upper portion of the reagent disc 2 for dust ingress protection. The space portion including the reagent disc 2 is kept warm or cool at a predetermined temperature. That is, the space portion including the reagent disc 2 functions also as a hot storage or a cold storage. An opening 2B is provided to part of the cover 2A. A lid opening and closing mechanism portion 4 is provided near the opening 2B. The upper sides of the reagent bottles 3 of the reagent disc 2 is exposed at the opening 2B.

The lid opening and closing mechanism portion 4 is a mechanism portion for opening and closing a lid of a container portion of the reagent bottle 3. The lid opening and closing mechanism portion 4 can open and close a lid of a selected target container portion of the target reagent bottle 3 in a predetermined range on the reagent disc 2.

The reagent dispensing nozzle 114 can rotate in the horizontal plane and move upward and downward in the vertical direction. After rotating to move to above the opening 2B of the cover 2A, the reagent dispensing nozzle 114 descends to immerse the top end of the reagent dispensing nozzle 114 in a reagent in the reagent bottle 3 whose lids are opened by the lid opening and closing mechanism portion 4 and to then aspirate the reagent by a predetermined amount. Subsequently, after ascending, the reagent dispensing nozzle 114 rotates to move to above a predetermined position of the incubator disc 104 and ejects the reagent to the reaction container 105.

The reaction container 105 into which the sample and reagent have been discharged moves to a predetermined position by rotation of the incubator disc 104. The reaction container 105 is then transported to the reaction container agitation mechanism 108 by the sample dispensing tip and reaction container transportation mechanism 106. The reaction container agitation mechanism 108 adds rotary movement to the reaction container 105 to agitate and mix the sample and reagent in the reaction container 105. Thus, reaction liquid is generated in the reaction container 105.

The reaction container 105 in which agitation is complete is returned to a predetermined position of the incubator disc 104 by the sample dispensing tip and reaction container transportation mechanism 106. The reaction container transportation mechanism 115 transports the reaction container 105 between the incubator disc 104 and detecting unit 116. The reaction container transportation mechanism 115 grips the reaction container 105, ascends, and rotates to transport the reaction container 105 to the detecting unit 116. The reaction container 105 is analyzed in the detecting unit 116. The reaction container 105 from which reaction liquid has been aspirated moves to a predetermined position by rotation of the incubator disc 104. The reaction container 105 moves from the incubator disc 104 to above the sample dispensing tip and reaction container discard hole 109 by the sample dispensing tip and reaction container transportation mechanism 106 and is discarded from the discard hole. The reagent bottle 3 and the lid opening and closing mechanism portion 4 are mainly explained below.

[Reagent Bottle (1)]

Figure 2:
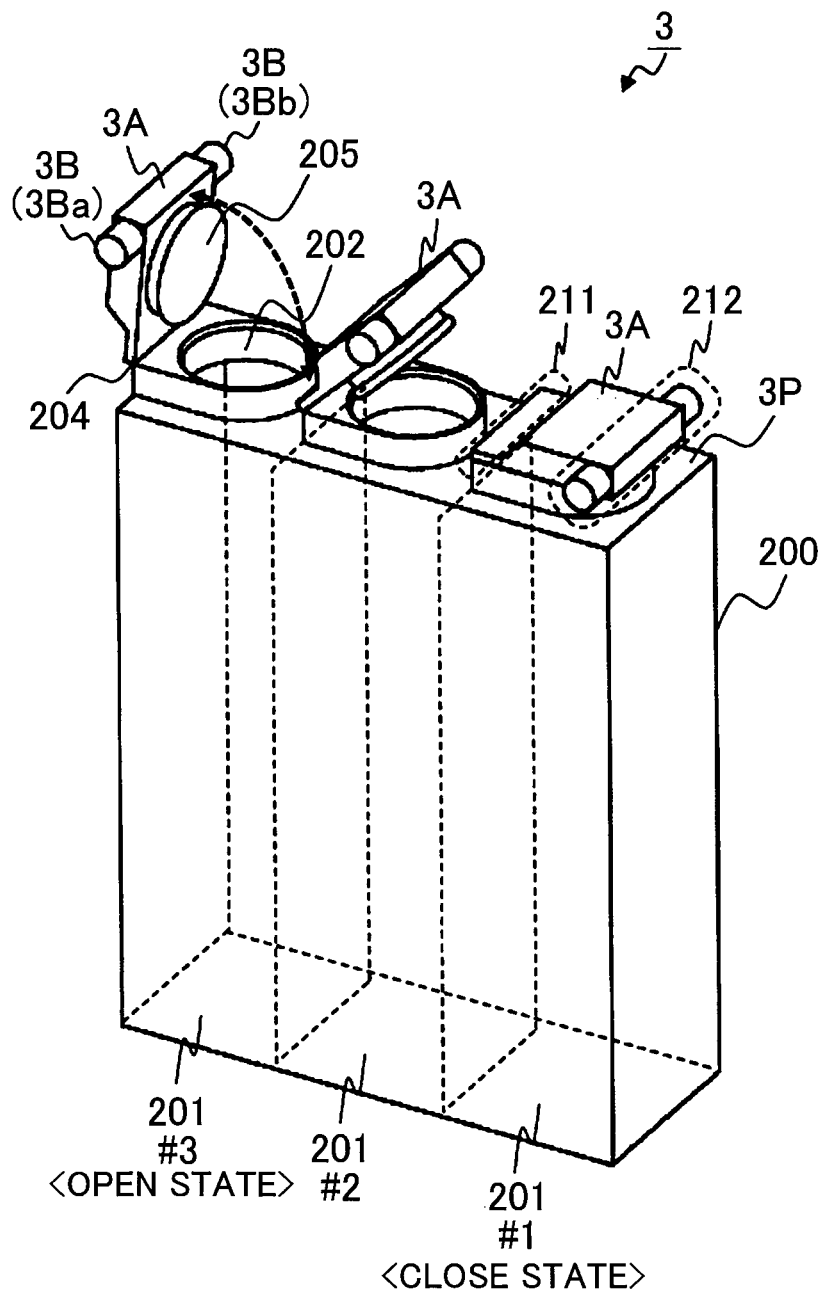
FIG. 2 is a view illustrating a structure of a reagent bottle in Embodiment 1.

FIG. 2 illustrates, as a perspective view, the overview of a structure of lid opening and closing of the reagent bottle 3 in Embodiment 1. This reagent bottle 3 has a structure where a lid 3A is opened and closed by rotating the lid 3A by use of a hinge portion 204 as a fulcrum (rotation shaft). In the present structure, the reagent bottle 3 mounts three container portions 201 as one set in one body 200 having a rectangular parallelepiped shape. The body 200 is installed to the reagent disc 2 (after-mentioned FIG. 45). The inside of the body 200 is divided into three spaces corresponding to the three container portions 201. Positions of the divisions are indicated as broken lines. Although the space of one container portion 201 has, for example, a rectangular parallelepiped shape and may have a cylindrical shape or the like. The container portions 201 contain reagents. The three container portions 201 of the reagent bottle 3 may contain different reagents. The reagent bottle 3 on the reagent disc 2 has the three container portions 201 arranged at a predetermined interval in the radial direction R. One container portion 201 is arranged in the circumferential direction C.

The reagent bottle 3 has the body 200, the container portion 201, an opening 202, the lid 3A, the hinge portion 204, a catch portion 205, and protrusions 3B.

An upper surface 3P at the upper portion of the body 200 has the opening 202 per each container portion 201. The opening 202 is a dispensing opening having, for example, a circular shape. The opening 202 is provided to a convex portion secured to project upward from the upper surface 3P. The convex portion has a predetermined thickness.

The lid 3A is provided to the opening 202 of each container portion 201. The lid 3A has a generally flat plate shape. The upper surface of the lid 3A has a generally rectangle shape. The lower surface of the lid 3A has the catch portion 205 having a circular shape corresponding to the circle shape of the opening 202. The catch portion 205 is formed of an elastic body or the like. The lid 3A covers the opening 202 in the close state. When the lid 3A is in the close state, the catch portion 205 contacts and mates with the opening 202. The container portion 201 is thus sealed. Evaporation and degradation of a reagent are prevented in the close state of the lid 3A.

A side portion 211 of one end (left in figure) of the lid 3A in the radial direction R is connected to each convex portion including the opening 202 at the hinge portion 204. The hinge portion 204 extends in the circumferential direction C to be a rotational rotation shaft. A side portion 212 of the other end (right side in figure) of the lid 3A in the radial direction R has protrusions 3B. The lid 3A can be opened and closed in the range of a predetermined angle relative to the convex portion including the opening 202 via the hinge portion 204. The side portion 212 and protrusion 3B move in the arc when the lid 3A is opened or closed. The broken-line arrow illustrates the opening and closing direction of the lid 3A and the arc of the protrusion 3B or the like.

The lid 3A is opened in the open state without covering the opening 202. For example, the lid 3A of the container portion 201 of #1 on the right side is in the close state. The lid 3A of the container portion 201 of #3 on the left side is in the open state. The container portion 201 of #2 in the middle illustrates a state in the middle of transition of the lid 3A between the open state and close state.

The protrusion 3B is a lid protrusion portion used for opening and closing the lid 3A. Two protrusions 3Ba and 3Bb are provided to each end of the side portion 212 of one lid 3A in the circumferential direction C as the protrusions 3B. The present structure uses a cylindrical protrusion that protrudes in the circumferential direction C from the side portion 212. This is not limiting. The protrusion 3B may use one rod which penetrates the side portion 212.

The direction of the lid 3A of the reagent bottle 3 is defined as a predetermined direction. In the correct direction, in the radial direction R, on the start side of the arrow corresponding to the illustrated left side, the side portion 211 and hinge portion 204 on one end of the lid 3A are located. On the top end side of the arrow corresponding to the illustrated right side, the side portion 212 on the other side of the lid 3A is located. For example, the left side in the radial direction R corresponds to the inner circumference side of the reagent disc 2 and the right side in the radial direction R corresponds to the outer circumference side of the reagent disc 2.

Figure 4:
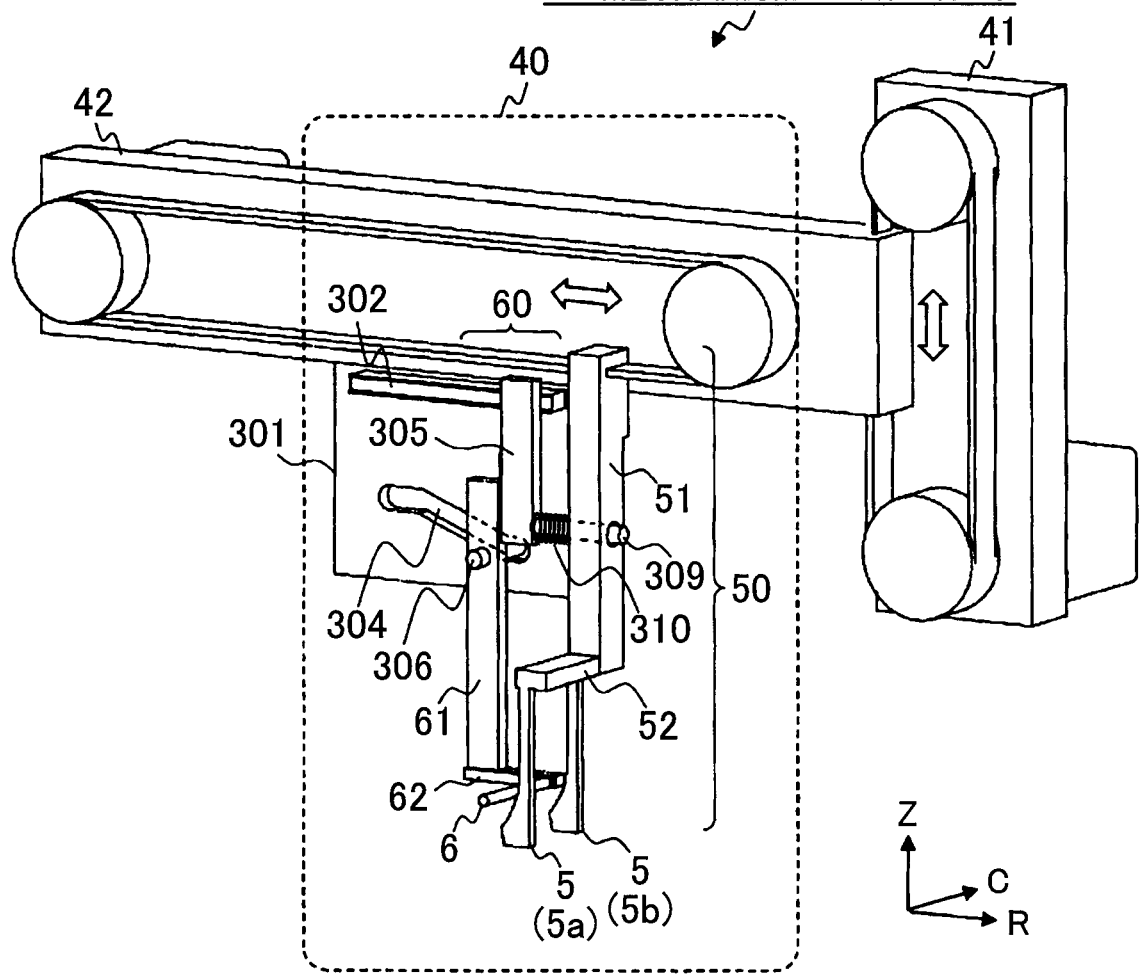
FIG. 4 is a view illustrating a structure of a lid opening and closing mechanism portion in Embodiment 1.

Arms 5 or the like of the lid opening and closing mechanism portion 4 have a structure corresponding to the lid opening and closing mechanism including the protrusion 3B of the above reagent bottle 3 (after-mentioned FIG. 4). The reagent bottle 3 can use various structures other than the present structure. For example, each of three containers in the body 200 may be detachable. Alternatively, each container may be directly attachable to or detachable from the reagent disc 2. The number of the container portions 201 mounted to the body 200 may be other than three.

[Reagent Bottle (2)]

Figure 3:
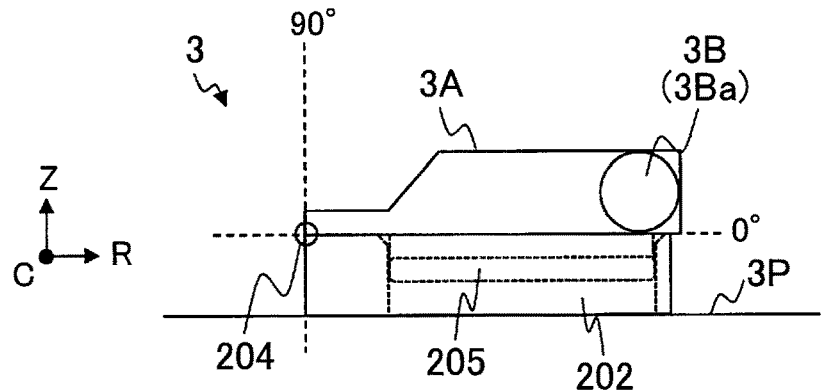
FIG. 3 is a view illustrating details of opening and closing of a lid of the reagent bottle in Embodiment 1.
Figure 3:
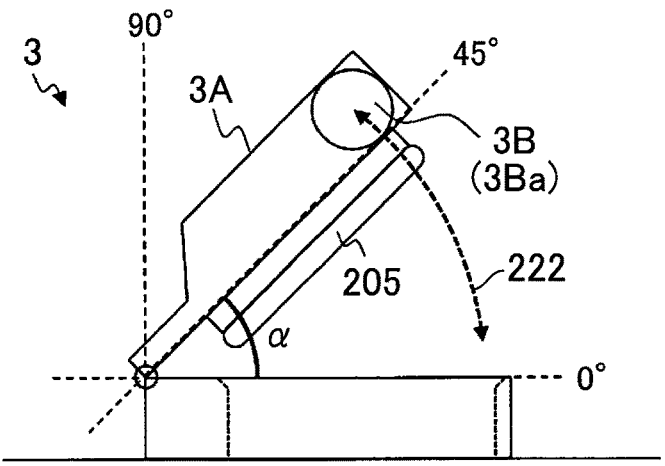
Figure 3:
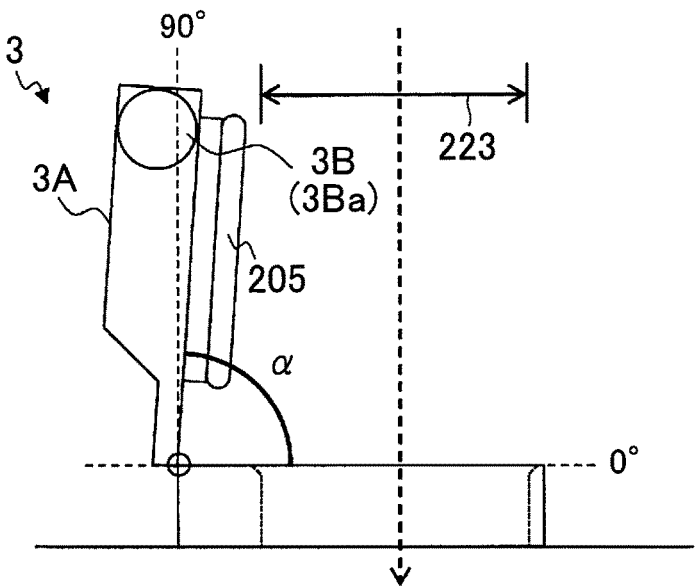

FIG. 3 illustrates an angle or the like of opening and closing of the lid 3A as detail of the lid 3A of the reagent bottle 3. FIG. 3 illustrate the surrounding of the lid 3A as a flat surface viewed from the side surface (the circumferential direction C). The angle of opening and closing of the lid 3A is a lid angle $\alpha$. The lid angle $\alpha$ is set as 0 angles with respect to the horizontal plane. FIG. 3(A) illustrates a state where the lid 3A corresponding to the container portion 201 of #1 of FIG. 2 is closed and the lid angle $\alpha$ is 0 degrees. In this close state, the side portion 212 contacts the convex portion and the catch portion 205 mates with the opening 202.

FIG. 3(B) illustrates a state where the lid 3A corresponding to the container portion 201 of #2 of FIG. 2 is opened to some extent and the lid angle $\alpha$ is about 45 degrees. An arc 222 in movement of the protrusion 3B is also illustrated.

FIG. 3(C) illustrates an open state of the lid 3A corresponding to the container portion 201 of #3 FIG. 2 and the lid angle $\alpha$ is generally 90 degrees (about 85 to 89 degrees). The open state of the lid 3A may be defined as a state where the lid angle $\alpha$ is 90 degrees. A range 223 corresponds to the width of the opening 202 and has no components of the lid 3A. In the open state of the lid 3A, the dispensing nozzle or the like can access the opening 202 or lower part in the vertical direction within the range 223.

[Lid Opening and Closing Mechanism Portion (1)]

The lid opening and closing mechanism portion 4 is explained in detail using FIG. 4 or the following ones. FIG. 4 illustrates a structure of the lid opening and closing mechanism portion 4 as a perspective view. FIG. 4 illustrates a structure mainly viewed from the circumferential direction C. The lid opening and closing mechanism portion 4 has a lid opening and closing portion 40, a vertical driving portion 41, and a horizontal driving portion 42. The lid opening and closing portion 40 has an arm portion 50 and a pushing portion 60 basically.

The vertical driving portion 41 moves the horizontal driving portion 42 upward and downward in the vertical direction based on control. The horizontal driving portion 22 moves the lid opening and closing portion 40 leftward and rightward in the first horizontal direction (radial direction R) based on control. The first horizontal direction (the radial direction R) corresponds to the orientation of the lid 3A of FIG. 2. A known motor, a known belt conveyor, or the like are applicable as a component of the vertical driving portion 41 or horizontal driving portion 42.

The arm portion 50 is a lid opening portion and has a base portion 51, a base portion 52, and arms 5. The arms 5 include two arms 5a and 5b. The base portion 51 extends in the vertical direction. The upper end of the base portion 51 is connected to the horizontal driving portion 41. A connecting pin 309 is provided in the middle of the base portion 51. The base portion 52 is secured to the lower end of the base portion 51. The base portion 52 extends in the circumferential direction C and has two positions to which the two arms 5a and 5a are secured. The arm 5 is a component extending mainly in the vertical direction. The arms 5 include the two arms 5a and 5b as one set in the circumferential direction C. The positions of the two arms 5a and 5b correspond to the positions of the protrusions 3B (one set of the two protrusions 3Ba and 3Bb) of the lid 3A of FIG. 2. A structure of the below-mentioned fifth design example is applied to the arm 5 of FIG. 4 of Embodiment 1.

The pushing portion 60 is a lid closing portion and has a base portion 61, a base portion 62, and a pushing bar 6. The base portion 61 is movably connected to one side surface of a rail 305. The base portion 61 extends in the vertical direction. A guide pin 306 is provided in the middle of the base portion 61. The guide pin 306 connects the base portion 61 and a guide 304 to each other. The base portion 62 is secured to the lower end of the base portion 61. The base portion 62 extends in the radial direction R. The pushing bar 6 is secured to the right end of the base portion 62. The pushing bar 6 extends in the circumferential direction C.

The base portion 51 is movably connected to the horizontal driving portion 42. The horizontal driving portion 42 moves the base portion 51 in the first horizontal direction. The arm 5 connected to the base portion 51 moves in the first horizontal direction. A base plate 301 is secured to the horizontal driving portion 42. The base plate 301 has a rail 302 and the guide 304. The guide 304 and rail 305 move the pushing bar 6 in the vertical direction and the first horizontal direction. The rail 305 is movably connected to the rail 302. The rail 305 moves relative to the rail 302 in the first horizontal direction.

The base portion 51 and rail 305 move in the first horizontal direction to move the pushing bar 6 connected to the base portion 51 and rail 305 moves in the first horizontal direction. The base portion 61 is movably connected to the guide 304 via the guide pin 306. The guide 304 is provided as a hole portion of the base plate 301 to restrict the movement of the pushing bar 6. The hole portion includes a portion formed in the illustrated oblique direction. The base portion 61 moves relative to the rail 306 in the vertical direction. The base portion 61 moves relative to the guide 304 in the oblique direction including the first horizontal direction and the vertical direction.

The base portion 51 and rail 305 are connected to each other via the connecting pin 309 and spring 310. The connecting pin 309 is a component which connects between the base portion 61 and rail 305. A spring 310 is provided between the base portion 51 and rail 305 and in the middle of the connecting pin 309. The spring 310 keeps constant the pitch of a connecting portion (part of the connecting pin 309) between the rail 305 on the side of the pushing bar 6 and the base portion 51 on the side of the arm 5. That is, a predetermined positional relationship is usually maintained between the arm 5 and pushing bar 6 by a predetermined pitch. When the spring 310 is applied with force to compress, the positional relationship between the arm 5 and pushing bar 6 changes.

The arm 5 moves by the drive of the vertical driving portion 41 in the vertical direction and by the drive of the horizontal driving portion 42 in the first horizontal direction. The lower end portion of the arm 5 contacts the protrusion 3B of the lid 3A of the reagent bottle 3 in response to the movement in the first horizontal direction (below-mentioned FIG. 6 or the like). The arm 5a contacts the protrusion 3Ba and the arm 5b contacts the protrusion 3Bb. The lid 3A can be opened with the movement of the arm 5.

The pushing bar 6 pushes the upper surface of the lid 3A not to excessively open the lid 3A. The pushing bar 6 pushes the upper surface of the lid 3A to close the lid 3A. That is, the pushing bar 6 adjusts the angle in opening and closing the lid 3A. In response to state, the pushing bar 6 may or may not contact the top surface of the lid 3A. The pushing bar 6 moves by the drive of the vertical driving portion 41 in the vertical direction and by the drive of horizontal driving portion 42 in the first horizontal direction. The pushing bar 6 has a predetermined positional relationship with the arm 5 connected to the pushing bar 6 via each component. Fundamentally, the pushing bar 6 is located near above the diagonal left of the lower end portion of the arm 5 (FIG. 45 or the like).

[Lid Opening and Closing Mechanism Portion (2)]

FIG. 45 schematically illustrates a structure sample of arrangement relationship among the arm 5 and pushing bar 6 of the lid opening and closing mechanism portion 4, the reagent bottle 3, the reagent disc 2, and the like in Embodiment 1 as a flat plane viewed from the circumferential direction C. The circumferential portion of the upper surface of the reagent disc 2 has a bottle securing portion 2C where the reagent bottle 3 can be input and installed. The body 200 of the reagent bottle 3 is inserted in the bottle securing portion 2C and secured to be hardly move. In this state, the upper surface 3P of the reagent bottle 3 is arranged to an upper position than the upper surface of the reagent disc 2. The convex portion corresponding to the opening 202 and the lid 3A upwardly project from the upper surface 3P. The opening 2B of the cover 2A is provided above the reagent bottle securing portion 2C and the reagent bottle 3. The arm 5 and pushing bar 6 can access the reagent bottle 3 through the opening 2B. The opening 2B is closed if unnecessary.

FIG. 45 illustrates a state where the lid 3A on the right side of the reagent bottle 3 is opened by the arm 5 a little. A bottle contacting portion 5B (FIG. 5) of the arm 5 contacts or is close to the upper surface 3P. The protrusion 3B contacts the protrusion contacting portion 5A (FIG. 5) of the arm 5. The pushing bar 6 is arranged diagonally left-above the protrusion contacting portion 5A. The positional relationship between this the arm 5 and the pushing bar 6 is preferably designed to achieve the below-mentioned function.

The positions and movement amounts of the arm 5 and pushing bar 6 can be adjusted by setting the analytic apparatus 1. The degree of opening and closing the lid 3A can be thus adjusted, for example.

The reagent bottle 3 may include one container portion 201. The one container may be installed to the bottle securing portion 2C of the reagent disc 2. The container not including the catch portion 205 can also be used.

[Arm—First Design Example (1)]

Figure 5:
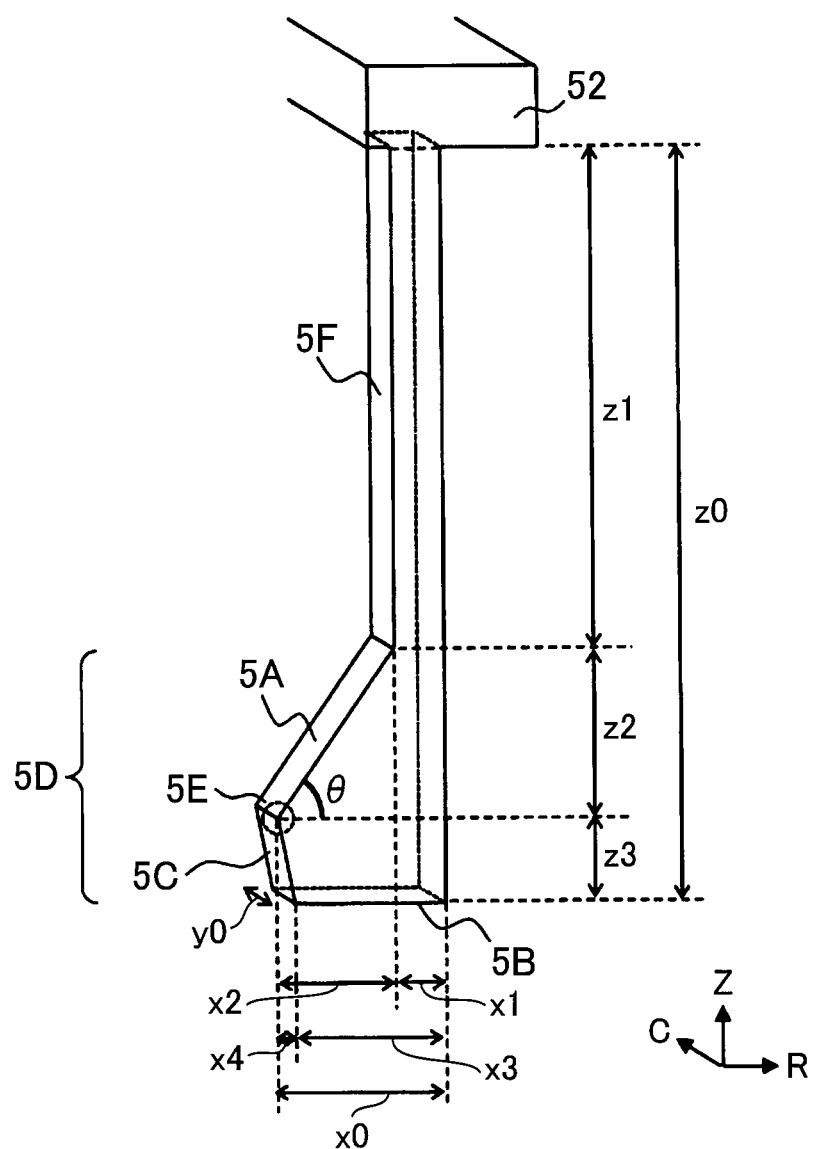
FIG. 5 is a view illustrating a configuration of an arm of a first design example in Embodiment 1.

FIG. 5 illustrates detail of the arm 5 of the first design example of the arm portion 50 in Embodiment 1 as a perspective view from the circumferential direction C. The arm 5 generally has a shaft portion 5F and a lower end portion 5D. The lower end portion 5D has the protrusion contacting portion 5A, a bottle pushing portion 5B, and an insertion portion 5C. The arm 5 has a length z0 in the vertical direction. The arm 5 has a predetermined width y0 in the circumferential direction C. The width y0 corresponds to the width of the protrusion 3B and the width of part of the upper surface 3P. In the radial direction R, the arm 5 has a width x1 in the shaft portion 5F and has a width x0 as the whole including the lower end portion 5D.

The protrusion contacting portion 5A is a portion including a first surface (also called a contacting surface) that contacts the protrusion 3B. The first surface is a planar surface. The first surface has an angle θ relative to the horizontal plane. The angle θ is greater than zero degrees and less than 90 degrees when the horizontal plane is set as zero degrees. The structure of FIG. 5 illustrates a case where the angle θ is about 60 degrees as the first design example. The protrusion contacting portion 5A protrudes horizontally from the shaft portion 5F by a width x2. The protrusion contacting portion 5A has a length z2 in the vertical direction.

The bottle pushing portion 5B is a part including a second surface that contacts or adjoins the upper surface 3P of the reagent bottle 3. The second surface is a planar surface, has zero degrees relative to the horizontal plane, and has a width x3.

The insertion portion 5C is a portion including a planar surface (third surface) between the protrusion contacting portion 5A and the bottle contacting portion 5B and is a portion to be inserted to the lower side of the protrusion 3B. The insertion portion 5C has a width x4 and has a length z3 in the vertical direction. The angle of the third surface relative to the horizontal plane is set as a greater angle than 90 degrees and may be 90 degrees. A top end portion 5E which is a connection place between the protrusion contacting portion 5A and the insertion portion 5C is located leftmost in the first horizontal direction and contacts the protrusion 3B first.

The bottle pushing portion 5B and insertion portion 3C have planar surface shapes but this is not limiting. The bottle pushing portion 5B and insertion portion 3C may have curved-surface shapes.

[Arm—First Design Example (2)]

Figure 6:
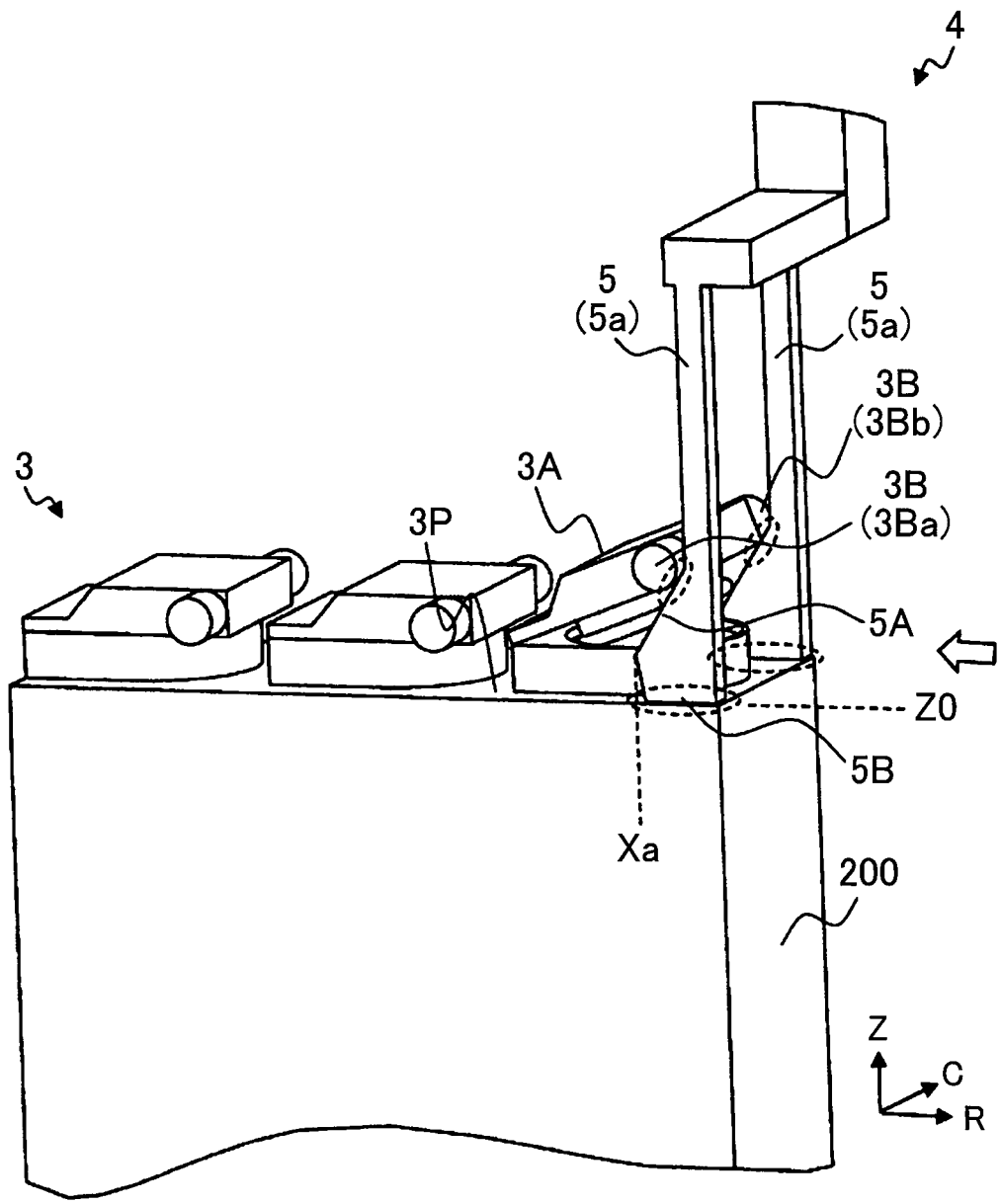
FIG. 6 is a view illustrating a state at the time of contact between the arm of the first design example and the lid of the reagent bottle with each other in Embodiment 1.

FIG. 6 illustrates, as a perspective view, an example of a state where the protrusion contacting portion 5A of the lower end portion 5D of the arm 5 of the first design example contacts the protrusion 3B of the lid 3A when the lid 3A is opened and closed. The arm 5 descends and the bottle pushing portion 5B contacts or approaches the upper surface 3P by the drive of the vertical driving portion 41 in the vertical direction. A position Z0 illustrates the height position of the upper surface 3P. By the drive of the horizontal driving portion 42 in the first horizontal direction, the lower end portion 5D moves leftward in the first horizontal direction (radial direction R). Then, the first surface of the protrusion contacting portion 5A contacts the protrusion 3B. A position Xa illustrates the position of the top end portion 5E in the first horizontal direction. The protrusion 3B moves upward in the vertical direction along the first surface of the protrusion contacting portion 5A in the arc as the arm 5 moves in the first horizontal direction. In this case, the first surface has the angle θ. The force of horizontal movement of the arm 5 is thus converted into the force that pushes the protrusion 3B upward in the vertical direction. While contacting along the first surface, the protrusion 3B is pushed upward in the vertical direction. The lid 3A is thus opened.

In this lid opening, upward force is applied to the body of the reagent bottle 3 through the lid 3A in the vertical direction. Downward pushing force is applied to part of the upper surface 3P of the reagent bottle 3 in the vertical direction by the bottle pushing portion 5B contacting the upper surface 3P. Therefore, the reagent bottle 3 itself does not move upward in the vertical direction as the protrusion 3B moves upward.

[Arm—Second Design Example]

Figure 7:
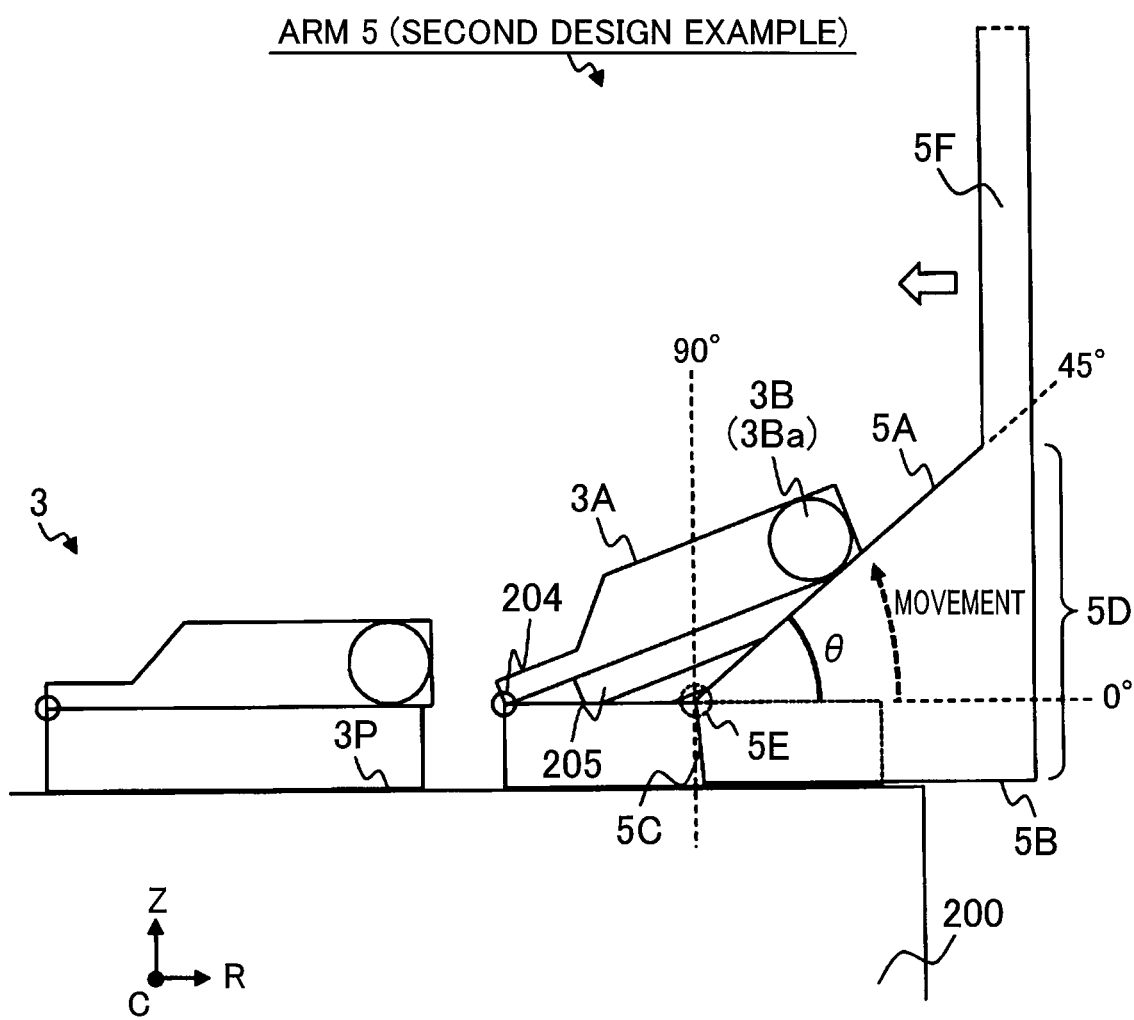
FIG. 7 is a view illustrating a configuration of an arm of a second design example in Embodiment 1.

FIG. 7 illustrates a structure of the arm 5 of the second design example as a modification of Embodiment 1. FIG. 7 illustrates an example of a state where the protrusion contacting portion 5A of the lower end portion 5D of the arm 5 contacts the protrusion 3B of the lid 3A when the lid 3A is opened or closed as a planar surface viewed from the circumferential direction C. In the arm 5 of the second design example, the angle θ is about 45 degrees less than the angle θ of the first design example of FIG. 5.

As in FIG. 7, in comparison with FIGS. 5 and 6, there is an advantage that smaller force is required to push the protrusion 3B upward as the angle θ is smaller. The movement distance in the first horizontal direction and the width x2 of the first surface of the protrusion contacting portion 5A are required to be greater to open the lid 3B. This is disadvantageous in size reduction of the arm 5.

[Arm—Third Design Example]

Figure 8:
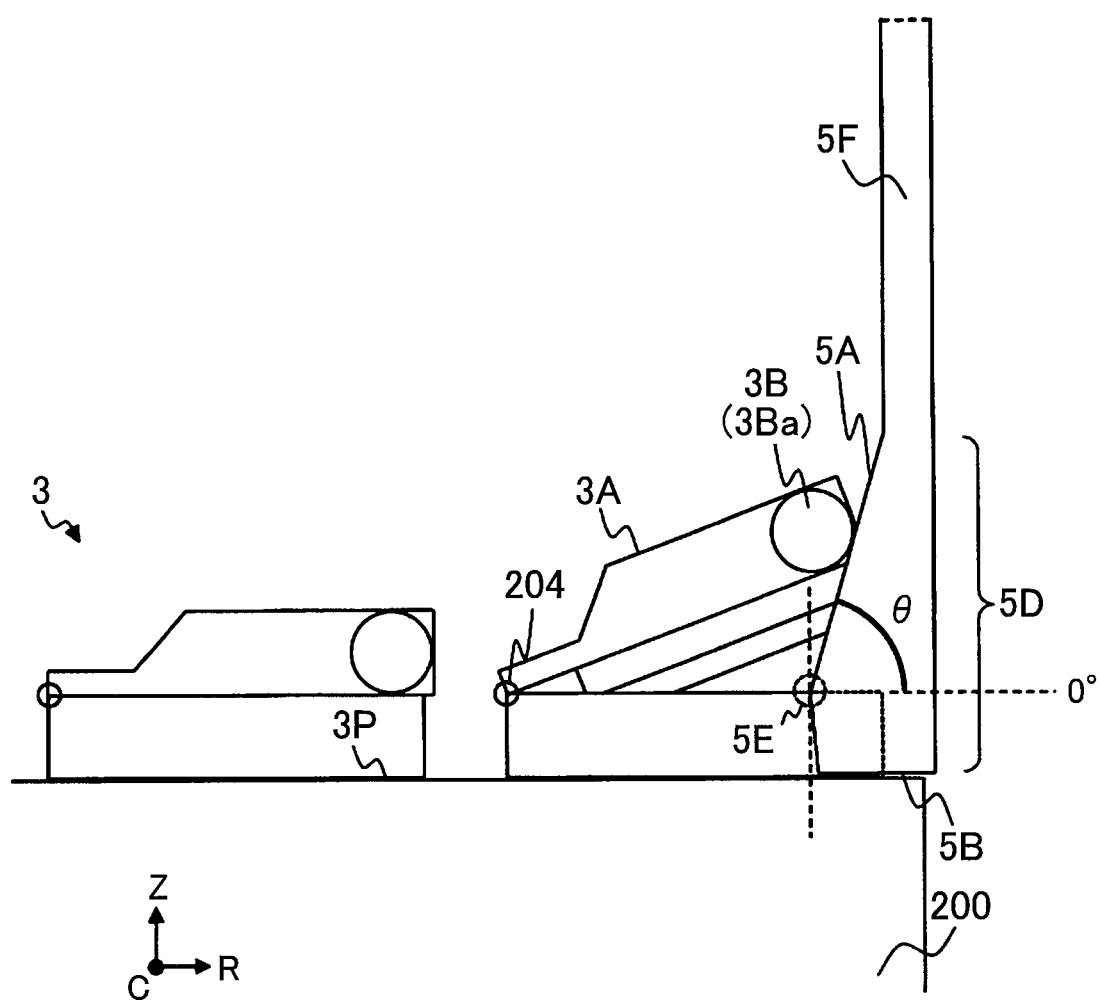
FIG. 8 is a view illustrating a configuration of an arm of a third design example in Embodiment 1.

FIG. 8 illustrates a structure of the arm 5 of the third design example as a modification of Embodiment 1. FIG. 8 illustrates an example of a state where the arm 5 and the protrusion 3B contact each other. In the arm 5 of the third design example, the angle θ is about 75 degrees, which is larger than the angle θ of the first design example of FIG. 5.

As in FIG. 8, in comparison with FIGS. 5 and 6, greater force is required to push the protrusion 3B upward as the angle θ is greater. This is disadvantageous. Instead, the movement distance in the first horizontal direction and the width x2 of the protrusion contacting portion 5A are required to be smaller to open the lid 3B. This is advantageous in size reduction of the arm 5.

[Arm—Fourth Design Example]

Figure 9:
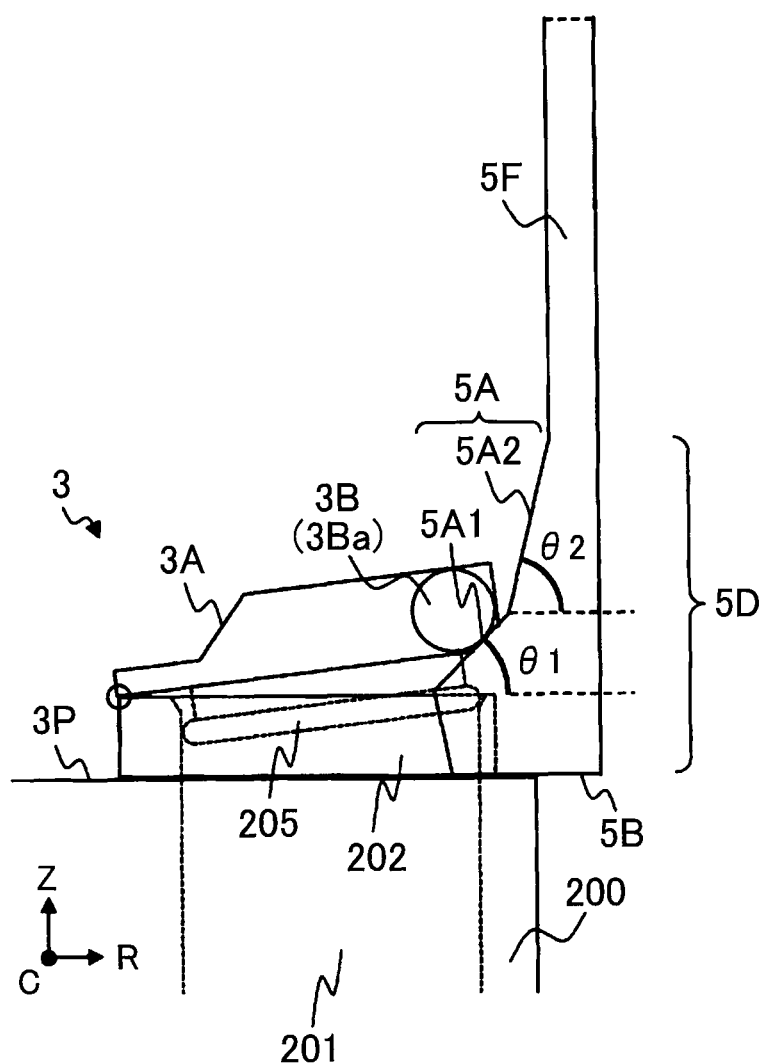
FIG. 9 is a view illustrating a configuration of an arm of a fourth design example in Embodiment 1.

FIG. 9 illustrates a structure of the arm 5 of the fourth design example as a modification of Embodiment 1. FIG. 9 also illustrates an example of a state where the arm 5 and the protrusion 3B contact each other. In the arm 5 of the fourth design example, the contact surface of the protrusion contacting portion 5A has a two-stage planar surface portion having two stage angles. The two planar surfaces in the protrusion contacting portion 5A include a first planar surface 5A1 on the left in the figure and a second planar surface 5A2 on the right in the figure. The first planar surface 5A1 has an angle θ1. The second planar surface 5A2 has an angle θ2. The angle θ1 and angle θ2 are each greater than 0 degrees and less than 90 degrees. The angle θ2 is greater than the angle θ1. For example, the angle θ1 is about 45 degrees and the angle θ1 is about 75 degrees.

In processing, greatest load is applied to open the lid 3A from just after the surface of the protrusion contacting portion 5A contacts the protrusion 3B until the catch portion 205 of the reagent bottle 3 is separated from the opening 202. The time from the close state where the lid 3A is closed in the horizontal direction to the open state where the lid 3A is opened in the vertical direction corresponds to an initial time (the first time). Therefore, as in the present structure, the angle θ of the contact surface is efficiently changed between the initial time (the first time) and the time (the second time) after the initial time. In the present structure, the load on the arm 5 is reduced by reducing the force required to push the protrusion 3B upward. In addition, the arm 5 is reduced in size. These can be well balanced.

The angle θ1 of the first planar surface 5A1 that is a contacting portion corresponding to the first time is designed to be a relatively small angle to reduce the load on the arm 5. On the second planar surface 5A2 that is a contacting portion corresponding to the second time, the load on the arm 5 is small. The angle θ2 is designed to be relatively great to reduce the arm 5 in size. Other structures for reducing the load on the arm 5 and reducing the arm 5 in size include the arm 5 of the following fifth design example.

[Arm—Fifth Design Example (1)]

Figure 10:
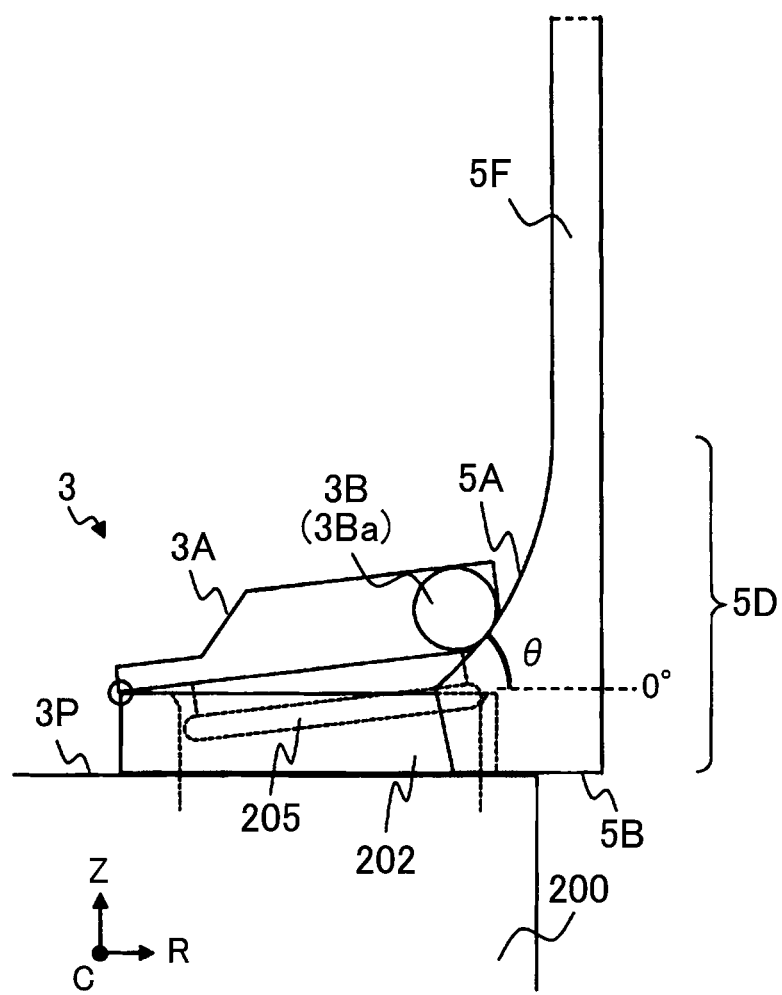
FIG. 10 is a view illustrating a configuration of an arm of a fifth design example in Embodiment 1.

FIG. 10 illustrates a structure of the arm 5 of the fifth design example applied to Embodiment 1. FIG. 10 also illustrates an example of a state where the arm 5 and the protrusion 3B contact each other. The arm 5 of the fifth design example has a curved surface where the angle θ gradually increases as a design of the angle θ of the protrusion contacting portion 5A. In the planar surface seen from the circumferential direction C, the contact surface of the protrusion contacting portion 5A has a curved shape. The angle θ of this curve gradually increases from a predetermined angle (for example, about 45 degrees) to approach 90 degrees from the left (corresponding to the top end portion 5E) to right (corresponding to the shaft portion 5F) in the figure.

The load on the arm 5 is reduced because the contact angle between the protrusion 3B and the curved surface of the protrusion contacting portion 5A is relatively small in the first time when the lid 3A is opened. The load on the arm 5 is small in the second time. Therefore, although the contact angle between the protrusion 3B and the curved surface is large, the lid 3A can be opened and the arm 5 can be reduced in size.

[Arm—Fifth Design Example (2)]

FIG. 46 illustrates an example of a case where one set of the arm 5 (5a, 5b) in Embodiment 1 contact one set of the projection 3B (3Ba, 3Bb) of the lid 3A as a supplement in perspective view. The number and shapes of the arms 5 in the circumferential direction C are designed corresponding to the number and shapes of the projections 3B of the lid 3A. The width of the lid 3A in the circumferential direction C is set as a width h1. The interval between the two arms 5a and 5b is set as an interval y1. The width h1 is under the interval y1. The width of the protrusion 3B protruding from the lid 3A in the circumferential direction C is set as a width h2. The width y0 of the arm 5 is generally the same as the width h2 of the protrusion 3B. This is not limiting. The width y0 may be under the width h2. The width y0 may be over the width h2.

The cross section of the protrusion 3B is circular. The protrusion contacting portion 5A has a curved surface. The top end portion 5E of the arm 5 is easily inserted below the protrusion 3B. The protrusion 3B easily moves along the first surface of the protrusion contacting portion 5A.

A modification of the structure of the arm 5 may have a portion which extends in the circumferential direction C from the base portion or shaft portion 5F. The protrusion contacting portion 5A and bottle pushing portion 5B may be provided to the extending portion. In that case, the interval between the two arms 5a and 5b can be made larger.

[Pushing Bar]

Details of the structure about the pushing bar 6 of the pushing portion 60 are as follows. As in FIG. 4, the pushing bar 6 in Embodiment 1 extends from the base portion 62 proximally in the circumferential direction C and has a bar shape having a circular cross section. The length of the pushing bar 6 in the circumferential direction C is larger than the width of the lid 3A in the circumferential direction C. Part of the pushing bar 6 contacts the upper surface of the lid 3A (other than the protrusion 3B).

Not only the present structure but the following structure of the pushing bar 6 is available as a modification of Embodiment 1. The pushing bar 6 in a modification may have a bar portion which extends from the base portion 62 in the circumferential direction C and a protrusion portion which protrudes from the bar portion downward in the vertical direction. This protrusion portion contacts the top surface of the lid 3A. This protrusion portion can use various shapes. The width of this protrusion portion in the circumferential direction C corresponds to the width of the lid 3A in the circumferential direction C. For example, the lower end of this protrusion portion has a semicircular cross section.

[Lid Opening and Closing (1-1)]

Next, in reference to FIGS. 11 to 17, in a dispensing process, operations from when the lid opening and closing mechanism portion 4 opens the lid 3A of the reagent bottle 3 to when the lid opening and closing mechanism portion 4 closes the lid 3A are explained. The explanation uses the case where the arm 5 of the fifth design example. The explanation can use other structures. An outline of the dispensing process is as follows.

(1) The analytic apparatus 1 opens the closed lid 3A of the container portion 201 of the target reagent bottle by the lid opening and closing mechanism portion 4 just before dispensing ("lid opening operation").

(2) The analytic apparatus 1 makes the dispensing nozzle access the target container portion 201 whose lid 3A is in the close state to aspirate a reagent.

(3) The analytic apparatus 1 closes the opened lid 3A of the target container portion 201 of the reagent bottle by the lid opening and closing mechanism portion 4 immediately after dispensing ("lid closing operation"). First, the opening operation which opens the target lid 3A is explained.

Figure 11:
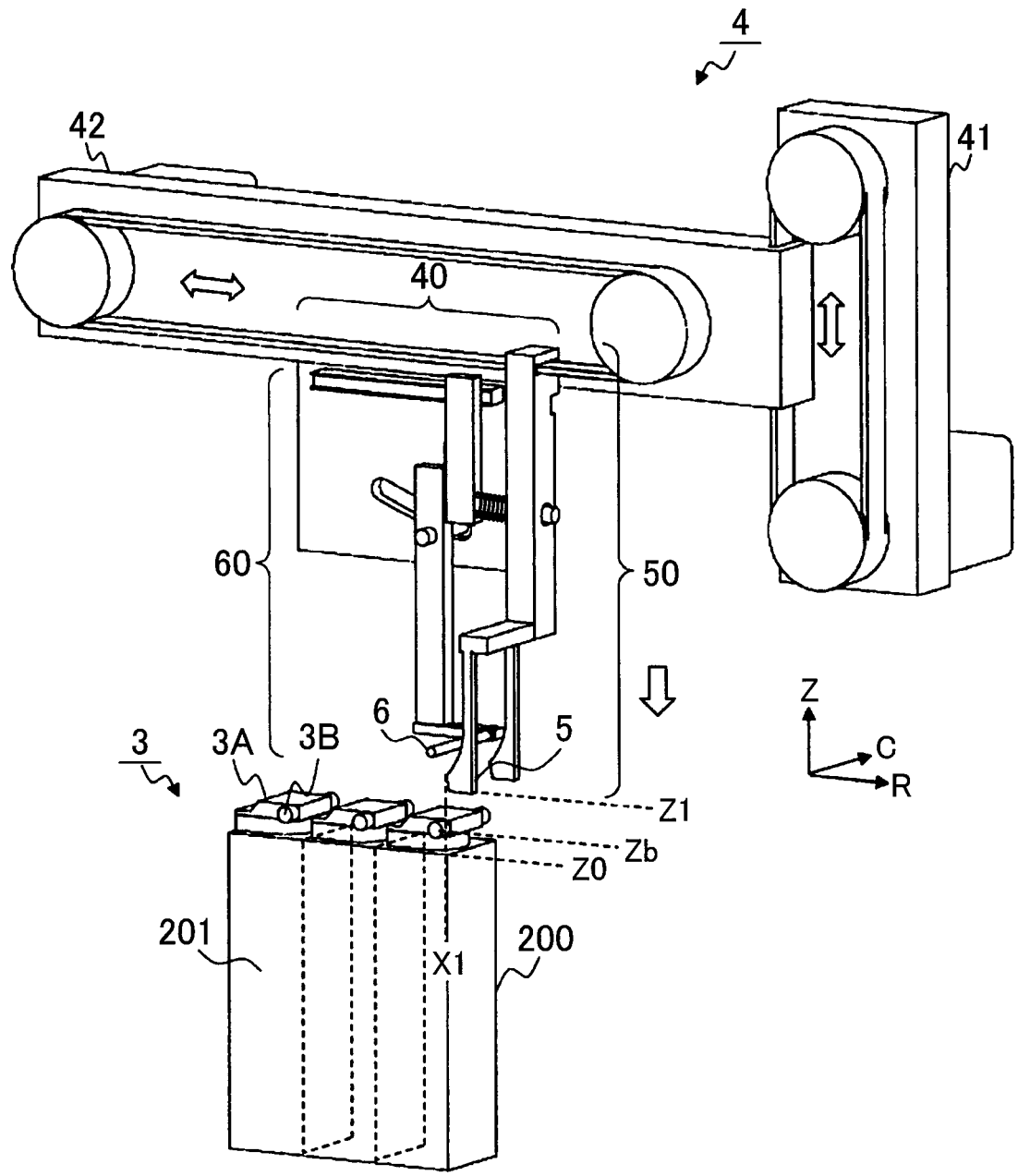
FIG. 11 is a view illustrating a first operation and a first state of lid opening and closing of the lid opening and closing mechanism portion in Embodiment 1.

FIG. 11 illustrates the initial first operation and first state of the lid opening and closing mechanism portion 4. The lid 3A of the reagent bottle 3 is in the close state. The reagent bottle 3 and the lid 3A are installed to a predetermined position in a correct orientation. The reagent bottle 3 is arranged directly below the lid opening and closing mechanism portion 4. The lid opening and closing mechanism portion 4 performs driving in the vertical direction and the first horizontal direction in advance to locate the lid opening and closing portion 40 right above the container portion 201 and lid 3A of the target reagent bottle 3. The present example targets the lid 3A of the right-illustrated container portion 201 of the reagent bottle 3 in the first horizontal direction (radial direction R). Therefore, the arm 5 and the pushing bar 6 are arranged right above the target lid 3A. In the first state, a position of the top end portion 5E of the arm 5 in the first horizontal direction is indicated as a position X1. The position X1 is positioned a little rightward of the protrusion 3B.

In the circumferential direction C, one set of the arms 5 (5a, 5b) is arranged corresponding to the position of one set of the projections 3B (3Ba, 3Bb). The pushing bar 6 has a predetermined positional relationship with the arm 5. The pushing bar 6 is arranged near the diagonal left of the protrusion contacting portion 5A of the lower end portion 5D. A position Z0 indicates the height position of the upper surface 3P of the reagent bottle 3 as a reference. A position Z1 illustrates the height position of the lower surface (bottle pushing portion 5B) of the lower end portion 5D of the arm 5. A position Zb illustrates the height position of the protrusion 3B. The relationship among the height positions is Z0<Zb<Z1.

[Lid Opening and Closing (1-2)]

Figure 12:
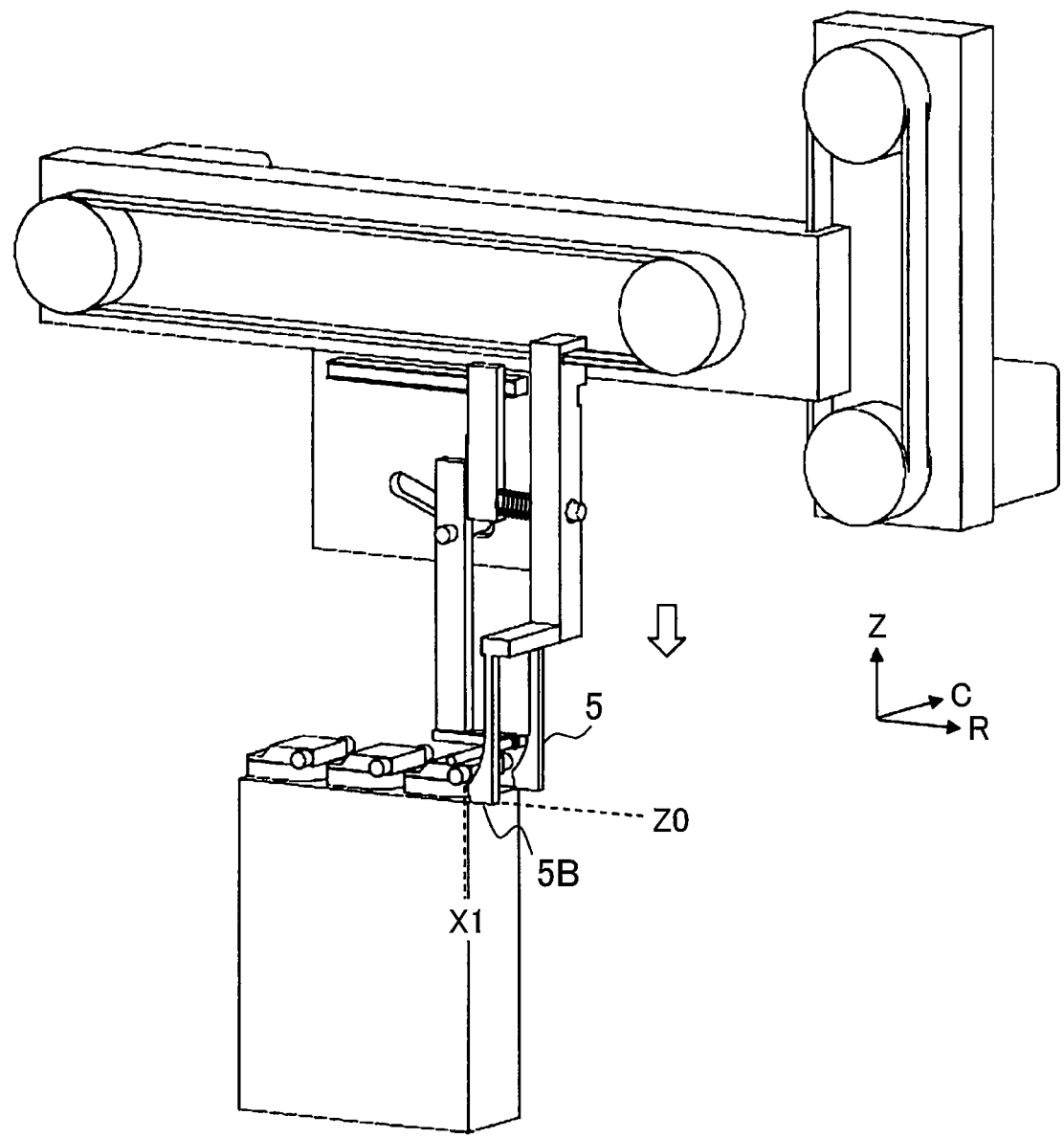
FIG. 12 is a view illustrating a second operation and a second state of the lid opening and closing in Embodiment 1.

FIG. 12 illustrates the second operation and the second state. Also in the second state, the top end portion 5E of the arm 5 is at the position X1. First, the lid opening and closing mechanism portion 4 moves the arm 5 of the arm portion 50 and the pushing bar 6 of the pushing portion 60 downward from the first state in the vertical direction by the vertical driving portion 41. This enters the second state. In the second state, the bottle pushing portion 5B which is the lower surface of the lower end portion 5D of the arm 5 contacts or approaches the partial surface of the upper surface 3P of the reagent bottle 3 to generally reach the position Z0. When the arm 5 descends in this operation, the lower end portion 5D does not contact the protrusion 3B or the like.

[Lid Opening and Closing (1-3)]

Figure 13:
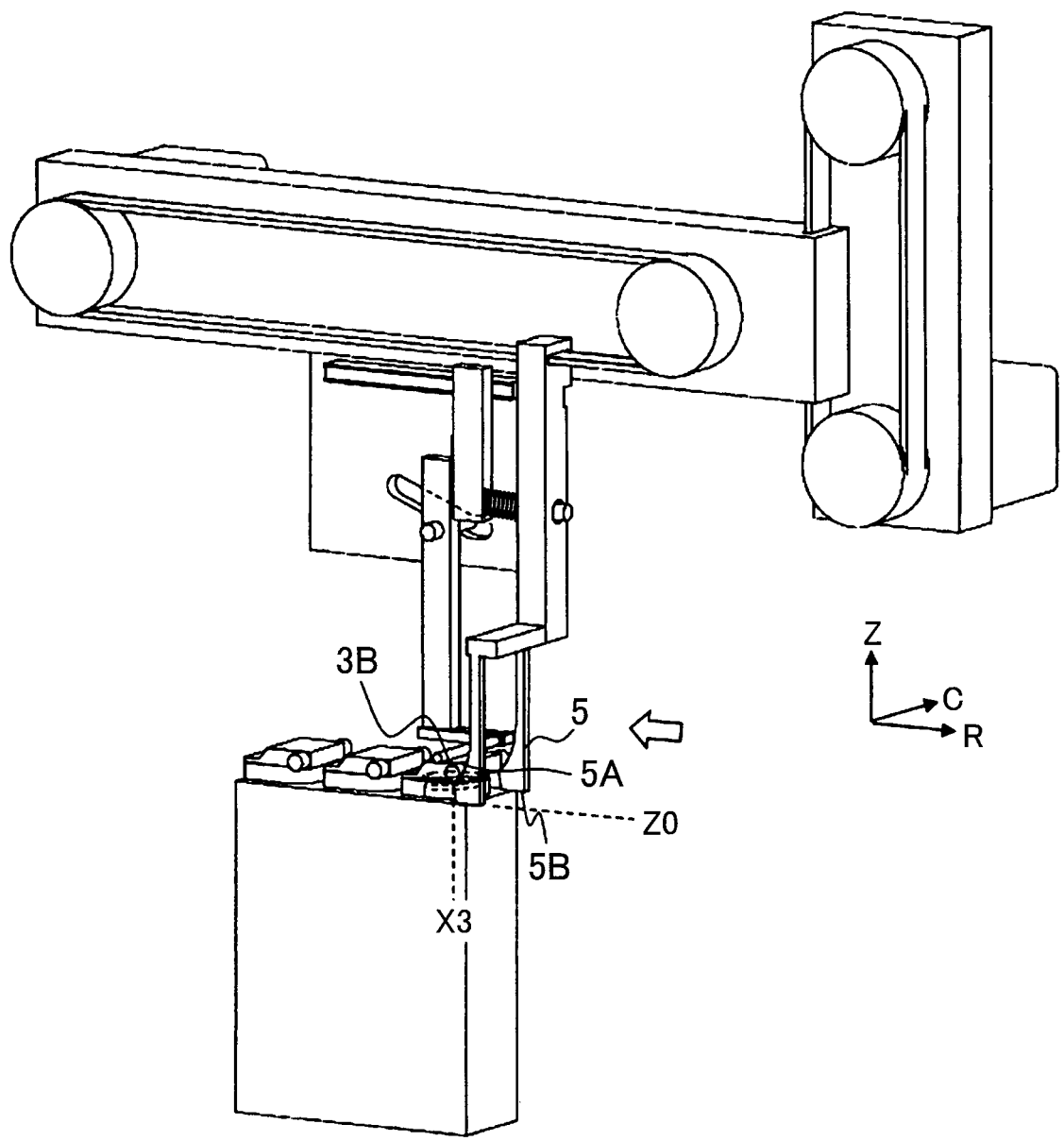
FIG. 13 is a view illustrating a third operation and a third state of the lid opening and closing in Embodiment 1.

FIG. 13 illustrates the third operation and the third state. In the third state, the position of the top end portion 5E of the arm 5 in the first horizontal direction is indicated by a position X3. The position X3 is near the protrusion 3B. The lid opening and closing mechanism portion 4 moves the arm 5 and the pushing bar 6 leftward in the first horizontal direction (the radial direction R) by the horizontal driving portion 32 while the bottle pushing portion 5B and the upper surface 3P contact or approach each other. The protrusion contacting portion 5A of the lower end portion 5D thus contacts the protrusion 3B of the lid 3A of the container portion 201 on the right side of the reagent bottle 3. With this horizontal movement, while contacting along the first surface of the protrusion contacting portion 5A, the protrusion 3B moves upward in the arc in the vertical direction. This gradually opens the lid 3A.

[Lid Opening and Closing (1-4)]

Figure 14:
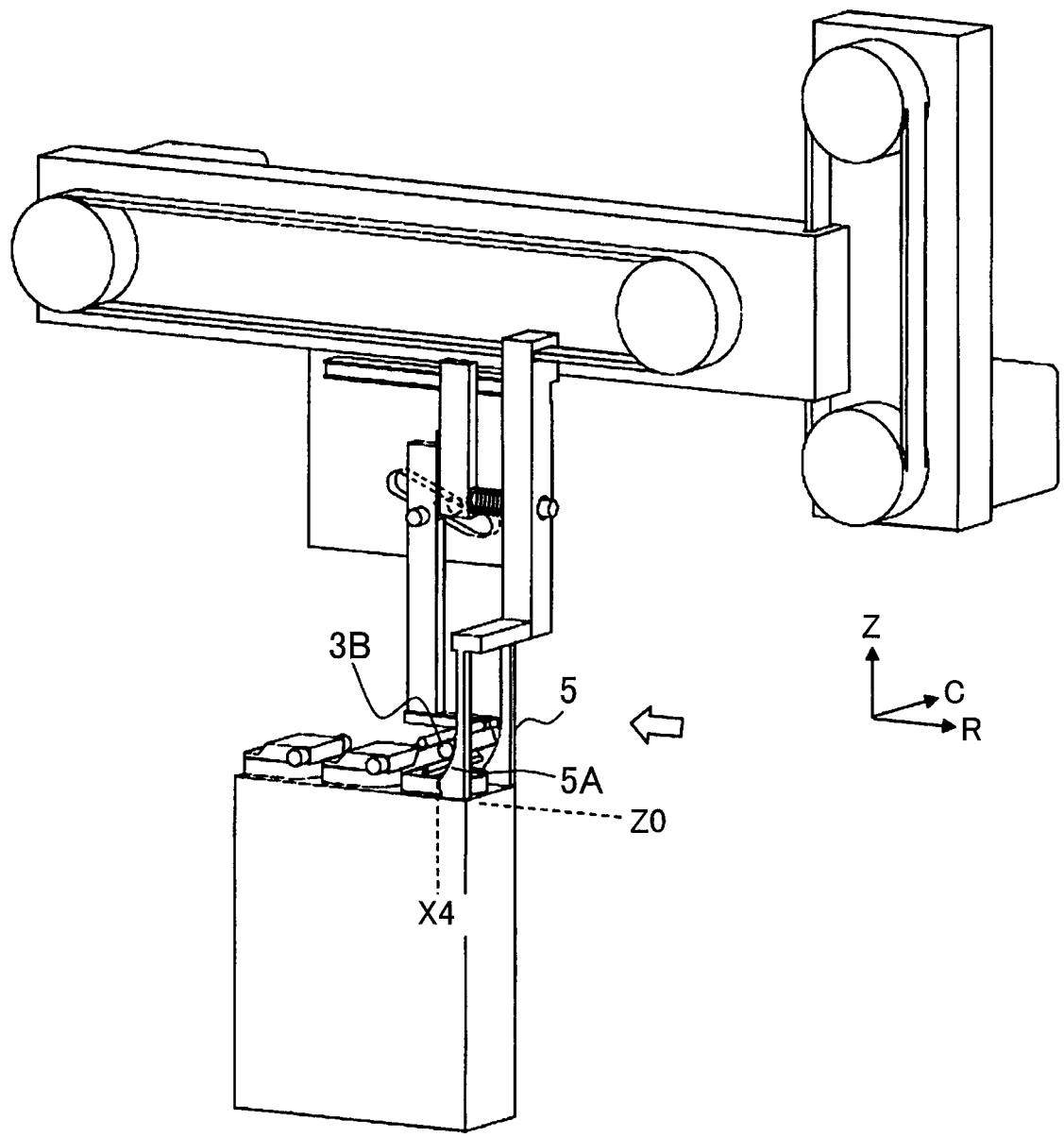
FIG. 14 is a view illustrating a fourth operation and a fourth state of the lid opening and closing in Embodiment 1.

FIG. 14 illustrates the fourth operation and the fourth state. The lid opening and closing mechanism portion 4 moves the arm 5 and pushing bar 6 leftward further. In the fourth state, the position of top end portion 5E of the arm 5 in the first horizontal direction is indicated by a position X4. The position X4 is leftward of the protrusion 3B a little. In the transition from the third state to the fourth state, the force required to open the lid 3A is large in the first time just after the contact between the arm 5 and protrusion 3B until the catch portion 205 of the reagent bottle 3 is separated from the opening 202. Therefore, in the first time, the lid opening and closing mechanism portion 4 drives the horizontal driving portion 42 at a low speed to prioritize torque. In the fourth state, the catch portion 205 of the reagent bottle 3 is separated from the opening 202. The lid opening and closing mechanism portion 4 may drive the horizontal driving portion 42 at a relatively high speed in the second time after the fourth state.

[Lid Opening and Closing (1-5)]

Figure 15:
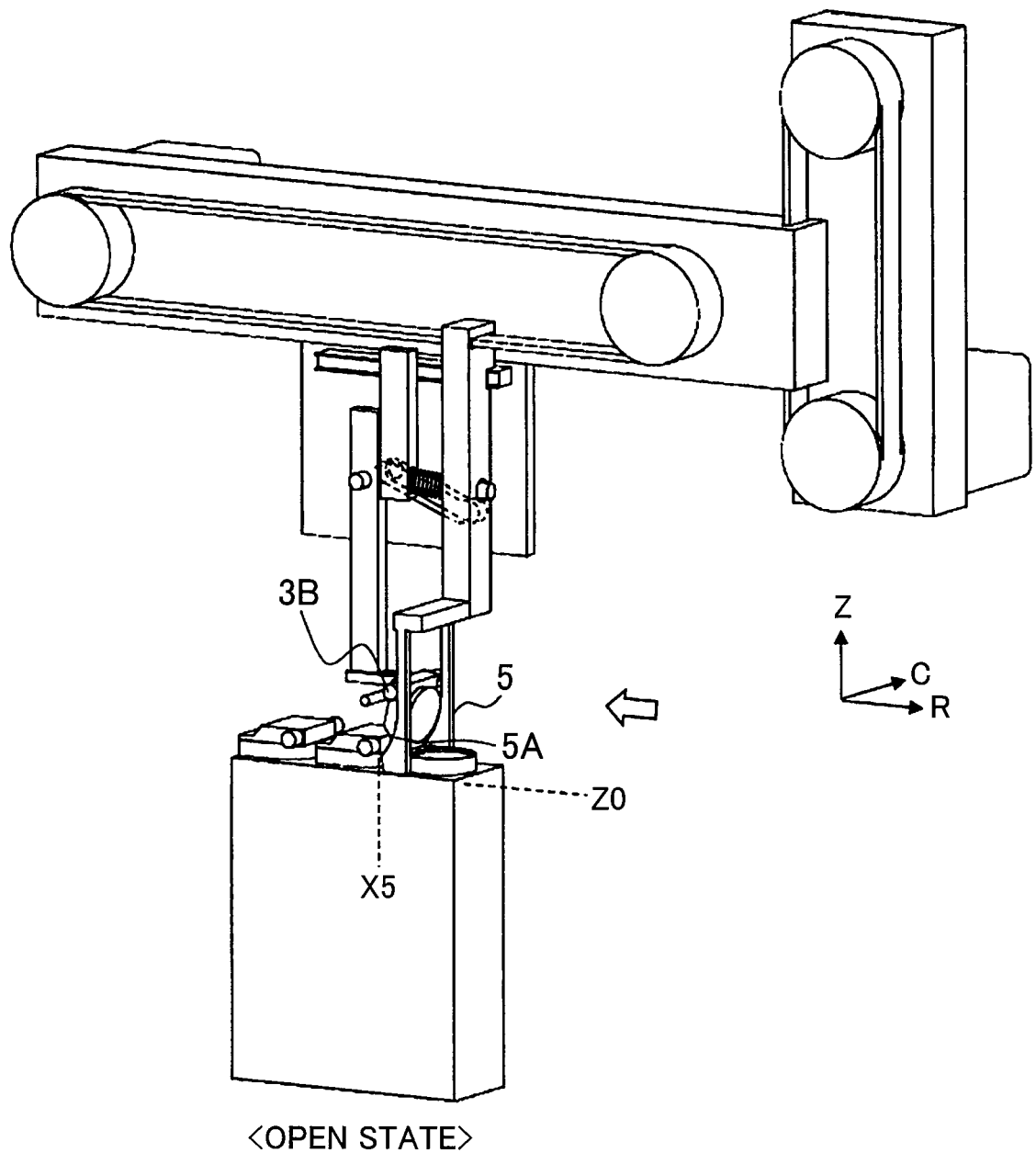
FIG. 15 is a view illustrating a fifth operation and a fifth state of the lid opening and closing in Embodiment 1.

FIG. 15 illustrates the fifth operation and the fifth state. The lid opening and closing mechanism portion 4 moves the arm 5 and pushing bar 6 leftward further. In the fifth state, the lid 3A is in the open state (angle θ is about from 85 degrees to 89 degrees) and the opening 202 is exposed. In the fifth state, the position of the top end portion 5E of the arm 5 in the first horizontal direction is indicated by a position X5. The position X5 is leftward of the protrusion 3B and absolutely closer to the protrusion 3B of the lid 3A of the central next container portion 201. The protrusion 3B reaches the side surface of the shaft portion 5F via the first surface of the arm 5.

During the opening operation from the above close state (the first state) to the open state (the fifth state), the pushing bar 6 connected to the arm 5 moves upward in the vertical direction and leftward in the first horizontal direction by the guide 304 not to excessively open the lid 3A pushed upward by the arm 5. That is, the pushing bar 6 moves diagonally leftward along the shape of the guide 304. The pushing bar 6 is thus always arranged near the top surface of the lid 3A. The movement of the lid 3A is restricted not to open excessively by the pushing bar 6.

[Lid Opening and Closing (1-6)]

Figure 16:
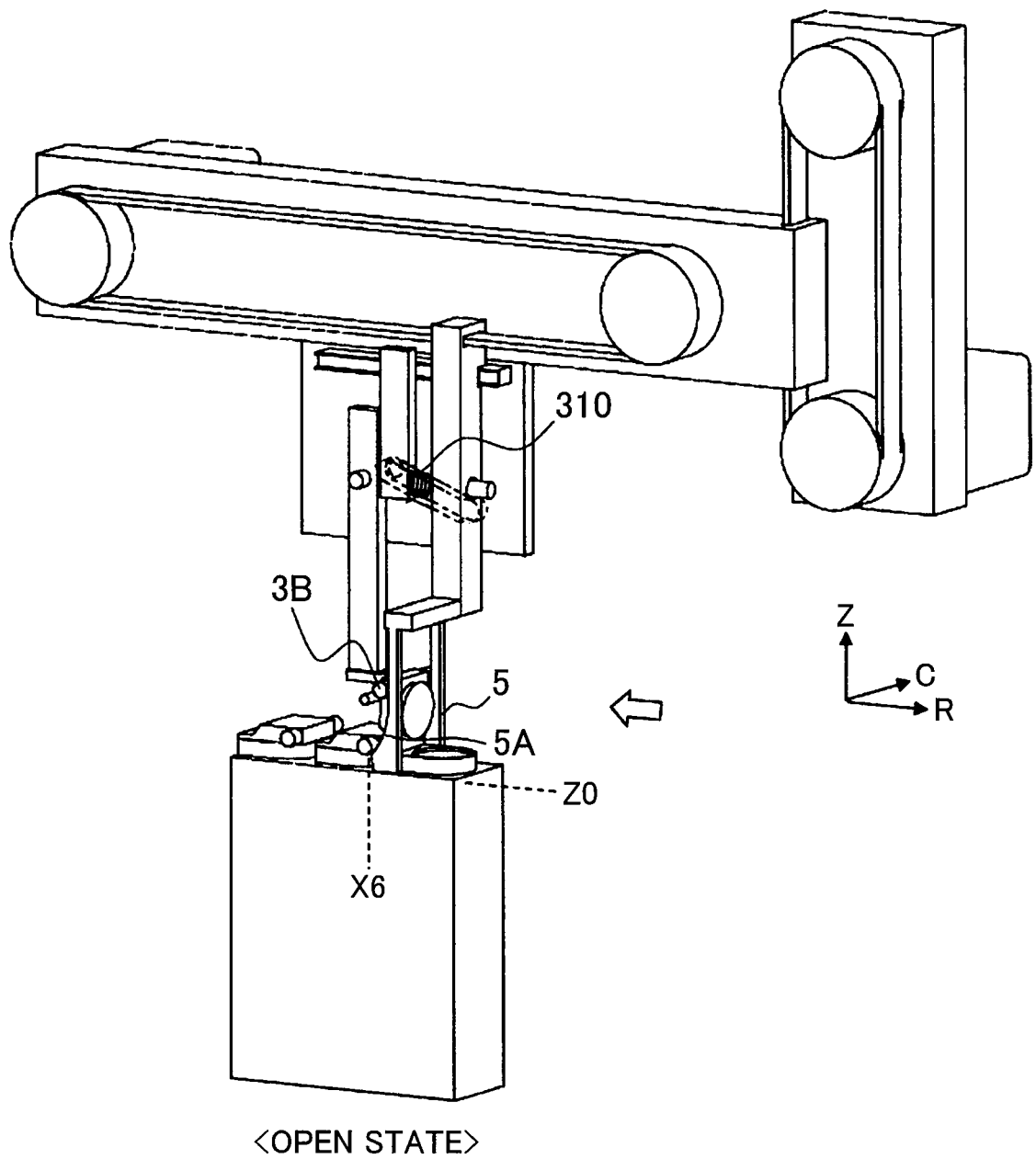
FIG. 16 is a view illustrating a sixth operation and a sixth state of the lid opening and closing in Embodiment 1.

FIG. 16 illustrates the sixth operation and the sixth state. In this case, the lid opening and closing mechanism portion 4 moves the arm 5 and pushing bar 6 leftward further. In the sixth state, a position X6 of the top end portion 5E of the arm 5 is a little leftward of the position X5 in the fifth state. The lid 3A is in the open state at 90 degrees.

After the lid 3A is opened as in the fifth state or sixth state, it is necessary for the distance between the pushing bar 6 and the upper surface of the lid 3A not to be large to prevent the lid 3A from excessively opening (angle θ is greater than 90 degrees). Then, the guide 304 restricts the movement of the pushing bar 6 not to move the pushing bar 6 in the first horizontal direction by a predetermined amount or more. In this case, as in FIG. 16, the spring 310 of the connecting pin 309 between the pushing bar 6 and the arm 5 connected to the pushing bar 6 compresses not to restrict the movement of the arm 5. Thereby, the movement of the arm 5 is not restricted. As above, the lid 3A can be opened while not being opened excessively.

The reagent is dispensed in the open state of the lid 3A as in the above fifth state or sixth state. Any of the fifth state and the sixth state may be used. In the reagent dispensing, the reagent in the container portion 201 is agitated or aspirated using the dispensing nozzle or an agitating bar. For example, the analytic apparatus 1 lowers the dispensing nozzle from above the target opening 202 and immerses the lower end of the dispensing nozzle in the reagent below the opening 202. Then, the analytic apparatus 1 raises the dispensing nozzle after the dispensing nozzle aspirates the reagent.

[Lid Opening and Closing (1-7)]

Figure 17:
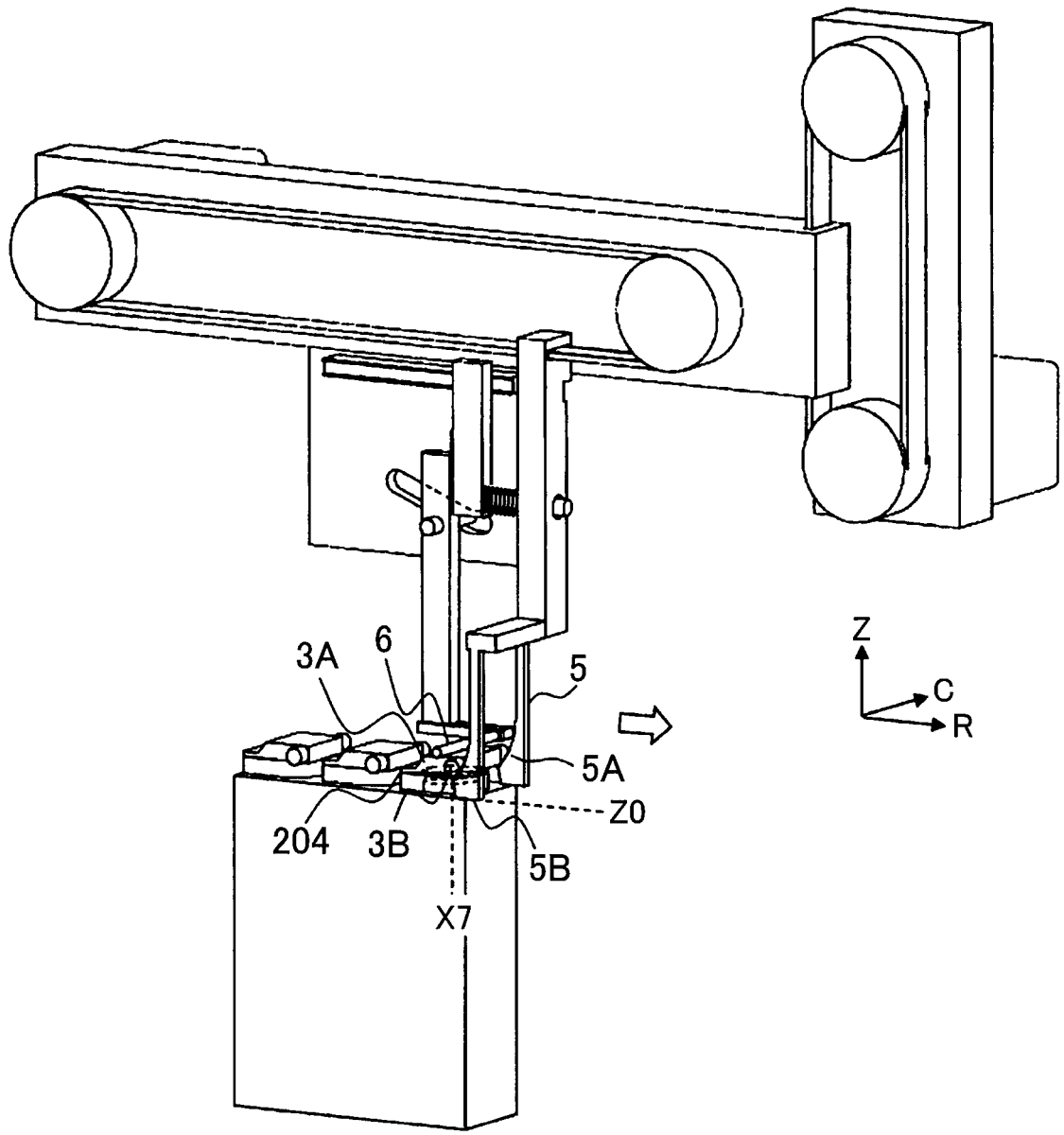
FIG. 17 is a view illustrating a seventh operation and a seventh state of the lid opening and closing in Embodiment 1.

A lid closing operation which closes the lid 3A is explained below. FIG. 17 illustrates the seventh operation and the seventh state. To close the lid in the open state in the fifth or sixth state, the lid opening and closing mechanism portion 4 moves the arm 5 and the pushing bar 6 by the horizontal driving portion 41 in the reverse direction (from left to right) to the lid opening direction (right to left) in the first horizontal direction. This enters, for example, the seventh state. The seventh state illustrates a state where the lid 3A is closed to some extent. A position X7 illustrates the position of the top end portion 5E of the arm 5. The position X7 is near the protrusion 3B.

In this movement, the pushing bar 6 is moved by the guide 304 downward in the vertical direction and rightward in the first horizontal direction and contacts the top surface of the lid 3A. Pushing force is thus applied from the pushing bar 6 to the top surface of the lid 3A. The lid 3A is gradually closed by rotating about the hinge 204. In the seventh state or later, the catch portion 205 on the lower side of the lid 3A contacts and conforms to the opening 202. The pushing bar 6 moves rightward after descending along the guide 304 by a predetermined amount.

By the horizontal movement by a predetermined amount, the lid 3A enters the close state similar to the above first state. The lid opening and closing mechanism portion 4 moves the arm 5 and the pushing bar 6 to the predetermined position (position X1) by the horizontal driving portion 42. This predetermined position is a position where the arm 5 and the pushing bar 6 do not interfere with the protrusion 3B. Then, the lid opening and closing mechanism portion 4 uses the vertical driving portion 41 to raise the arm 5 and the pushing bar 6 upward in the vertical direction and returns the arm 5 and the pushing bar 6 to a predetermined position. In the raising operation, the arm 5 and the pushing bar 6 do not contact the lid 3A or the protrusion 3B. The above is the flow of the operations for the lid opening and closing. The position in the horizontal direction may be changed to open and close the other lids 3A of the reagent bottle 3 through the above operations.

Advantageous Effects

As above, according to the automated analyzer of Embodiment 1, opening and closing of the lid 3A of the reagent bottle 3 before and after dispensing or the like are realizable using the simpler structure and the smaller number of drives than before. The analytic apparatus 1 of Embodiment 1 can open and close a selected one of the multiple lids 3A of the reagent bottle 3 one by one using horizontal driving. The lid opening and closing in Embodiment 1 can be realized using the simpler structure than the prior art example in which a lid is opened and closed by rotation of a hook. A driving portion for driving each of multiple hooks is thus unnecessary. That is, a high-performance analytic apparatus can be realized at a relatively low cost.

[Modification—Bottle Lifting Suppressing Mechanism]

The following is possible as a modification of Embodiment 1. In Embodiment 1, bottle pressing 5B is provided to the arm 5 to prevent lifting of the reagent bottle 3 in lid opening. This is not limiting. A technique of suppressing lifting of the reagent bottle 3 is possible using a different structure.

Figure 18:
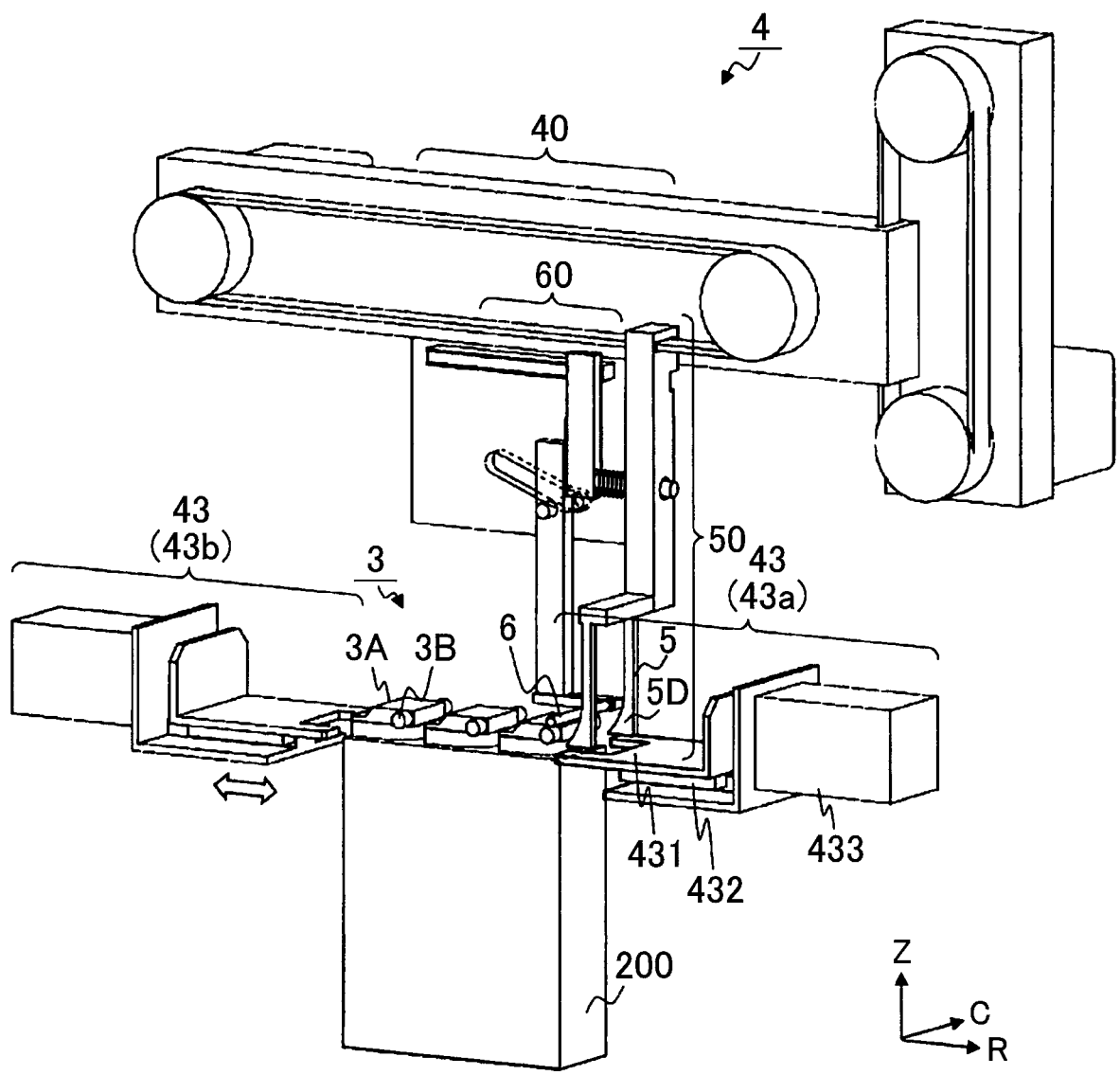
FIG. 18 is a view illustrating a structure of a bottle lift suppression mechanism and a first state of lid opening and closing in an automated analyzer of a modification example of Embodiment 1.

FIG. 18 illustrates a structure in which a bottle lifting suppressing mechanism is added to the lid opening and closing mechanism portion 4 as the analytic apparatus 1 of a modification of Embodiment 1. In addition to the above components, this lid opening and closing mechanism portion 4 has a lifting suppressing portion 43. The lifting suppressing portion 43 has a first suppressing portion 43a arranged rightward of the reagent bottle 3 in the radial direction R and a second suppressing portion 43b arranged leftward of the reagent bottle 3 in the radial direction R. The lifting suppressing portion 43 has the same right and left structures.

This lid opening and closing mechanism portion 4 has a different structure of the lower end portion 5D of the arm 5 from the above structure. The lower end portion 5D has the same protrusion contacting portion 5A as above but does not have the bottle pushing portion 5B or the insertion portion 5C. The lower end portion 5D has a planar lower surface. The lower end portion 5D has a structure in which the portion under the top end portion 5E of the protrusion contacting portion 5A is reduced. The lower surface of this lower end portion 5D does not contact the upper surface 3P of the reagent bottle 3. This modification is the same as Embodiment 1 in that the protrusion contacting portion 5A of the arm 5 contacts the protrusion 3B to open the lid 3A.

The lifting suppressing portion 43 has a bottle pushing portion 431, a rail 432, and a driving portion 433 in detail. The driving portion 433 drives each component. The bottle pushing portion 431 pushes a part of the upper surface 3P of the reagent bottle 3 instead of the above bottle pushing portion 5B. For example, the bottle pushing portion 431 has a concave shape of a partially-cut planar plate to press three sides around the lid 3A on the upper surface 3P. The rail 432 enables movement of the bottle pushing portion 431 in the first horizontal direction. Therefore, switching can be made between the state where the bottle pushing portion 431 presses the upper surface 3P and the state where the bottle pushing portion 431 does not press the upper surface 3P. FIG. 18 illustrates a state where the bottle pushing portion 431 does not press the upper surface 3P as a first state.

Opening of the lid 3A by the lid opening and closing mechanism portion 4 of this modification is as follows.

Figure 19:
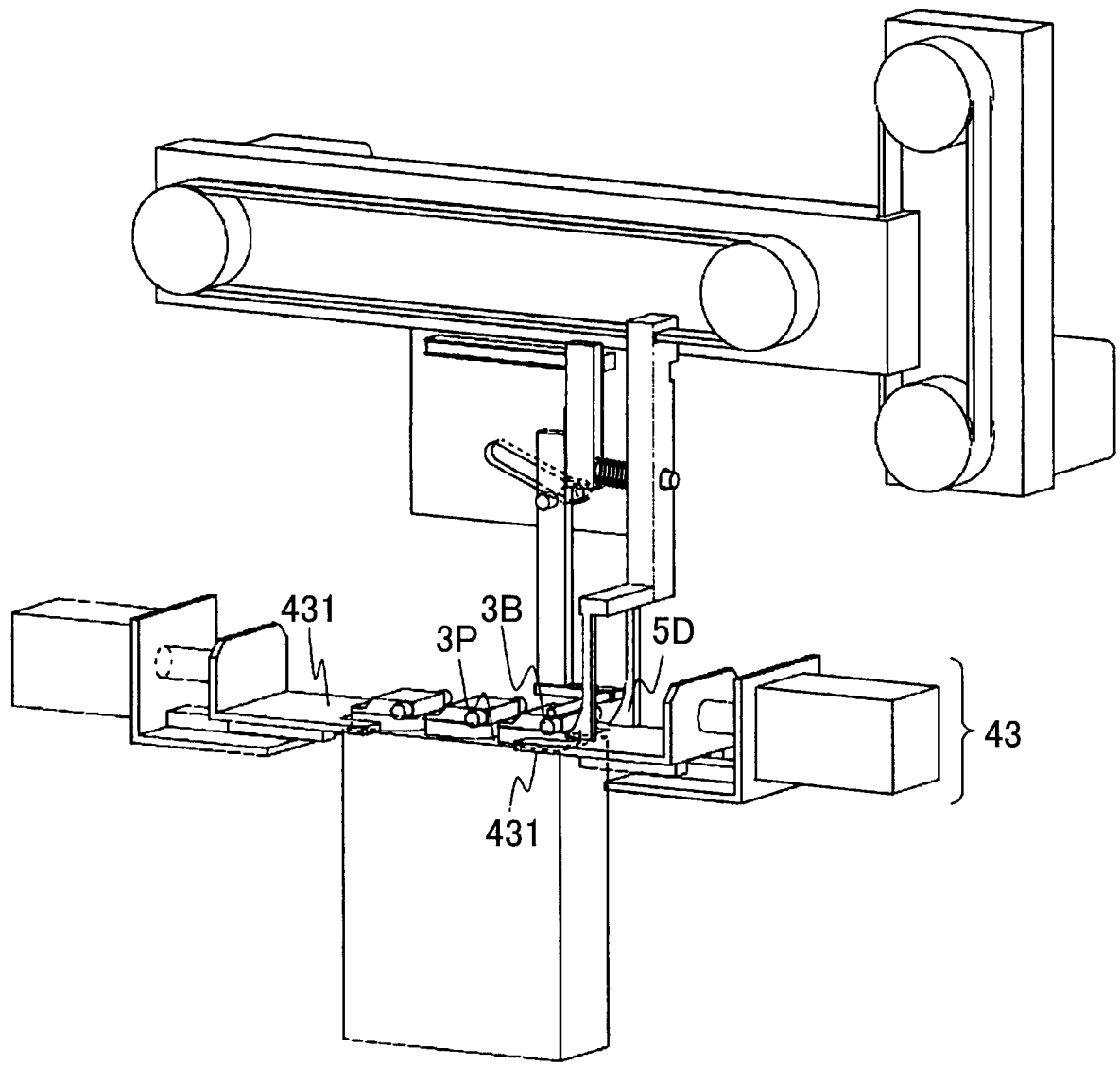
FIG. 19 is a view illustrating a second state of the lid opening and closing in the modification example of Embodiment 1.

FIG. 19 illustrates the second state of the bottle lifting suppressing mechanism. As the second state, the bottle pushing portion 431 presses the upper surface 3P. First, the lifting suppressing portion 43 converts the bottle pushing portion 431 from the first state of FIG. 18 to the second state by driving each portion in the first horizontal direction by the driving portion 433. In the second state, the bottle pushing portion 431 covers a part of the upper surface 3P of the reagent bottle 3. The concave portions of the top ends of the right and left bottle pushing portions 431 respectively cover the right and left parts of the upper surface 3P. In this case, as control, as in Embodiment 1, the bottle pushing portion 431 may contact the upper surface 3P or approach the upper surface 3P with a buffer distance.

Figure 20:
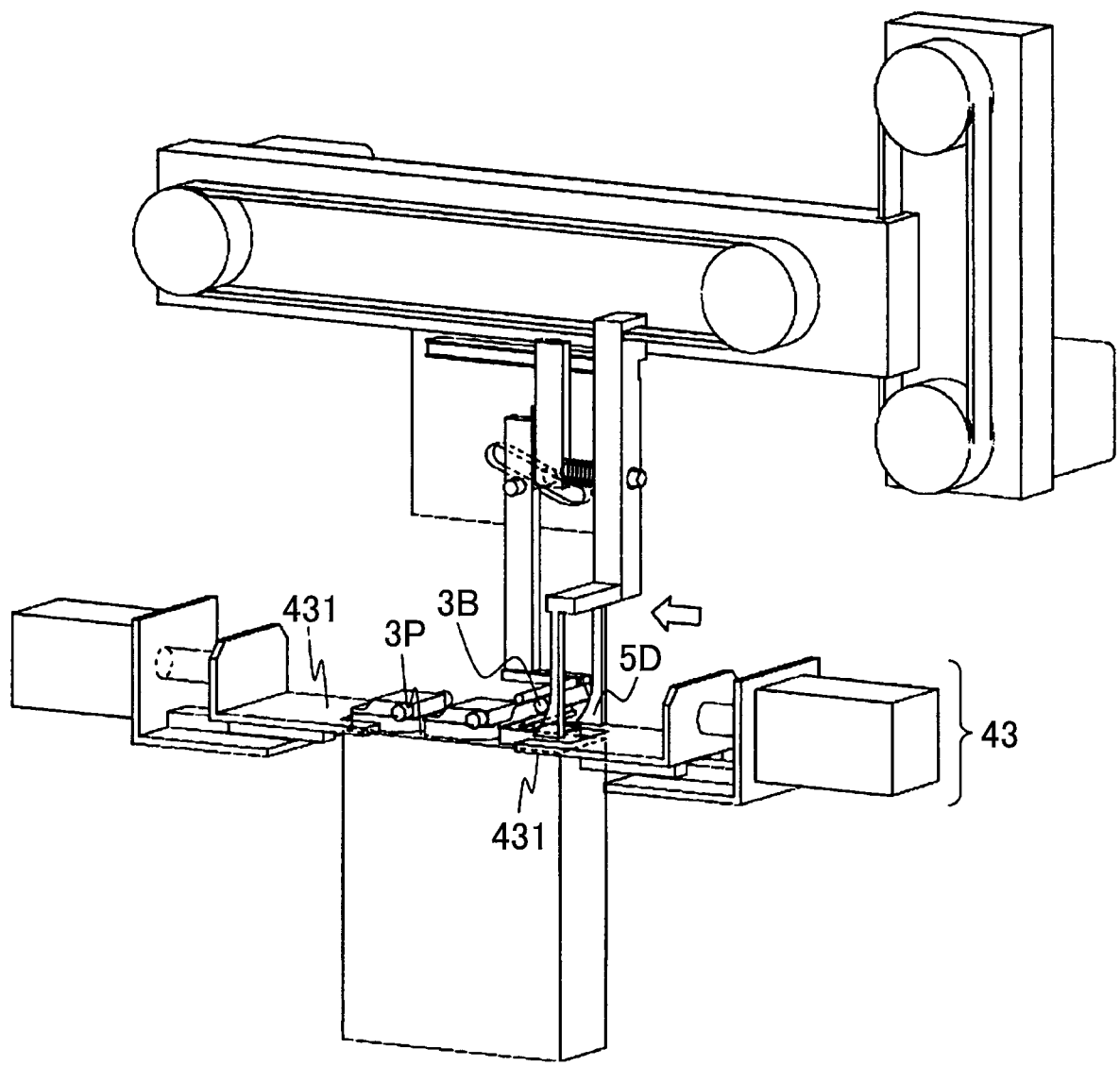
FIG. 20 is a view illustrating a third state of the lid opening and closing in the modification example of Embodiment 1.

FIG. 20 illustrates the third state of the bottle lifting suppressing mechanism. In the third state, the position of the lower end portion 5D of the arm 5 is more leftward in the first horizontal direction. As in the above, a lid opening and closing mechanism portion 5 moves the arm 5 leftward in first horizontal direction by the horizontal driving portion 42. The top end portion of the lower end portion 5D is inserted to a height position between the protrusion 3B and bottle pushing portion 431. Thus, the first surface (curved surface in this example) of the protrusion contacting portion 5A contacts the protrusion 3B and the protrusion 3B is pushed upward along the first surface to move. This opens the lid 3A gradually.

In this case, vertically upward force is applied to the body 200 of the reagent bottle 3 via the lid 3A. In this case, the upper surface 3P of the reagent bottle 3 is pushed in contact with the lower surface of the bottle pushing portion 431. Therefore, the body 200 of the reagent bottle 3 does not lift in the vertical direction with movement of the protrusion 3B in the vertical direction. The lid opening is the same as the above. After the lid 3A enters the close state, the lid opening and closing mechanism portion 4 returns the bottle pushing portion 431 to the first state where the bottle pushing portion 431 does not cover the upper surface 3P.

Embodiment 2

The automated analyzer of Embodiment 2 of the present invention is explained using FIGS. 21 to 28. The fundamental structure of Embodiment 2 is the same as Embodiment 1. Different component portions in Embodiment 2 from Embodiment 1 are explained below. When the automated analyzer is required for high performance, the multiple lids 3A of the reagent bottle 3 may be simultaneously opened to perform dispensing using multiple dispensing nozzles. To cope with such a case, the analytic apparatus 1 of Embodiment 2 includes the lid opening and closing mechanism portion 4 which can open and close the multiple lids 3A of the reagent bottle 3 simultaneously. Particularly, Embodiment 2 describes a case where the three lids 3A corresponding to the three container portions 201 of the reagent bottle 3 are opened and closed simultaneously. The number of the simultaneously opened and closed lids 3A is not limited to three. The two lids 3A may be opened and closed simultaneously. The four lids 3A or more may be opened and closed simultaneously.

[Lid Opening and Closing Mechanism Portion]

Figure 21:
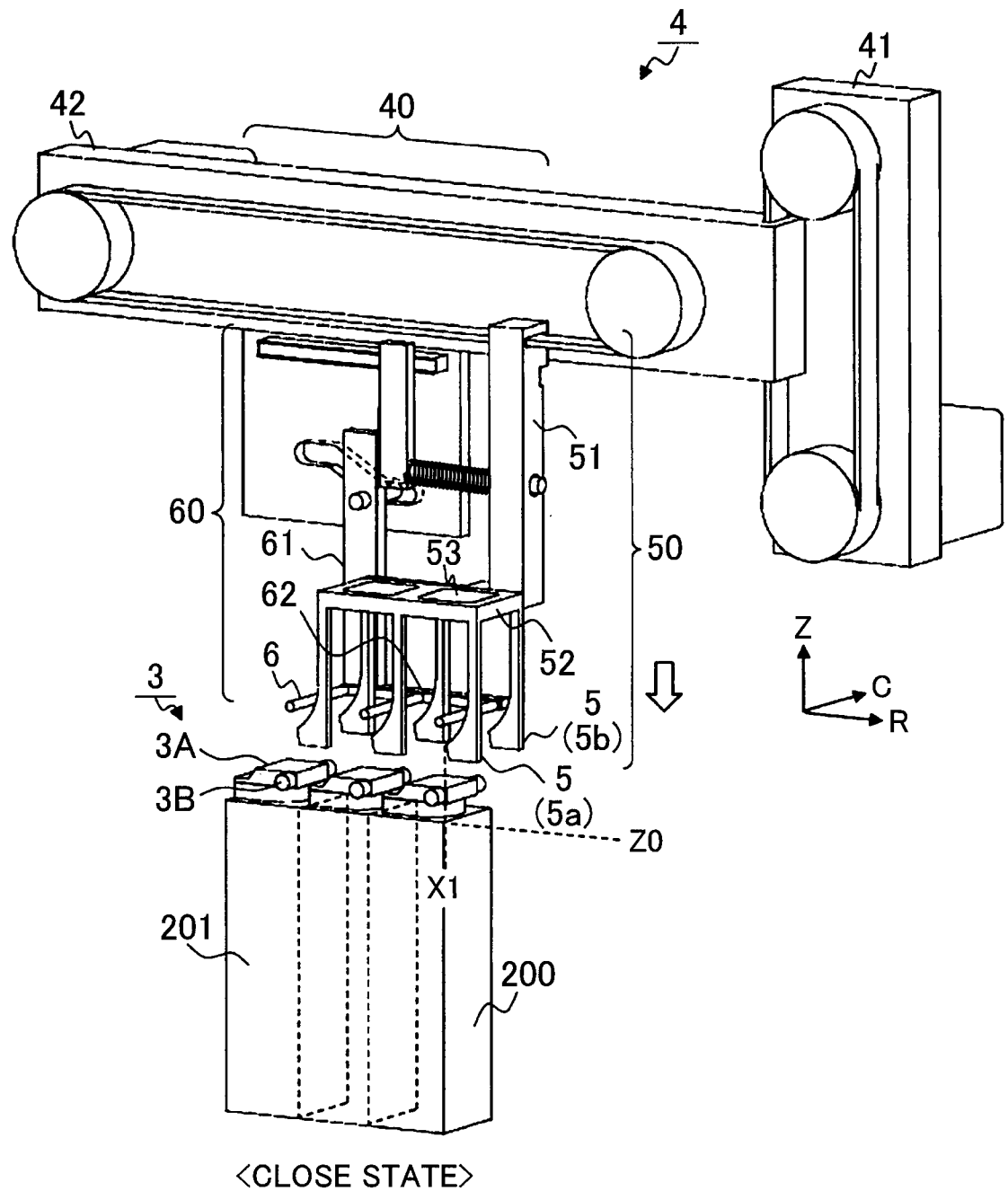
FIG. 21 is a view illustrating a structure of the lid opening and closing mechanism portion and a first operation and a first state of lid opening and closing in an automated analyzer of Embodiment 2 of the present invention.

FIG. 21 illustrates a structure of the lid opening and closing mechanism portion 4 in Embodiment 2. The structure of the target reagent bottle 3 is the same as that of Embodiment 1 (FIG. 2). The three lids 3A are to be opened and closed simultaneously. The lid opening and closing portion 40 has the arm portion 50 and pushing portion 60 that have different structures from Embodiment 1. The arm portion 50 includes three sets of the two arms 5 (5a, 5b) of Embodiment 1 at a predetermined interval in the first horizontal direction. That is, the arm portion 50 includes the six arms 5 in total. The arms 5 of each set have the same shape. The arm 5 has the structure of the above fifth design example. The protrusion contacting portion 5A has a curved surface.

The pushing portion 60 includes three pushing bars 6 of Embodiment 1 at predetermined intervals in the first horizontal direction. Each pushing bar 6 has the same shape and has a positional relationship with the corresponding arm 5. The three pushing bars 6 are secured to project from three positions at predetermined intervals on the base portion 62 extending in the first horizontal direction. The three sets of the arms 5 and the three pushing bars 6 are provided corresponding to the three lids 3A of the reagent bottle 3.

The base portion 52 has a base plate shape corresponding to the horizontal plane. The six arms 5 are secured to six places of the lower surface of the base portion 52. Two openings 53 are provided to the base portion 52 between the arms 5. The openings 53 are through hole portions to prevent interference such as a contact between the lid opening and closing portion 40 and the dispensing nozzle or the like. The dispensing nozzle or the like can pass through an opening 52A to access the opening 202 of the reagent bottle 3

[Lid Opening and Closing (2-1)]

Next, a flow until the lid opening and closing mechanism portion 4 closes the lids 3A of the reagent bottle 3 after opening the lids 3A is explained. FIG. 21 illustrates the first operation and the first state. In this state, three sets of the arms 5 and the three pushing bars 6 are arranged just above the three closed lids 3A of the reagent bottle 3. As one set of the arms 5 and one pushing bar 6, this case is the same as Embodiment 1. The top end portions 5E of one right-side set of the arms 5 are at the position X1.

[Lid Opening and Closing (2-2)]

Figure 22:
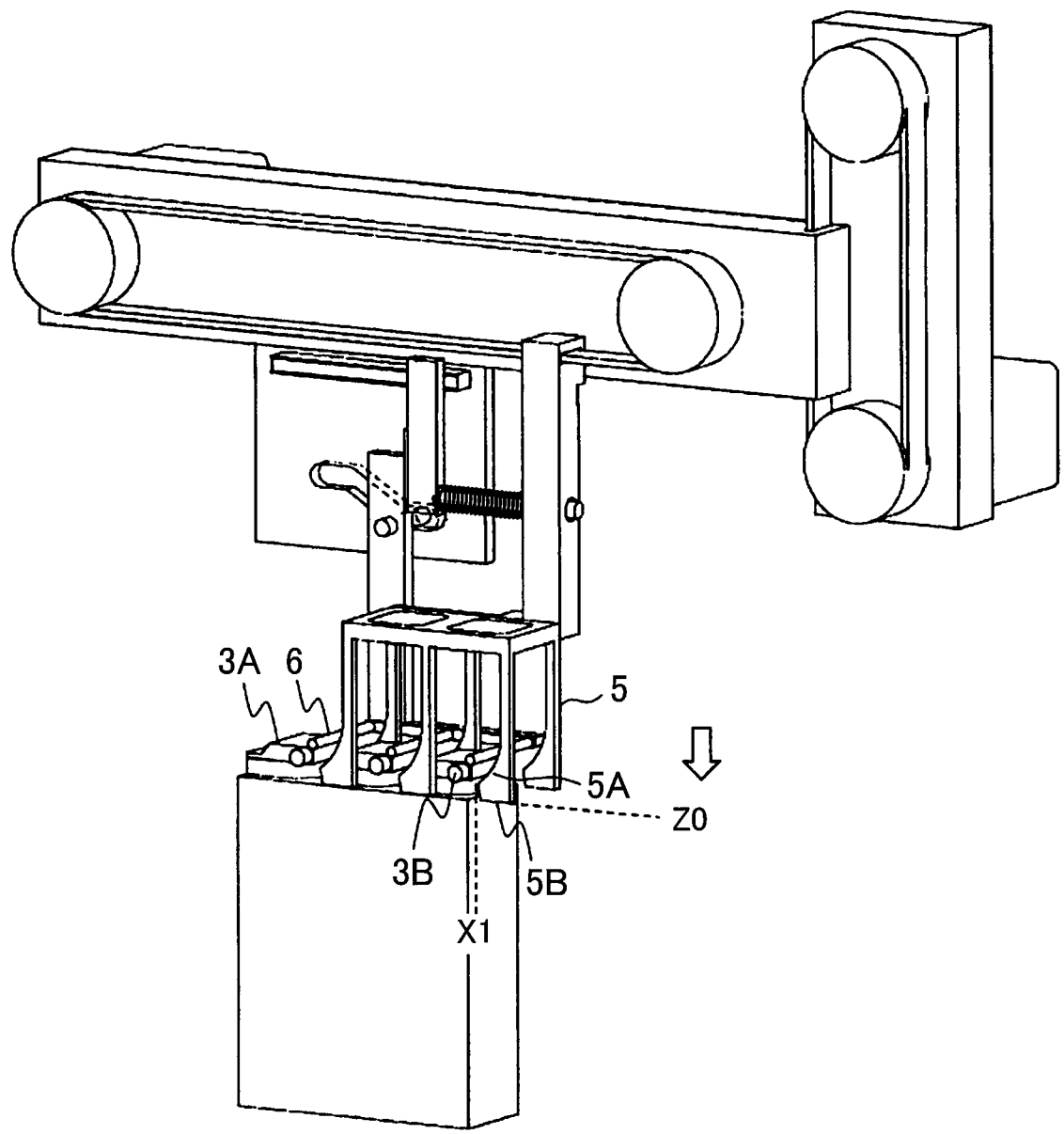
FIG. 22 is a view illustrating a second operation and a second state of the lid opening and closing in Embodiment 2.

FIG. 22 illustrates the second operation and the second state. The lid opening and closing mechanism portion 4 converts the first state to the second state by moving the arms 5 and pushing bars 6 by the vertical driving portion 41 in the vertical direction. In the second state, the height position of the bottle pushing portion 5B which is the lower surface of the arm 5 is generally the same as the position Z0 of the upper surface 3P of the reagent bottle 3. In this case, the right one of the three sets of the arms 5 may not contract the upper surface 3P.

The positions and intervals (pitch) of the three sets of the arms 5 in the first horizontal direction are designed not to contact the lids 3A or the protrusions 3B in the vertical movement. The width (width x0 of FIG. 5) of the lower end portion 5D of the arm 5 in the first horizontal direction is smaller than the width of the interval between the protrusions 3B.

[Lid Opening and Closing (2-3)]

Figure 23:
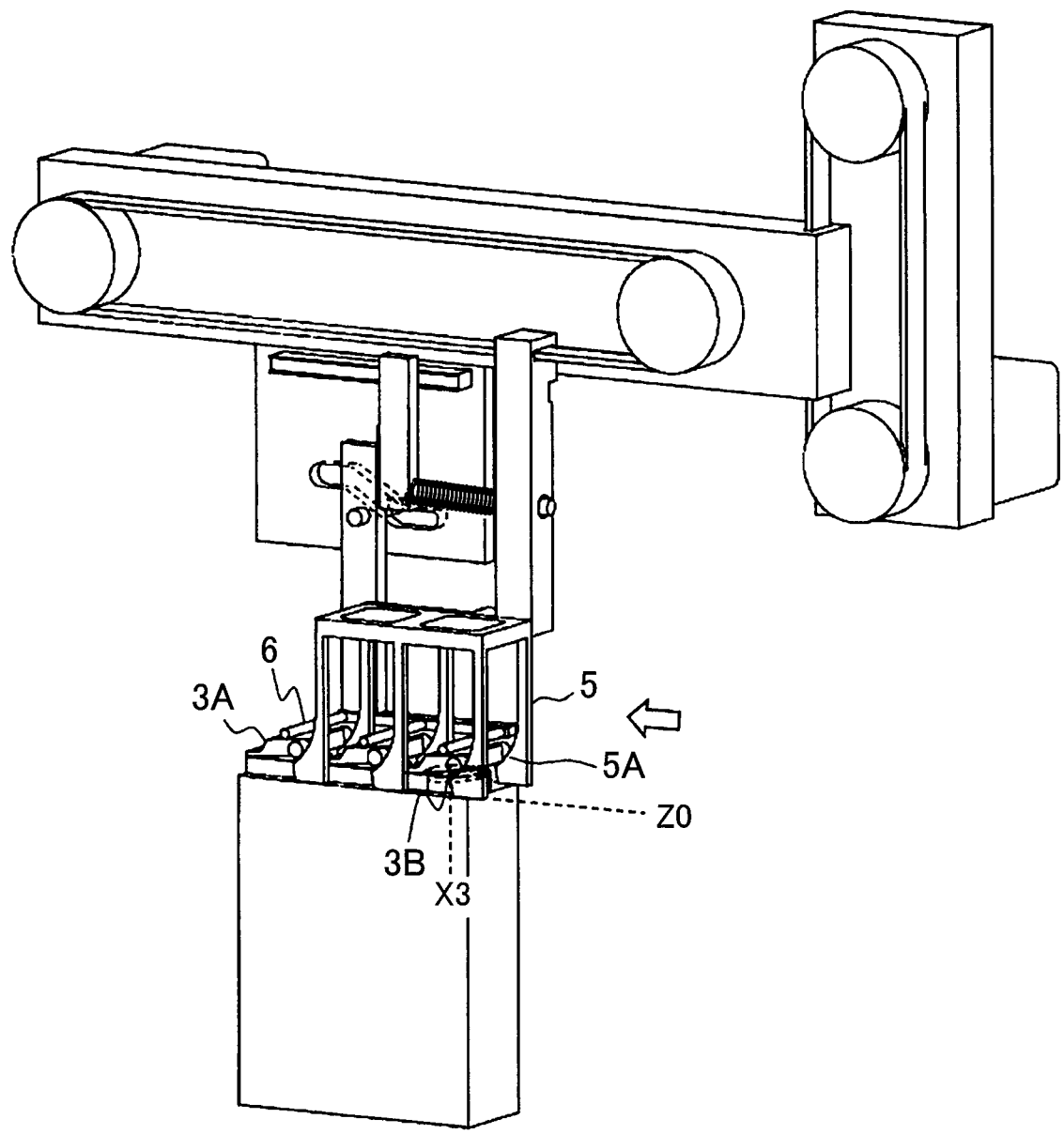
FIG. 23 is a view illustrating a third operation and a third state of the lid opening and closing in Embodiment 2.

FIG. 23 illustrates the third operation and the third state. The lid opening and closing mechanism portion 4 moves the arms 5 and the pushing bars 6 from the second state leftward in the first horizontal direction by the horizontal driving portion 42. This enters the third state. In the third state, the position X3 of the top end portion 5E of the arm 5 is near the protrusion 3B. With horizontal movement, the protrusion contacting portions 5A of three sets of the arms 5 respectively contact the corresponding protrusions 3B simultaneously. With movement, each lid 3A opens gradually because each protrusion 3B moves along each first surface. Low speed driving is made as horizontal driving in the first time.

[Lid Opening and Closing (2-4)]

Figure 24:
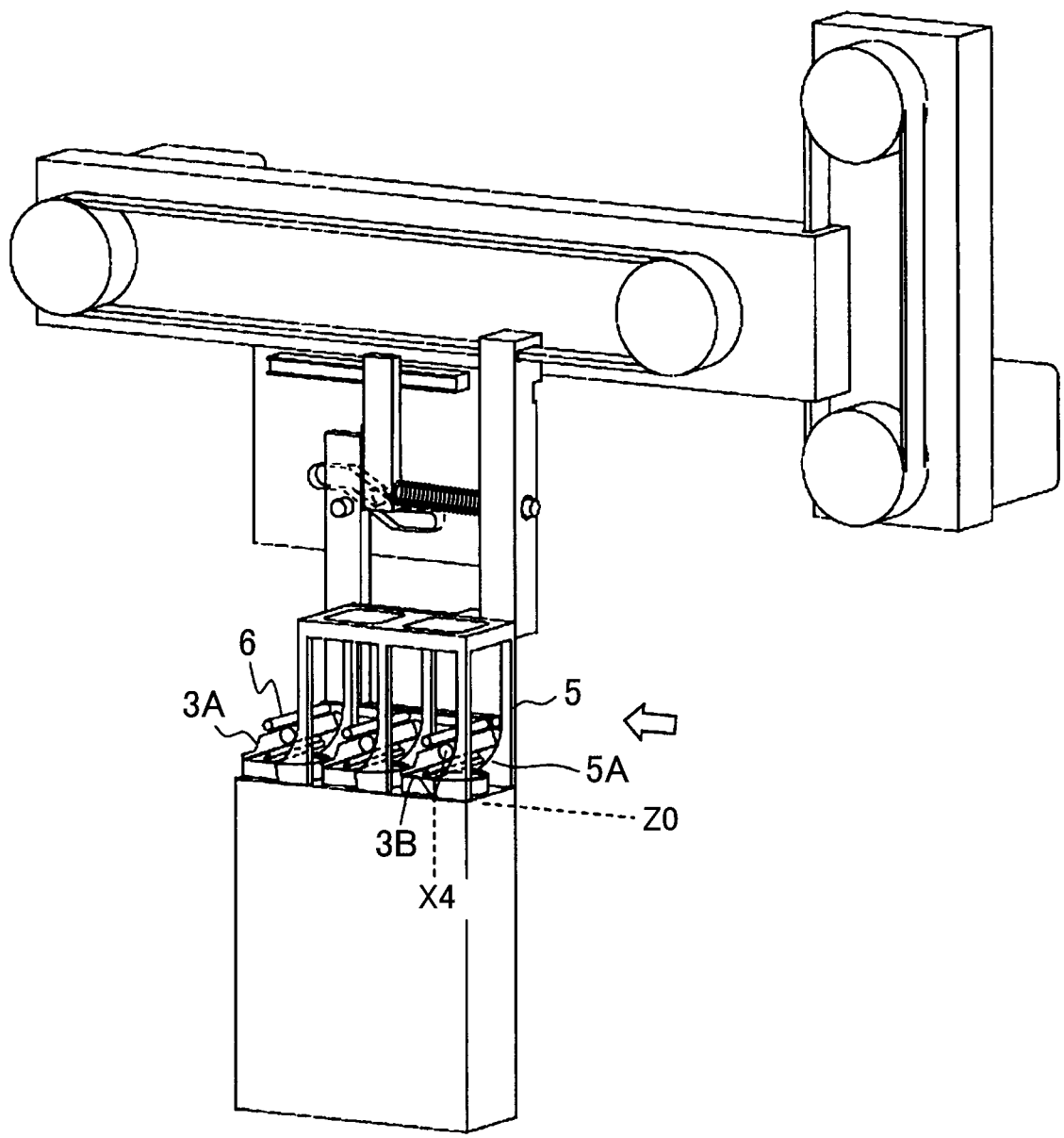
FIG. 24 is a view illustrating a fourth operation and a fourth state of the lid opening and closing in Embodiment 2.

FIG. 24 illustrates the fourth operation and the fourth state. The lid opening and closing mechanism portion 4 moves the arms 5 and the pushing bars 6 leftward from the third state by horizontal driving. This enters the fourth state. In the fourth state, the position X4 of the top end portion 5E of the arm 5 is a little leftward of the protrusion 3B. With horizontal movement, each protrusion 3B moves along each first surface in the same way.

[Lid Opening and Closing (2-5)]

Figure 25:
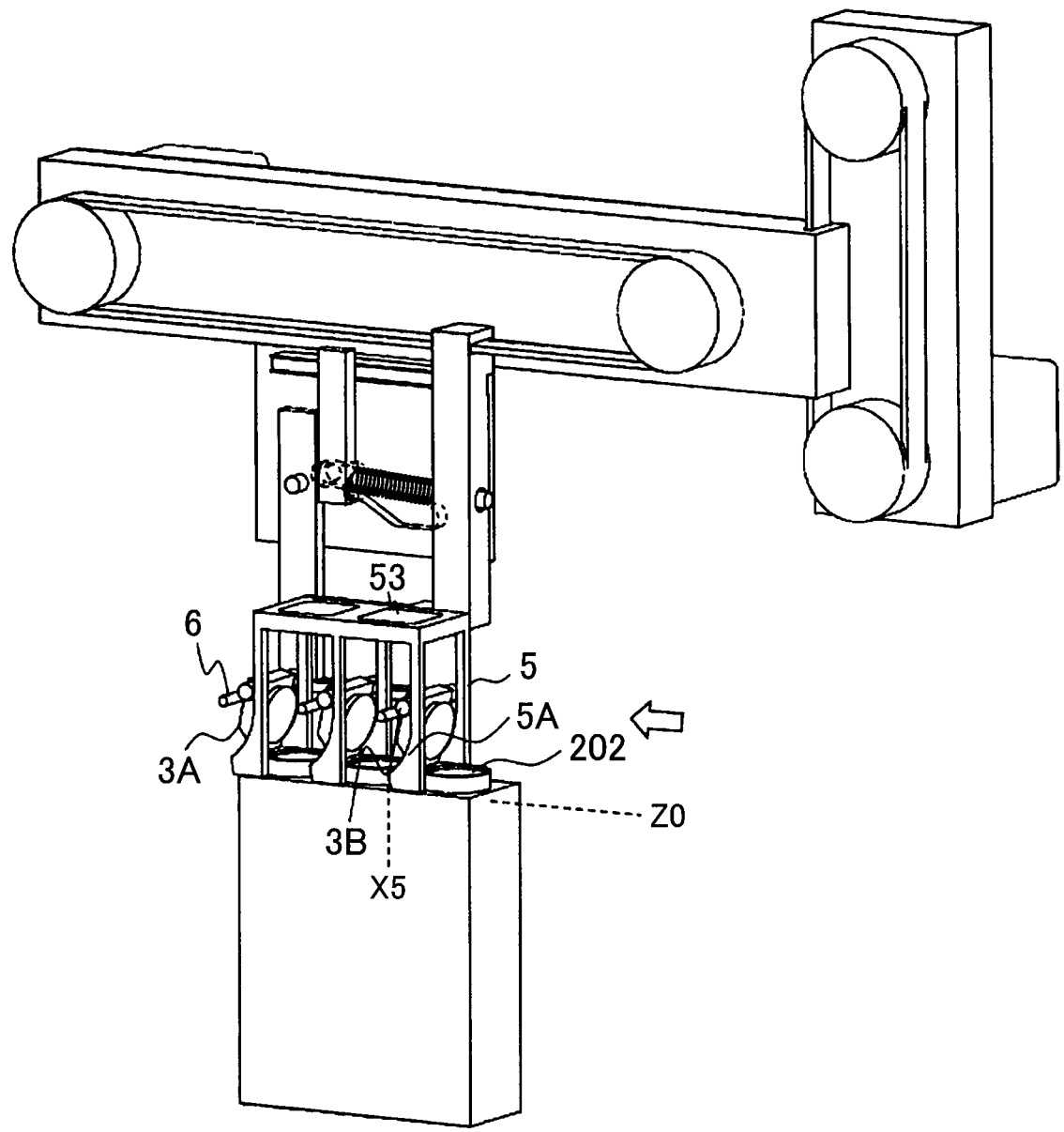
FIG. 25 is a view illustrating a fifth operation and a fifth state of the lid opening and closing in Embodiment 2.

FIG. 25 illustrates the fifth operation and the fifth state. The lid opening and closing mechanism portion 4 moves the arms 5 and the pushing bars 6 leftward from the fourth state by horizontal driving. This enters the fifth state. In the fifth state, the lid 3A is in the open state (about 85 degrees to 89 degrees) and the opening 202 is exposed. In the fifth state, each protrusion 3B passes each first surface to reach the side surface of each shaft portion 5F.

[Lid Opening and Closing (2-6)]

Figure 26:
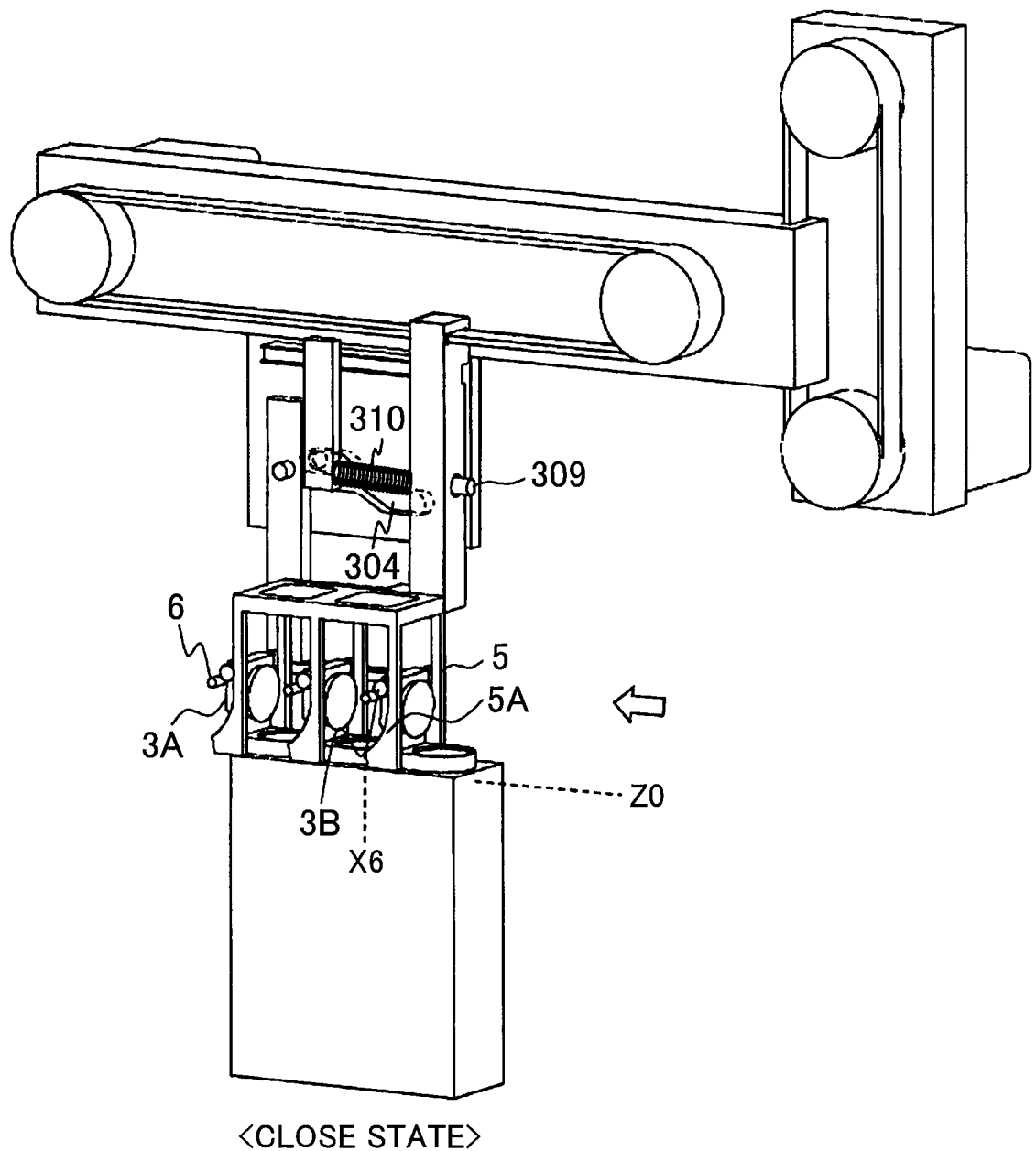
FIG. 26 is a view illustrating a sixth operation and a sixth state of the lid opening and closing in Embodiment 2.

FIG. 26 illustrates the sixth operation and the sixth state. The sixth state illustrates an open state (generally 90 degrees) where the lid 3A is opened further from the fifth state.

In the above lid opening, as in Embodiment 1, each pushing bar 6 connected to each arm 5 moves along the guide 304 not to open each lid 3A excessively and is always arranged near the top surface of each the lid 3A. The spring 310 of the connecting pin 309 compresses not to interfere with the operation of each the arm 5.

In the fifth state or sixth state, at least a partial area of the opening 202 overlaps the opening 53 of the base portion 52 below the opening 53 in the vertical direction. Therefore, the top end of the dispensing nozzle can be moved downward in the vertical direction, passes through the opening 53, and access the reagent under the opening 202 without contacting the lid 3A, the arm 5, and the pushing bar 6.

[Lid Opening and Closing (2-7)]

Figure 27:
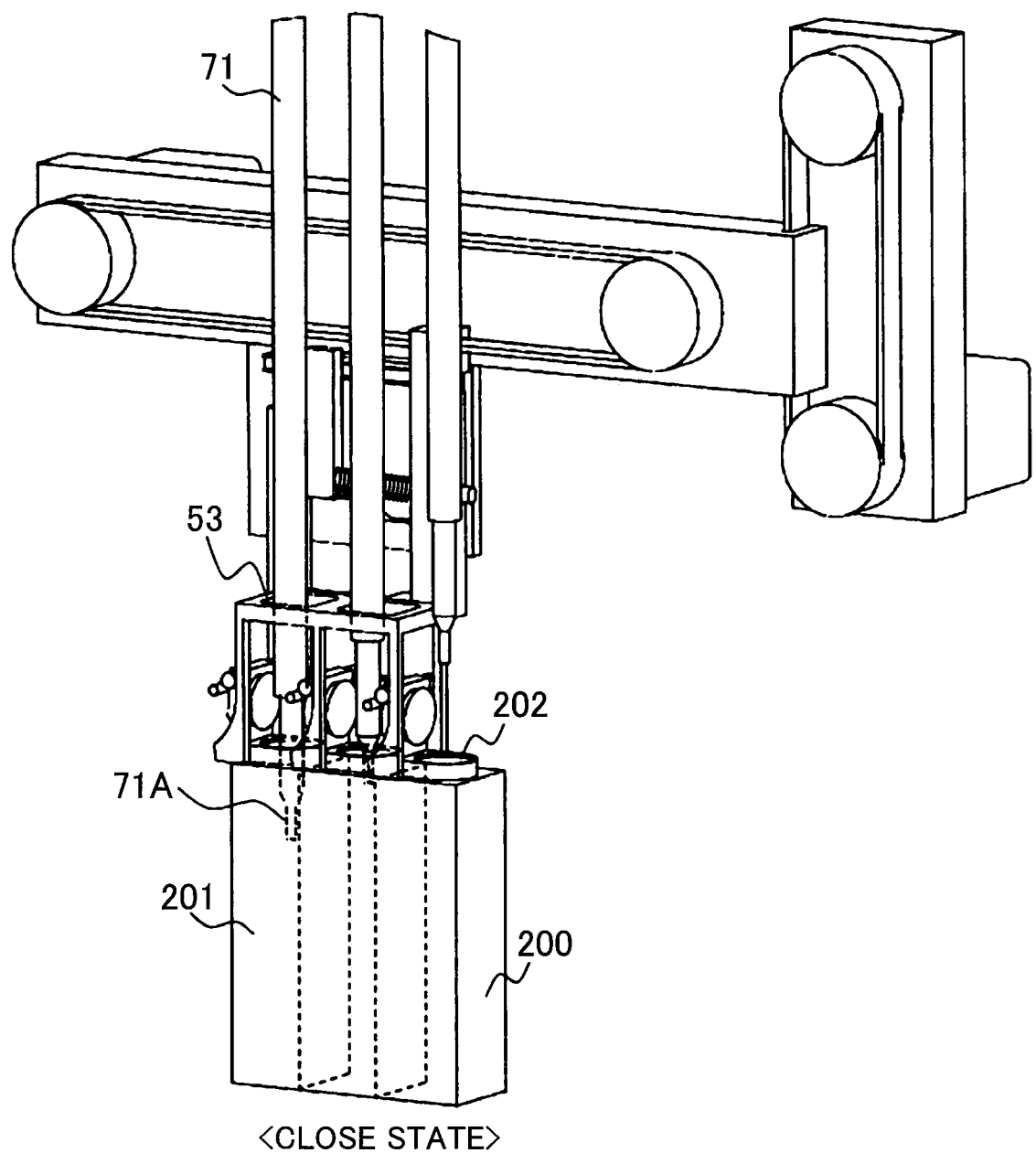
FIG. 27 is a view illustrating a seventh operation and a seventh state of the lid opening and closing in Embodiment 2.

FIG. 27 illustrates the seventh operation and the seventh state. The seventh state illustrates a state of dispensing operation. The present example illustrates a case where reagents of the three container portions 201 of the reagent bottle 3 are aspirated using three dispensing nozzles 71. The analytic apparatus 1 controls the dispensing operation using the dispensing nozzles 71 as above. In the present example, the reagent bottle 3 is in the open state where the angle α of the lid 3A is 90 degrees as in the sixth state to execute the dispensing operation in the sixth state (reagent aspiration). This is not limiting. Dispensing is possible also in the open state as in the fifth state.

Based on control of the analytic apparatus 1, a lower end portion 71A of the dispensing nozzle 71 descends to pass through the opening 53 of the arm portion 50 from above in the vertical direction in the open state of the reagent bottle 3. Then, the lower end portion 71A enters the container portion 201 through the opening 202 and is immersed in the reagent. The reagent in the container portion 201 is aspirated from the lower end portion 71A. In the present example, the left dispensing nozzle 71 accesses the inside of the left container portion 201 first, the central dispensing nozzle 71 then accesses the inside of the central container portion 201, and the right dispensing nozzle 71 finally accesses the inside of the right container portion 201. This is not limiting. The right dispensing nozzle 71 has access without passing through the opening 53.

[Lid Opening and Closing (2-8)—Comparative Example]

Figure 28:
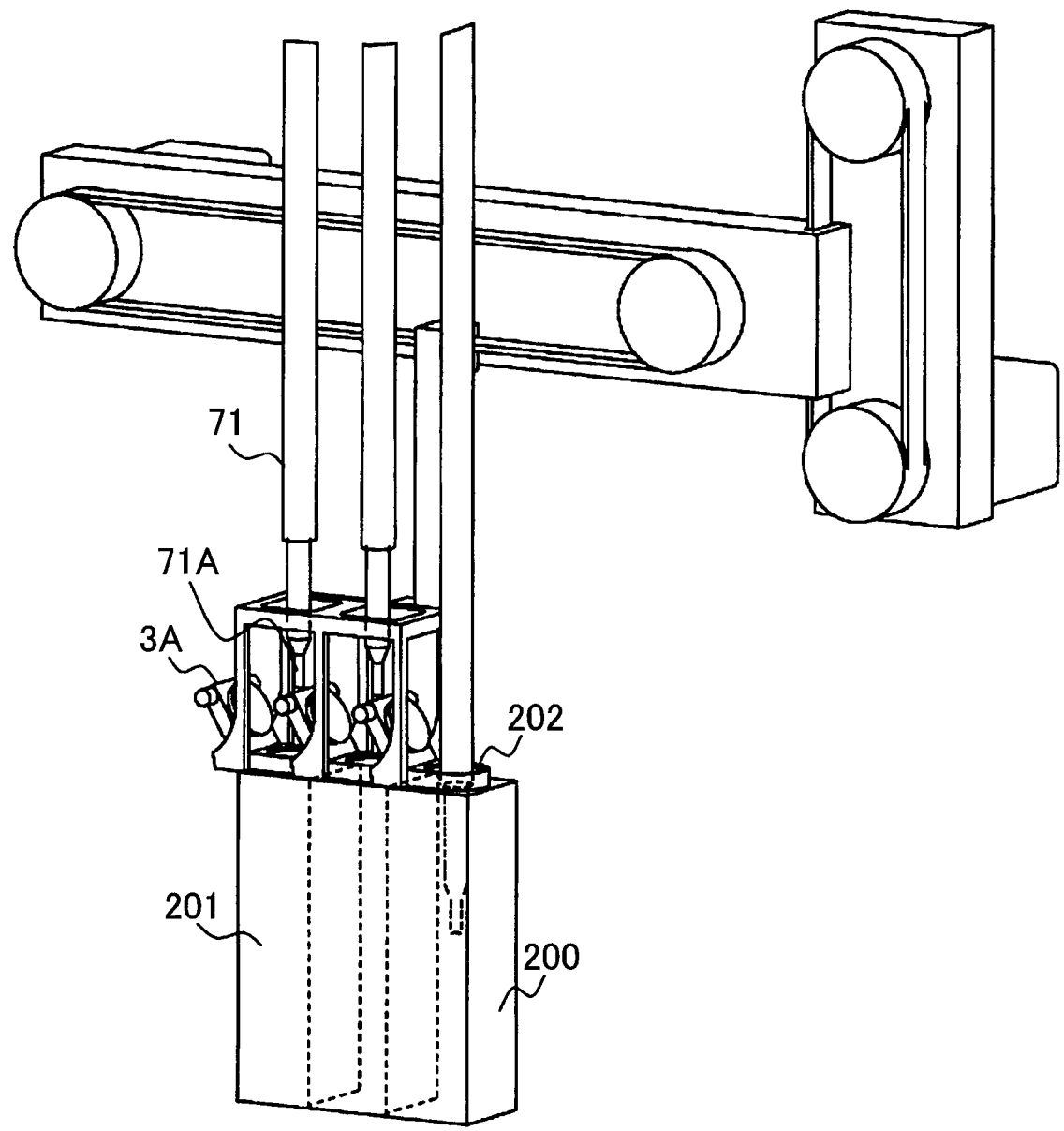
FIG. 28 is a view illustrating an eighth operation and an eighth state of the lid opening and closing in a comparative example with respect to Embodiment 2.

FIG. 28 illustrates an operation and a state of dispensing in a structure of a comparative example relative to Embodiment 2. In this comparative example, the pushing bar 6 of the pushing portion 60 is not provided. In this structure or when the pushing bar 6 is separate in distance from the top surface of the lid 3A, the lid 3A may be opened excessively as in FIG. 28. In the example of FIG. 28, the lid angle α of the lid 3A is greater (about 120 degrees) than 90 degrees. In this case, the dispensing nozzle 71 descends to contact the excessively opened lid 3A at the locations other than the right lid 3A. Therefore, the dispensing nozzle 71 cannot access the opening 202. The reagent dispensing is thus difficult.

[Lid Opening and Closing (2-9)]

The closing operation of closing the lid 3A of the reagent bottle 3 in Embodiment 2 is as follows. The example of the state in this case is the same as FIG. 23 and omitted. The lid opening and closing mechanism portion 4 moves the pushing bars 6 and the arms 5 by the horizontal driving portion 42 in the reverse direction to the first horizontal direction in which the lid opening is performed. In this case, each pushing bar 6 moves by the guide 304 in the vertical direction or the first horizontal direction to contact the top surface of each the lid 3A and to thus push each lid 3A. With movement, the catch portion 205 of each lid 3A conforms to the opening 202 to close the three lids 3A simultaneously. The lid opening and closing mechanism portion 4 moves the arms 5 and the pushing bars 6 upward in the vertical direction after moving the arms 5 to predetermined positions not to interfere with the protrusions 3B.

Advantageous Effects

As above, according to the automated analyzer of Embodiment 2, simultaneous opening and closing of the lids 3A of the multiple container portions 201 can be also realized by a relatively simple structure and the small number of drives.

Embodiment 3

An automated analyzer of Embodiment 3 of the present invention is explained using FIGS. 29 to 34. Embodiment 2 shows the mechanism which opens and closes the multiple lids 3A of the reagent bottle 3 simultaneously. However, for example when opening and closing the multiple lids 3A simultaneously, the load on the arm 5 and horizontal driving portion 42 becomes relatively large. Therefore, the arm 5 and the horizontal driving portion 42 need a function for withstanding the load. As in Embodiment 1 or Embodiment 2, the load can be reduced to some extent according to the structure of the contacting portion (protrusion contacting portion 5A) between the arm 5 and the protrusion 3B. However, when the load cannot be withstood by the structure of the contacting portion, a structure of Embodiment 3 is effective.

The analytic apparatus 1 of Embodiment 3 has a structure where the length of each of the multiple sets of the arms 5 is changed. According to this structure, the arms 5 contact the protrusions 3B at multiple (three) positions not at the same time but at different timings. while reducing the load (applied at the same time) on the arms 5 and the horizontal driving portion 42, the multiple lids 3A of the reagent bottle 3 can be opened and closed at different timings sequentially by one operation (movement in the first horizontal movement) of the horizontal driving portion 42. In the lid opening and closing mechanism portion 4 in Embodiment 3, the length of the lower end portion 5D in the first horizontal direction is different between three sets of the arms 5 at three places in the arm portion 50.

[Lid Opening and Closing Mechanism Portion]

Figure 29:
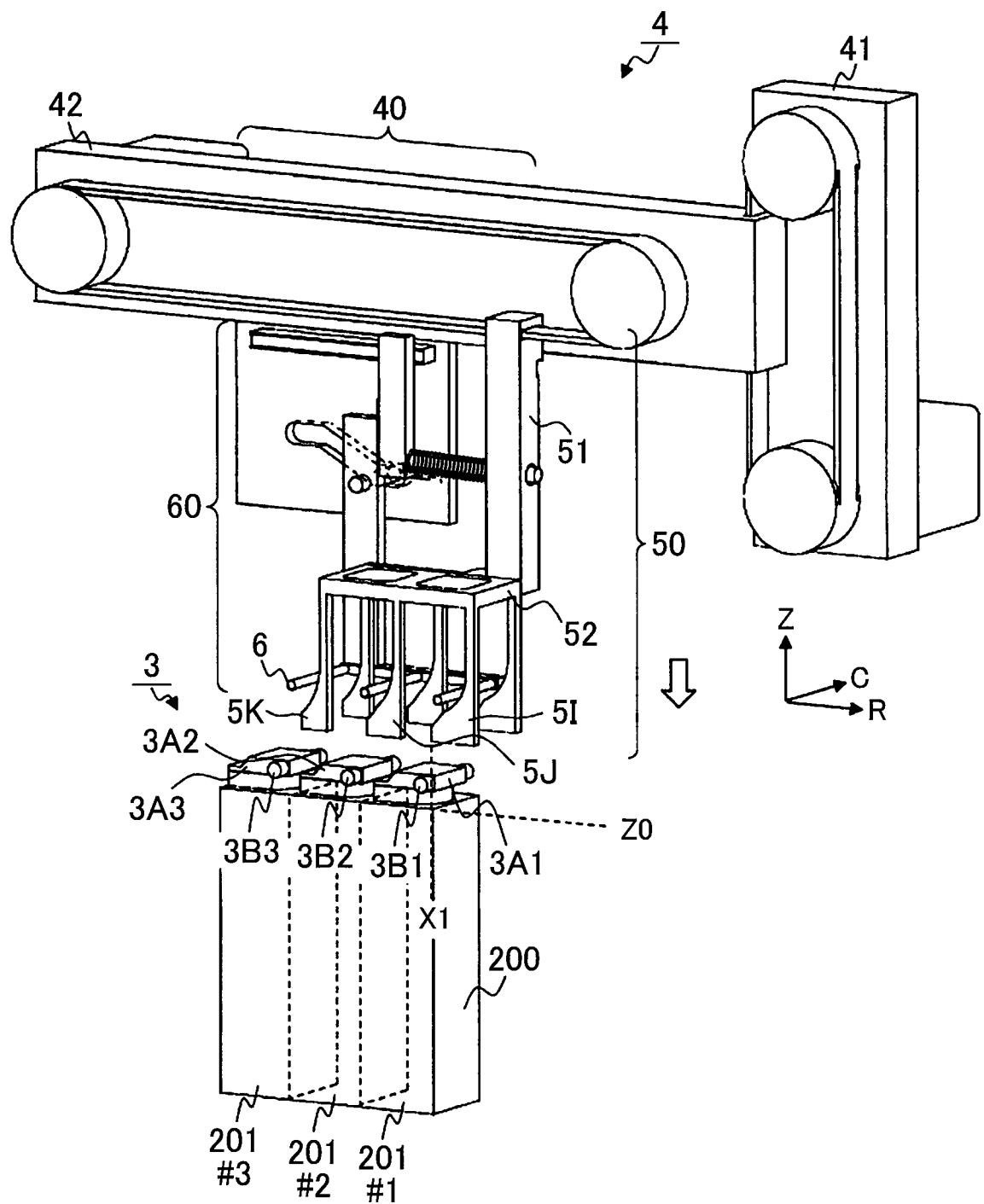
FIG. 29 is a view illustrating a structure of the lid opening and closing mechanism portion and a first operation and a first state of lid opening and closing in an automated analyzer of Embodiment 3 of the present invention.

FIG. 29 illustrates a structure of the lid opening and closing mechanism portion 4 in Embodiment 3 and illustrates the first operation and the first state. The lid opening and closing mechanism portion 4 has arms 5I, 5J, and 5K as three sets of the arms 5 secured to the base portion 52 in the arm portion 50 of the lid opening and closing portion 40. The three sets of the arms 5 have the first (first set) arm 5I on the right, the second (second set) arm 5J in the middle, and the third (third set) arm 5K on the left in the first horizontal direction (radial direction R) viewed from right to left in the figure. The arms 5 of each set have two arms 5a and 5b in the circumferential direction C. In the lower end portion 5D, the arm 5 in each set differs in the width (width x0 in FIG. 5) of the protrusion contacting portion 5A and bottle pushing portion 5B in the first horizontal direction. Each protrusion contacting portion 5A differs in the angle θ and in shape.

For explanation, the three lids 3A of the three container portions 201 (#1 to #3) of the reagent bottle 3 include a right first lid 3A1, a central second lid 3A2, and a left third lid 3A from right to left in the first horizontal direction. The protrusions 3B include a right first protrusion 3B1, a central second protrusion 3B2, and a left second protrusion 3B3.

The lengths of the arms 5I, 5J, and 5K in the first horizontal direction are changed according to the order of contacting the arms 5 and the protrusions 3B with each other in processing. In this example, in the order of the lid 3A1, lid 3A2, and lid 3A3 corresponding to #1, #2, and #3 of the three container portions 201, the arms 5 contact the protrusions 3B to open the lids 3A. After descending by a vertical drive from a predetermined position, the arm portion 50 is moved from right to left in the first horizontal direction. In this case, the right arm 5I (the protrusion contacting portion 5A of the lower end portion 5D) contacts the protrusion 3B1 of the right lid 3A1 first at the first event. Next, at the second event, the central arm 5J contacts the protrusion 3B2 of the middle lid 3A2. Finally, the left arm 5K contacts the protrusion 3B3 of the left lid 3A3 at the third event.

Therefore, in the contacting order of the arms 5I, 5J, and 5K, the length in the first horizontal direction changes from long to short. The arm 5I has a first length L1. The arm 5J has a second length L2. The arm 5K has a third length L3.

The first length L1 is longer than the second length L2. The second length L2 is longer than the third length L3. The length of the arm 5I which contacts first is longer than the arm 5J and than the arm 5K. The length of the arm 5K which contacts last is the shortest.

Especially the contact surface of the protrusion contacting portion 5A of the arm 5I has two curved surfaces (the first curved surface, the second curved surface) having two step angles theta. This structure is the same as the fourth design example of FIG. 9 in concept and further uses the curved surfaces instead of the planar surfaces. As a modification, the first curved surface may be changed to the first planar surface or the second curved surface may be changed to the second planar surface. The curved surface and planar surface may be mixed. Particularly, the contact surface of the protrusion contacting portion 5A of the arm 5K has a shape of one curved surface as in the fifth design example of FIG. 10.

[Lid Opening and Closing (3-1)]

Next, a flow after the lid opening and closing mechanism portion 4 sequentially opens the three lids 3A of the reagent bottle 3 until the lid opening and closing mechanism portion 4 sequentially closes the three lids 3A is explained. FIG. 29 is in an initial first state and illustrates the position of the top end portion 5E of the right arm 5I as the position X1.

[Lid Opening and Closing (3-2)]

Figure 30:
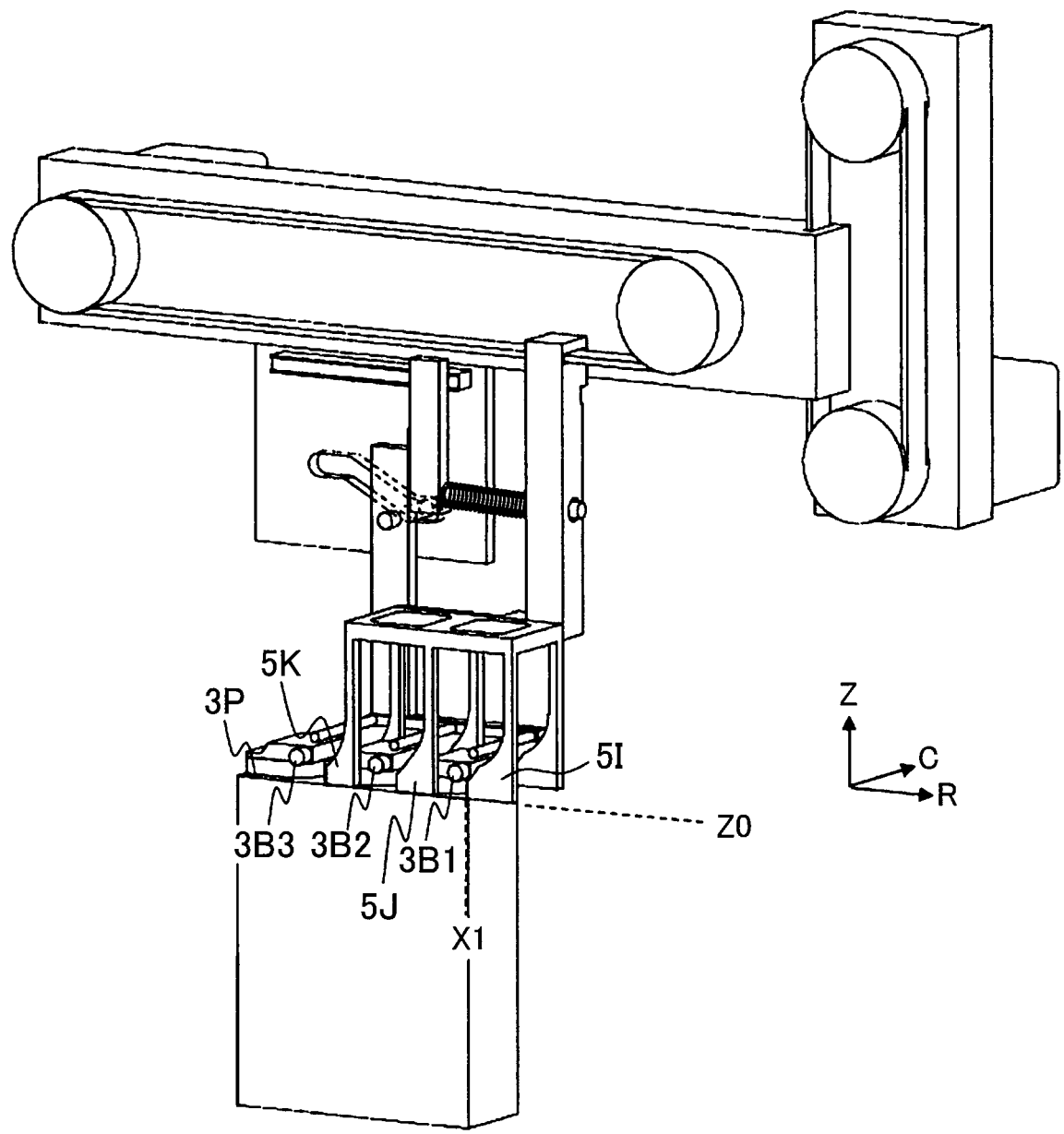
FIG. 30 is a view illustrating a second operation and a second state of the lid opening and closing in Embodiment 3.

FIG. 30 illustrates the second operation and the second state. First, the lid opening and closing mechanism portion 4 moves the arms 5 and the pushing bars 6 downward in the vertical direction from the first state by the vertical driving portion 41. This enters the second state. The bottle pushing portions 5B which are the lower surfaces of the arms 5I, 5J, and 5K generally reach the position Z0 and contacts or approaches the upper surface 3P. The positions of and intervals (pitches) between the arms 5I, 5J, and 5K are designed not to contact the protrusions 3B1, 3B2, and 3B3 of the reagent bottle 3.

[Lid Opening and Closing (3-3)]

Figure 31:
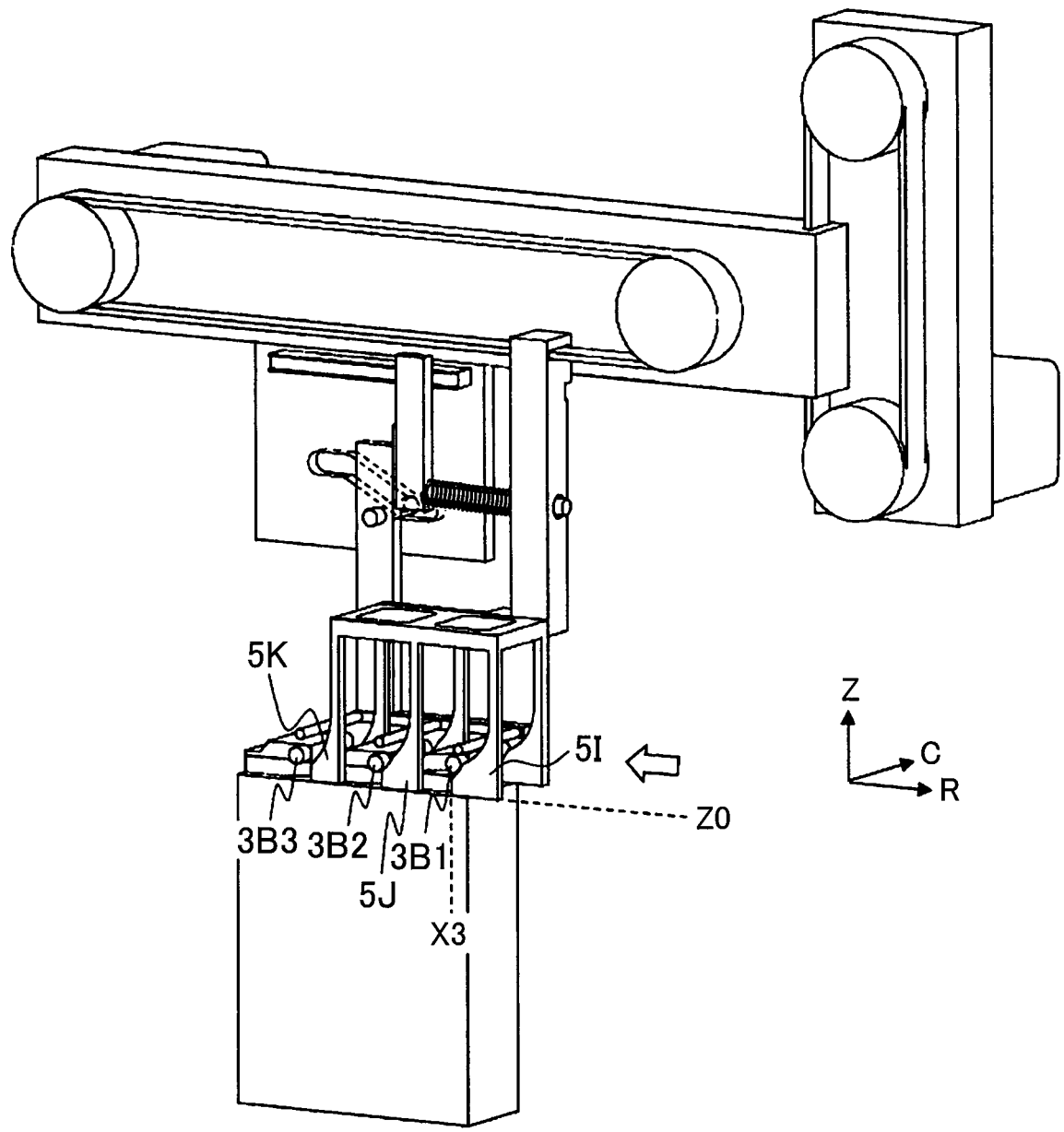
FIG. 31 is a view illustrating a third operation and a third state of the lid opening and closing in Embodiment 3.

FIG. 31 illustrates the third operation and the third state. The lid opening and closing mechanism portion 4 moves the arms 5 and the pushing bars 6 from the second state leftward in the first horizontal direction by the horizontal driving portion 42. This enters the third state. The position X3 illustrates the position of the top end portion 5E of the right the arm 5I. In this movement, the protrusion contacting portion 5A of the arm 5I first contacts the protrusion 3B1 of the lid 3A1 at the first event. Thus, the protrusion 3B1 is pushed upward in the vertical direction to gradually open the lid 3A1.

[Lid Opening and Closing (3-4)]

Figure 32:
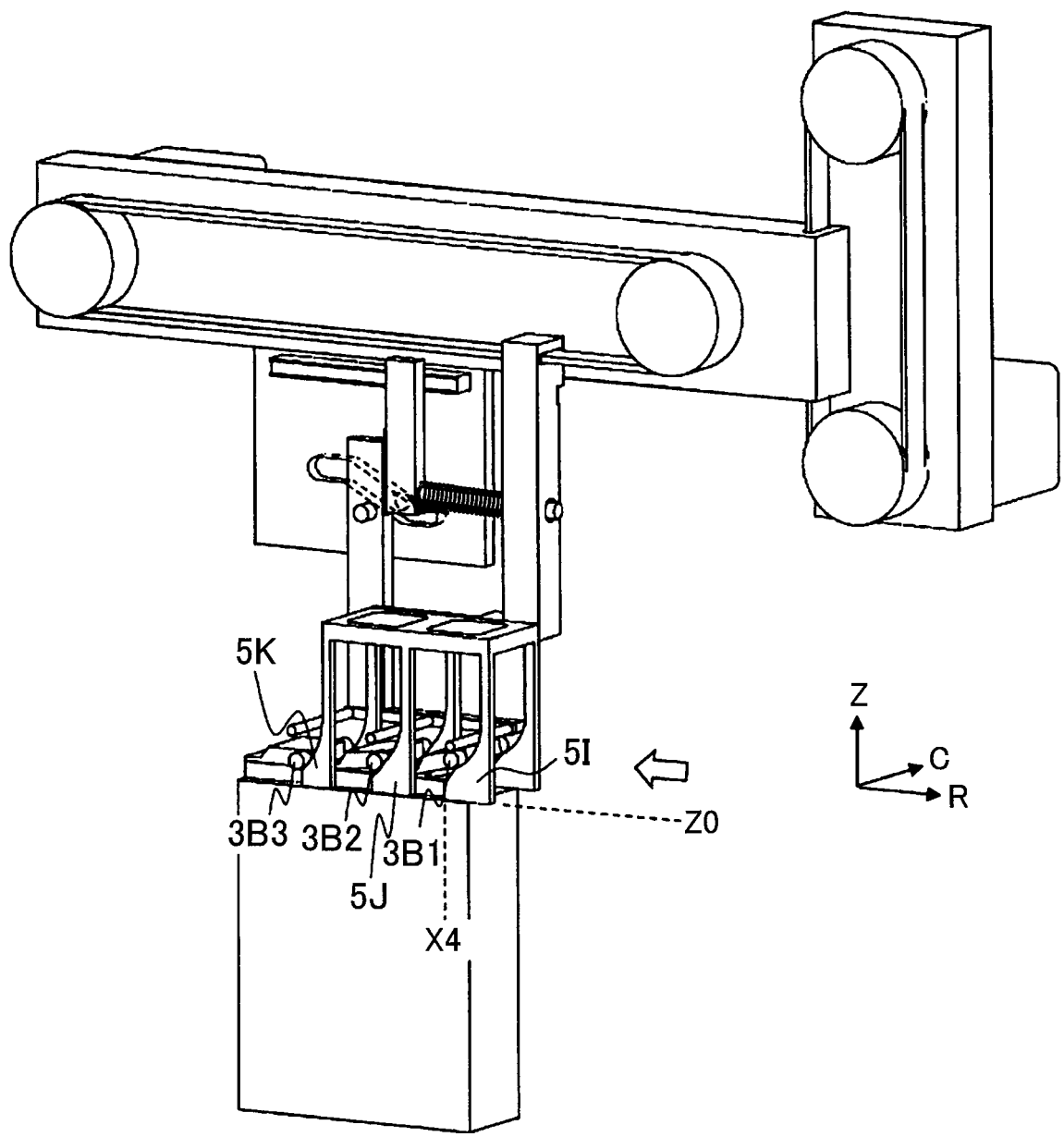
FIG. 32 is a view illustrating a fourth operation and a fourth state of the lid opening and closing in Embodiment 3.

FIG. 32 illustrates the fourth operation and the fourth state. The lid opening and closing mechanism portion 4 moves the arms 5 and the pushing bars 6 from the third state leftward further. This enters the fourth state. The position X4 illustrates the position of the top end portion 5E of the right the arm 5I. After the catch portion 205 of the lid 3A1 separates from the opening 202 in this movement, the central arm 5J contacts the protrusion 3B2 of the lid 3A2 at the second event. Thus, the protrusion 3B2 is pushed upward in the vertical direction to gradually open the lid 3A2.

[Lid Opening and Closing (3-5)]

Figure 33:
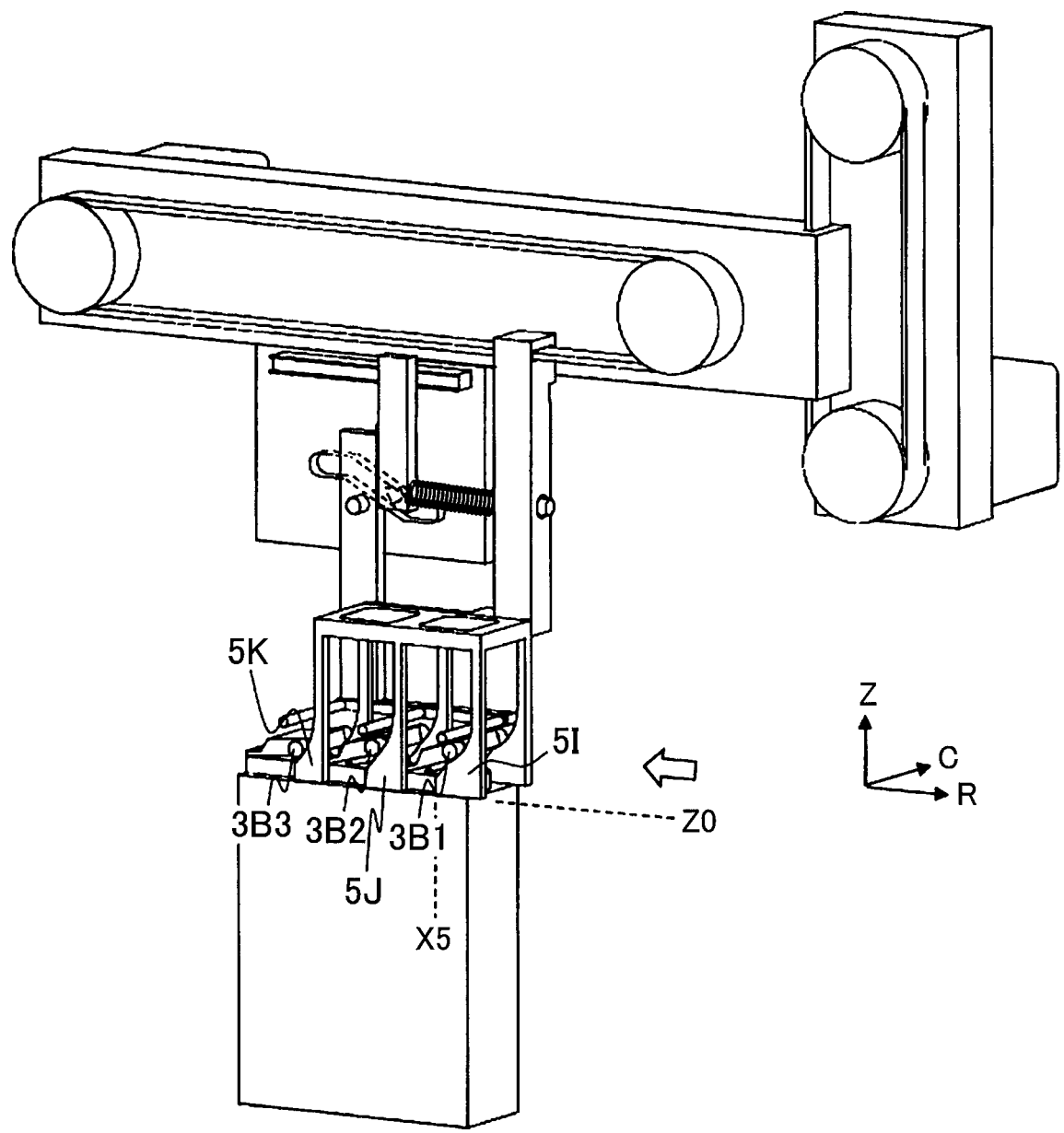
FIG. 33 is a view illustrating a fifth operation and a fifth state of the lid opening and closing in Embodiment 3.

FIG. 33 illustrates the fifth operation and the fifth state. The lid opening and closing mechanism portion 4 moves the arms 5 and the pushing bars 6 leftward further from the fourth state. This enters the fifth state. The position X5 illustrates the position of the top end portion 5E of the right the arm 5I. After the catch portion 205 of the middle lid 3A2 separates from the opening 202 in this movement, the left arm 5K contacts the protrusion 3B3 of the lid 3A3 at the third event. Thus, the protrusion 3B3 is pushed upward in the vertical direction to gradually open the lid 3A3.

During the above horizontal movement, each pushing bar 6 connected to each the arm 5 moves along the guide 304 not to excessively open each lid 3A1, 3A2, and 3A3 pushed upward by each arm 5. Each pushing bar 6 is usually arranged near the upper surface of each lid 3A.

[Lid Opening and Closing (3-6)]

Figure 34:
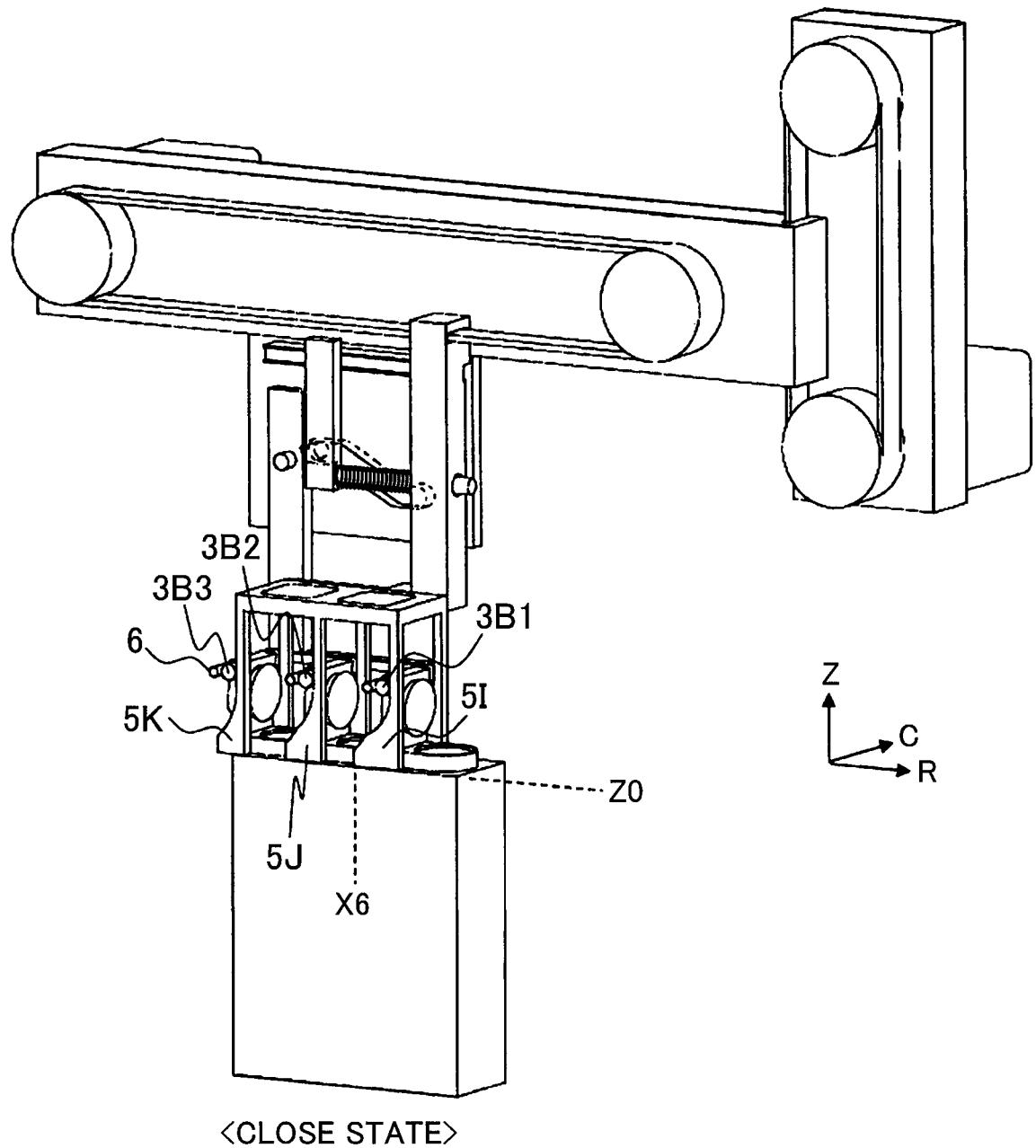
FIG. 34 is a view illustrating a sixth operation and a sixth state of the lid opening and closing in Embodiment 3.

FIG. 34 illustrates the sixth operation and the sixth state. The lid opening and closing mechanism portion 4 moves the arms 5 and the pushing bars 6 leftward further from the fifth state. This enters the sixth state. The position X6 indicates a position of the top end portion 5E of the right the arm 5I. In the sixth state, all of the lids 3A1, 3A2, and 3A3 are in the open state and the lid angle α is generally 90 degrees. The subsequent operations are the same as Embodiment 2. Horizontal movement is performed after dispensing. The three lids 3A are closed sequentially while being pushed by the pushing bars 6.

Advantageous Effects

As above, according to the automated analyzer of Embodiment 3, sequentially opening and closing of the lids 3A of the multiple container portions 201 is also realizable by a relatively simple structure and the small number of drives.

Embodiment 4

The automated analyzer of Embodiment 4 of the present invention is explained using FIGS. 35 to 42. In the system of the analytic apparatus 1, the user may manually insert and install the reagent bottle 3. In that case, the lid 3A of the reagent bottle 3 and hinge portion 204 may be installed in the incorrect reverse orientation relative to the arm 5 in the lid opening and closing mechanism portion 4. That is, in FIG. 2, as the correct orientation in the first horizontal direction (the radial direction R), the hinge portion 204 of the side portion 211 on the one end of the lid 3A is on the left and the protrusion 3B of the side portion 212 on the other end is on the right. In contrast, as the incorrect reverse orientation in the first horizontal direction, the hinge portion 204 of the side portion 211 on the one end of the lid 3A is on the right and the protrusion 3B of the side portion 212 on the other end is on the left. The arm 5 and the like of the lid opening and closing mechanism portion 4 is arranged corresponding to the correct orientation of the lid 3A of the reagent bottle 3.

When the lid 3A of the reagent bottle 3 is installed in the reverse orientation as above, the lid 3A of the reagent bottle 3 cannot be correctly opened and closed by the lid opening and closing mechanism portion 4. Embodiment 4 includes a mechanism that prevents such a case. The lid opening and closing mechanism portion 4 includes a function to determine and detect whether the reagent bottle 3 is installed in the correct orientation. In addition, Embodiment 4 has a function to determine and detect a case where the reagent bottle 3 is not insert or installed from the beginning.

[Lid Opening and Closing Mechanism Portion]

FIG. 35 illustrates a structure of the lid opening and closing mechanism portion 4 in Embodiment 4. Embodiment 4 as well as Embodiment 1 has one set of the two arms 5a, 5b as the arms 5 of the arm portion 50. This is not limiting. The lid opening and closing mechanism portion 4 has a function to detect the presence or absence and the orientation of the insertion of the reagent bottle 3 to notify the user.

The lid opening and closing mechanism portion 4 differs from Embodiment 1 in the structure of the arm portion 50. The arm portion 50 has a connection portion 54, a spring 55, and a sensor 56. The connection portion 54 is provided in the middle of, for example, near the lower end of the base portion 51. The connection portion 54 movably connects the base portion 51 with the base portion 52 and the arm 5 in the vertical direction. The spring 55 is provided to the connection portion 54. The spring 55 keeps constant the distance between the arm 5 and the horizontal driving portion 42. When force is applied to the arm 5 upward in the vertical direction, the spring 55 compresses to change the distance. For example, the sensor 56 detects the state of the compression of the spring 55 to detect the vertical movement of the connection portion 54.

[Reagent Bottle Registration]

Next, a flow of the registration of the reagent bottle 3 in Embodiment 4 is explained using FIGS. 36 and 37 to 41. A control computer 123 of the analytic apparatus 1 registers and manages information on the reagent bottle 3 and its position or the like to a system (constituted by the analytic apparatus 1) and has a function to control the reagent bottle 3 and the availability of the position. The analytic apparatus 1 controls the registration of the reagent bottle 3.

FIG. 36 illustrates a flow of the registration processing of the reagent bottle 3 by using the lid opening and closing mechanism portion 4. FIG. 36 has steps S41 to S48. Hereafter, the steps are explained sequentially.

(S41) The user first inserts and installs the reagent bottle 3 in the reagent disc 2 (for example, the bottle securing portion 2C of FIG. 45) of the analytic apparatus 1. After the insertion, the user inputs an instruction of completion of the reagent bottle insertion to an operation input portion or the like of the control computer 123. The lid opening and closing mechanism portion 4 receives the instruction via the control computer 123.

(S42) The lid opening and closing mechanism portion 4 processes a reagent bottle input orientation determination. Hereafter, the reagent bottle input orientation determination is explained in detail using FIGS. 37 to 39.

FIG. 37 illustrates the second operation and the second state as detail of the reagent bottle registration by the lid opening and closing mechanism portion 4. The lid opening and closing mechanism portion 4 makes the horizontal driving portion 42 horizontally move the arm 5 and the pushing bar 6 from the first state (standby position) of FIG. 35 toward the target reagent bottle 3 by a constant amount. This enters the second state of FIG. 37. The position of the top end portion 5E of the arm 5 is changed from the position X1 to the position X2. In the correct orientation, the position X2 corresponds to the position of the hinge portion 204 of the one end of the lid 3A.

FIG. 38 illustrates the third operation and the third state. The lid opening and closing mechanism portion 4 lowers the arm 5 and the pushing bar 6 from the second state in the vertical direction by a constant amount (reaching the position Z0 of the upper surface 3P) by the vertical driving portion 41. This enters, for example, the third state of FIG. 38. In the third state, the input orientation of the reagent bottle 3 is correct and the lid 3A is in the close state. The height position of the bottle pushing portion 5B which is the lower surface of the arm 5 in the third state changes from the position Z1 to the position Z3. The position Z3 is near the height position of the protrusion 3B. When the orientation is correct, the arm 5 descends by a constant amount without contacting the lid 3A of the reagent bottle 3 and the protrusion 3B. That is, the lower surface of the arm 5 passes between the protrusions 3B via the third state of FIG. 38 to reach the position Z0 of the upper surface 3P of the reagent bottle 3.

FIG. 39 illustrates the fourth operation and the fourth state. The fourth state illustrates a case where the input orientation of the reagent bottle 3 is reversed. The lid opening and closing mechanism portion 4 lowers the arm 4 from the position X2 in the second state. In this case, the arm 5 contacts the upper side of the protrusion 3B of the lid 3A of the reagent bottle 3 while descending by a constant amount. The height position of the lower surface of the arm 5 at this time is at a position Z4. The position Z4 is higher than the position Z0 and the position Z3.

Since upward force is applied to the arm 5 when the arm 5 contacts the protrusion 3B, the spring 55 of the connection portion 54 compresses and the connection portion 55 operates upward in the vertical direction. Thus, when the connection portion 55 operates, this operation is detected by the sensor 56. Therefore, the lid opening and closing mechanism portion 4 can determines whether the input orientation of the reagent bottle 3 is correct (reversed) based on whether the sensor 56 detects the operation while the arm 5 descends by a constant amount.

(S43) Returning to FIG. 36, as a result of S42, the lid opening and closing mechanism portion 4 proceeds to S44 when the input orientation of the reagent bottle 3 is correct (S43-Y) and proceeds to S47 when the input orientation of the reagent bottle 3 is incorrect (S43-N).

(S47) The lid opening and closing mechanism portion 4 once stops the operation of the mechanism at the above detection and generates an alarm. With the alarm, the user is warned that the reagent bottle 3 is in the reverse orientation and the reagent bottle 3 is needed to be input again. The alarm output may use an output unit of the control computer 123. The lid opening and closing mechanism portion 4 once raises the arm 5 in the vertical direction to allow the user to input the reagent bottle 3 again.

(S48) After S47, the control computer 123 masks the input portion (position on the reagent disc 2) of the reagent bottle 3 on the system registration and information management to make the input portion unavailable. Thus, the lid opening and closing mechanism portion 4 cannot access the input portion in the subsequent analysis. This prevents wrong dispensing operations. When the user inputs the reagent bottle 3 into the masked input position again in the correct orientation, the masked input position is unmasked through the flow of S43 and S46 and then becomes usable.

(S44) However, only with the reagent bottle input orientation determination in S42, the input orientation of the reagent bottle 3 is determined to be correct even when the reagent bottle 3 is not present in a predetermined position. Therefore, in S44, the reagent bottle presence and absence determination by the lid opening and closing mechanism portion 4 is processed further. The reagent bottle presence and absence determination are explained below in detail using FIGS. 40 to 41.

FIG. 40 illustrates the fifth operation and the fifth state in the reagent bottle presence and absence determination by the lid opening and closing mechanism portion 4. In the fifth state, the reagent bottle 3 is present at a predetermined position in a correct orientation.

In the reagent bottle input orientation determination in S42, the arm 5 has already descended by a predetermined amount (the third state of FIG. 38, the position Z3). The lid opening and closing mechanism portion 4 lowers the arm 5 and the pushing bar 6 from the above third state further by a predetermined amount in the reagent bottle presence and absence determination in S44. This predetermined amount corresponds to the position Z5 below the position Z0. As in FIG. 40, when the reagent bottle 3 is present in the correct orientation, the lower surface of the arm 5 reaches the position Z0 of the upper surface 3P of the reagent bottle 3. The bottle pushing portion 5B of the lower surface of the arm 5 contacts the upper surface 3P. Thus, the spring 55 of the connection portion 54 compresses and the connection portion 54 ascends in the vertical direction. This operation is detected by the sensor 56. From this detection, the reagent bottle 3 can be determined to be present.

FIG. 41 illustrates the sixth operation and the sixth state in the reagent bottle presence and absence determination. In the sixth state, the reagent bottle 3 is not present in a predetermined position. When the reagent bottle 3 is not present, the arm 5 reaches the position Z0 and position Z5 without contacting anything while descending by a constant amount (corresponding to the position Z5). Since there is no contact during this lowering, the sensor 56 does not detect the operation of the connection portion 54. Thus, it is determined that the reagent bottle 3 is absent.

(S45) As a result of S44, the flow proceeds to S46 when the reagent bottle 3 is present (S45-Y) and the flow proceeds to S48 when the reagent bottle 3 is not present (S45-N). In S48, as above, the input portion is masked to be unavailable.

(S46) The control computer 123 registers the reagent bottle 3 which is present in the correct orientation to the system as one normally input and installed. The registered reagent bottle 3 is available by the lid opening and closing mechanism portion 4 and the like in the subsequent analysis operation.

Advantageous Effects

As above, the automated analyzer of Embodiment 4 can detect and cope with the case where the orientation of the reagent bottle 3 is incorrect and the case where the reagent bottle 3 is not installed. The high capability apparatus can be thus provided.

Embodiment 5

The automated analyzer of Embodiment 5 of the present invention is explained using FIGS. 42 to 44. In Embodiment 4, the lid opening and closing mechanism portion 4 determines whether the input reagent bottle 3 is present and whether the orientation of the input reagent bottle 3 is correct. In Embodiment 4, when one reagent bottle 3 is registered and dispensing or the like is made, the lid opening and closing mechanism portion 4 is operated twice roughly (the first operation for determination and the second operation for dispensing as in Embodiment 1). Therefore, registrations of the multiple reagent bottles 3 require a relatively long time.

Therefore, the analytic apparatus 1 of Embodiment 5 has an information reading determination mechanism portion for reading and determining information about the reagent bottle 3 in the lid opening and closing mechanism portion 4. Specifically, an information tag such as an RFID tag is given to a specific site of the reagent bottle 3. The analytic apparatus 1 also uses an information reader represented by an RFID leader or the like. Thus, the analytic apparatus 1 determines whether the reagent bottle 3 is input in the correct orientation while reducing the number of operations of the lid opening and closing mechanism portion 4.

[Lid Opening and Closing Mechanism Portion]

FIG. 42 illustrates a structure of the lid opening and closing mechanism portion 4 in Embodiment 5. The structure of Embodiment 5 is the same as the structure of Embodiment 4 in including the mechanism that determines the orientation and presence of the reagent bottle 3 (the connection portion 54 or the like). In the structure of FIG. 42, the lid opening and closing mechanism portion 4 has an information reading determination mechanism portion 80 as a different point. The information reading determination mechanism portion 80 has an RFID leader 81 and an RFID tag 82. Embodiment 5 illustrates a case where the arm portion 50 has one set of the arms 5.

The RFID tag 82 is attached to, for example, a portion of the side surface of the body 200 of the reagent bottle 3 in the radial direction R. The RFID leader 81 is provided to a reagent bottle installation portion in the lid opening and closing mechanism portion 4. The reagent bottle installation portion (container installation portion) is, for example, a portion of the reagent disc 2 (the bottle securing portion 2C of FIG. 45). The RFID leader 81 reads ID information of the RFID tag 82 installed in a predetermined position of the reagent bottle 3. The RFID leader 81 is an information reader to read ID information described in the RFID tag 82 by a known near-field communication detection. The RFID tag 82 and RFID leader 81 are applied to Embodiment 5. This is not limiting. Barcodes and barcode readers are also applicable.

When the reagent bottle 3 is input and installed to a predetermined position of the reagent disc 2 in the correct orientation, the RFID leader 81 faces the RFID tag 82 by a predetermined distance. In the predetermined distance, ID information can be successfully read. The information reading determination mechanism portion 80 may further process information such as determination using the ID information read by the RFID leader 81. The control computer 123 may perform the information processing.

[Reagent Bottle Registration]

Next, a flow of the registration of the reagent bottle 3 is explained. FIG. 43 illustrates the flow of the registration processing of the reagent bottle 3 in Embodiment 5. In the flow of FIG. 43, Steps S51 and S52 is added after Step S41 in the flow of FIG. 36 of Embodiment 4.

At Step S51, reagent bottle information reading processing is performed by the information reading determination mechanism portion 80. Hereafter, the reagent bottle information reading processing is explained in detail. The RFID leader 81 reads ID information of the RFID tag 82 of the reagent bottle 3. In this case, as in FIG. 42, when the reagent bottle 3 is installed in the correct orientation, the ID information of the RFID tag 82 can be read successfully. As in FIG. 43, when the reagent bottle 3 is not installed correctly, the reading fails. It can be determined whether the reagent bottle 3 is correctly input based on whether information can be read.

As a result of S51, Step S52 branches based on whether the ID information of the RFID tag 81 of the reagent bottle 3 can be read (success or failure). The flow proceeds to S46 when the ID information can be read (S52-Y). The flow proceeds to S42 when the ID information cannot be read (S52-N).

When the reading is performed successfully, the reagent bottle 3 is in the correct orientation. Therefore, the determination processing of S42 and S44 is omissible. In S46, the analytic apparatus 1 determines that the reagent bottle 3 is input correctly, registers the reagent bottle 3 to the system, and makes the reagent bottle 3 available to analysis.

The following three possibilities can be considered when the reading is difficult.

(1) The reagent bottle 3 is not installed in a predetermined position from the beginning.

(2) The reagent bottle 3 is installed in a predetermined position in the reverse orientation (FIG. 44).

(3) The reagent bottle 3 is installed in a predetermined position in a correct orientation but the RFID 82 fails (failure, nonconformity of attachment, or the like).

Therefore, when the reading is difficult, the above determination processing of S42 and S44 is performed. In case of the above (3), the registration is made at S46 after the flow of S52-N, S43-Y, and S45-Y.

FIG. 44 illustrates a case where the reagent bottle 3 is not input in the correct orientation, that is, in the reverse orientation. In this case, since the distance between the RFID leader 81 and RFID tag 82 is outside a predetermined distance range, the RFID leader 81 cannot read the ID information of the RFID tag 81 at S51. This is a failure as a result.

Advantageous Effects

As above, the automated analyzer of Embodiment 5 can detect and cope with the case where the orientation of the reagent bottle 3 is not correct or the case where the reagent bottle 3 is not installed. The high capability apparatus can be thus provided.

As above, the present invention is specifically explained based on the embodiments. The present invention is not limited to the above embodiments but can be variously changed without departing from the scope of the invention. The present invention is applicable not only to the processing including the lid opening and closing of a reagent bottle having a lid and the subsequent dispensing of a reagent but also to processing of lid opening and closing of various containers having lids.

REFERENCE SIGNS LIST

1 . . . analytic apparatus
2 . . . reagent disc
3 . . . reagent bottle
3A . . . lid
3B . . . protrusion
3P . . . upper surface
4 . . . lid opening and closing mechanism portion
5 . . . arm
5A . . . protrusion contact portion
5B . . . bottle pushing portion
6 . . . pushing rod

The invention claimed is:

1. An automated analyzer used for chemical analysis, comprising:
a disc configured to hold one or more containers;
each container of the one or more containers includes a protrusion and an openable and closable lid;
a lid opening and closing mechanism disposed above the disc for opening and closing the lid; and
a controller coupled to the disc and the lid opening and closing mechanism,
wherein the lid opening and closing mechanism includes:
an arm portion extending downward in the vertical direction including an arm having a protrusion contacting portion that is configured to contact the protrusion on the lid, and
a horizontal driving portion configured to move the arm in first and second directions along a horizontal direction,
wherein the protrusion contacting portion includes an angled first surface having an angle greater than 0 degrees and less than 90 degrees when a horizontal surface that is perpendicular to the vertical direction is set as 0 degrees, and
wherein the controller is configured to:
control the lid opening and closing mechanism to open the lid by moving the arm in the first horizontal direction only and causing the protrusion contacting portion of the arm to contact the protrusion of the lid and maintain contact of the protrusion contacting portion and the protrusion as the arm is moved in the first horizontal direction thereby causing the protrusion to move upward in the vertical direction along the first surface of the protrusion contacting portion, and
control the lid opening and closing mechanism to close the lid by moving the arm in the second horizontal direction only, which is opposite the first horizontal direction.

2. The automated analyzer according to claim 1,
wherein the arm includes a container pressing portion having a second surface configured to contact a portion of surfaces of each container that are disposed below the lid in the vertical direction, the container pressing portion being below the protrusion contacting portion in the vertical direction, and
wherein the controller is configured to, upon controlling the lid opening and closing mechanism to open the lid of the container, cause the second surface of the container pressing portion to contact the portion of the surfaces of the container.

3. The automated analyzer according to claim 2,
wherein the lid opening and closing mechanism further includes a vertical driving portion configured to move the arm in the vertical direction,
wherein the controller is further configured to control the lid opening and closing mechanism to move the arm from a position above the lid to below the lid in the vertical direction to cause the container pressing portion to contact the portion of the surfaces of the container.

4. The automated analyzer according to claim 1,
wherein the lid opening and closing mechanism includes a pressing portion having a base portion and a rod configured to press the lid, the base portion extending in the vertical direction and is movably connected to a rail, which is connected to the horizontal driving portion,
wherein the controller is further configured to:
control the horizontal driving portion to move the rod in the first horizontal direction, and
control the lid opening and closing mechanism to move the rod in a direction of the first horizontal direction with a fixed position relationship with respect to the arm and contact an upper surface of the lid when the lid is opened and move the rod in the second horizontal direction with a fixed position relationship with respect to the arm and contact and apply pressure to the upper surface of the lid thereby closing the lid.

5. The automated analyzer according to claim 1,
wherein the first surface is configured by at least one flat surface.

6. The automated analyzer according to claim 1,
wherein the first surface is configured by at least one curved surface.

7. The automated analyzer according to claim 1,
wherein in the disc, a plurality of containers are installed in the first horizontal direction,
wherein the arm portion includes a plurality of arms including the arm, and
wherein the controller is configured to control the lid opening and closing mechanism to open the lids of the plurality of containers simultaneously by moving the plurality of arms in the first horizontal direction simultaneously and causing respective protrusion contacting portions of the arms to contact respective protrusions of the lids and maintain contact of the respective protrusion contacting portions and the respective protrusions as the arms are moved in the first horizontal direction thus opening the plurality of lids simultaneously.

8. The automated analyzer according to claim 1,
wherein in the disc, a plurality of containers are installed in the first horizontal direction,
wherein the arm portion includes a plurality of arms including the arm,
wherein the plurality of arms have different widths from each other in the first horizontal direction, and
wherein the controller is further configured to:
control the lid opening and closing mechanism to move the plurality of arms in the first horizontal direction and cause the respective protrusion contacting portions to contact respective protrusions of the plurality of the lids sequentially, thereby opening the plurality of lids sequentially, when the plurality of the lids of the plurality of containers are opened.

9. The automated analyzer according to claim 3,
wherein the arm portion includes a connecting portion, which includes a spring, that connects the arm to the arm portion, and the arm portion includes a sensor configured to detect a state of compression of the spring, and
wherein the controller is configured to determine whether the container is installed in a correct orientation based on the sensor detecting a state of the compression of the spring.

10. The automated analyzer according to claim 1,
wherein an information tag is attached to each of the one or more containers,
wherein an information reader for reading information from the information tag is coupled to the controller, and
wherein the controller is configured to:
determine whether the container is installed in a correct orientation in the disc based on whether information from the information tag is read by the information reader.

11. The automated analyzer according to claim 1, further comprising:
a reagent nozzle coupled to the controller,
wherein the container is a reagent bottle,
wherein the disc is a reagent disc,
wherein the first horizontal direction is a radial direction of the reagent disc, and
wherein the controller is further configured to control the reagent nozzle to dispense a reagent into the container in a state where the lid is opened.

\* \* \* \* \*